United States Patent [19]

Abbott et al.

[11] Patent Number: 5,345,342
[45] Date of Patent: Sep. 6, 1994

[54] DISK DRIVE USING PRML SYNCHRONOUS SAMPLING DATA DETECTION AND ASYCHRONOUS DETECTION OF EMBEDDED SECTOR SERVO

[75] Inventors: William L. Abbott, Portola Valley; Hung C. Nguyen; Kenneth E. Johnson, both of San Jose, all of Calif.

[73] Assignee: Quantum Corporation, Milpitas, Calif.

[21] Appl. No.: 192,146

[22] Filed: Feb. 4, 1994

Related U.S. Application Data

[62] Division of Ser. No. 937,064, Aug. 27, 1992.

[51] Int. Cl.$^5$ .......................... G11B 5/09; G11B 5/596
[52] U.S. Cl. ..................................... 360/48; 360/77.08
[58] Field of Search ...................... 375/11, 12, 13, 14, 375/18; 360/46, 51, 77.7, 77.8, 65, 48

[56] References Cited

U.S. PATENT DOCUMENTS

| | | | |
|---|---|---|---|
| 4,504,872 | 3/1985 | Peterson | 360/40 |
| 4,644,564 | 2/1987 | Dolivo et al. | 375/18 |
| 4,750,058 | 6/1988 | Hirt et al. | 360/46 |
| 4,847,871 | 7/1989 | Matsushita et al. | 375/94 |
| 4,890,299 | 12/1989 | Dolivo et al. | 375/18 |
| 5,060,088 | 10/1991 | Dolivo et al. | 360/46 |
| 5,070,421 | 12/1991 | Sumiya et al. | 360/77.08 |
| 5,121,263 | 6/1992 | Kerwin et al. | 360/53 |
| 5,150,379 | 9/1992 | Baugh et al. | 375/14 |
| 5,220,466 | 6/1993 | Coker et al. | 360/46 |
| 5,255,131 | 10/1993 | Coker et al. | 360/48 |

OTHER PUBLICATIONS

Wood, Peterson, "Viterbi Detection of Class IV Partial Response on a Magnetic Recording Channel", *IEEE Trans on Comm.* vol. Com-34, No. 5, May 1986, pp. 454-461.

Schmerbeck, Richetta, Smith, "A 27-MHz Mixed Analog/Digital Magnetic Recording Channel DSP using Partial Response Signalling with Maximum Likelihood Detection" *Proc. 1991 IEEE Int'l Solid State Circuits Conf.*, pp. 136-137, 304, and pp. 96, 97, 256 Slide Supplement.

(List continued on next page.)

*Primary Examiner*—Donald Hajec
*Assistant Examiner*—T. N. Forbus, Jr.
*Attorney, Agent, or Firm*—David B. Harrison

[57] ABSTRACT

A class IV partial response, maximum likelihood data channel for a disk drive includes an encoder connected to a data sequencer for converting user data blocks into a predetermined 8/9ths code such as a (0,4,4,) code. A precoder converts the 8/9ths code into class IV code. An analog write driver supplies the class IV code to a data transducer head during data write-to-disk operations. A read channel connected to the head amplifies and conditions analog signals during data read operations. A quantizer produces samples of the analog signals in accordance with a quantization clock generated by a clock generator. An adaptive FIR filter means is conditions the data samples in accordance with selectable, adaptive filter coefficients. A Viterbi detector puts out the class IV code from the filtered and quantized samples. A postcoder converts the detected class IV code into detected 8/9ths code. A decoder converts the detected 8/9ths code into user data and supplies user data to the sequencer. The programmable FIR filter is provided with servo coefficients during reading of the servo sectors, and an asynchronous servo detector detects head position information from the quantized and filtered samples without phase locking of the quantization clock generator to the quantized servo samples. The asynchronous servo detector is also used to aid detection of sync field preamble information before the FIR filter is fully adapted. Multi-mode gain and timing loops are also a part of the present invention.

11 Claims, 42 Drawing Sheets

OTHER PUBLICATIONS

Wood, Ahigrim, Hollarnasek, Swenson, "An Experimental Eight-Inch Disk Drive with 100 MBytes per Surface," *IEEE Trans on Magnetics,* vol. MAG-20, No. 5, Sep. 1984 pp. 698–702.

Kobayashi, Tang, "Application of Partial-Response Channel Coding to Magnetic Recording Systems", *IBM Journal of Research & Develop.,* Jul. 1970, pp. 368–375.

Kobayashi, "Application of Probabilistic Decoding to Digital Magnetic Recording Systems", *IBM Journal of Research & Develop.,* Jan. 1971, pp. 64–74.

Dolivo, "Signal Processing of High-Density Digital Magnetic Recording", *Proc. 1989 IEEE VLSI & Computer Peripherals,* Hamburg, W. Germany, May, 1989, pp. 1-91 to 1-96.

Coker, Galbraith, Kewin, Rae, Ziperovich, "Implementation of PRML in a Rigid Disk Drive", *IEEE Trans. on Magnetics,* vol. 27, No. 6, Nov. 1991.

Cideciyan, Dolivo, Hermann, Hirt, Schott, "A PRML System for Digital Magnetic Recording", *IEEE Journal on Selected Areas of Comm.,* vol. 10, No. 1, Jan. 1992, pp. 38–56.

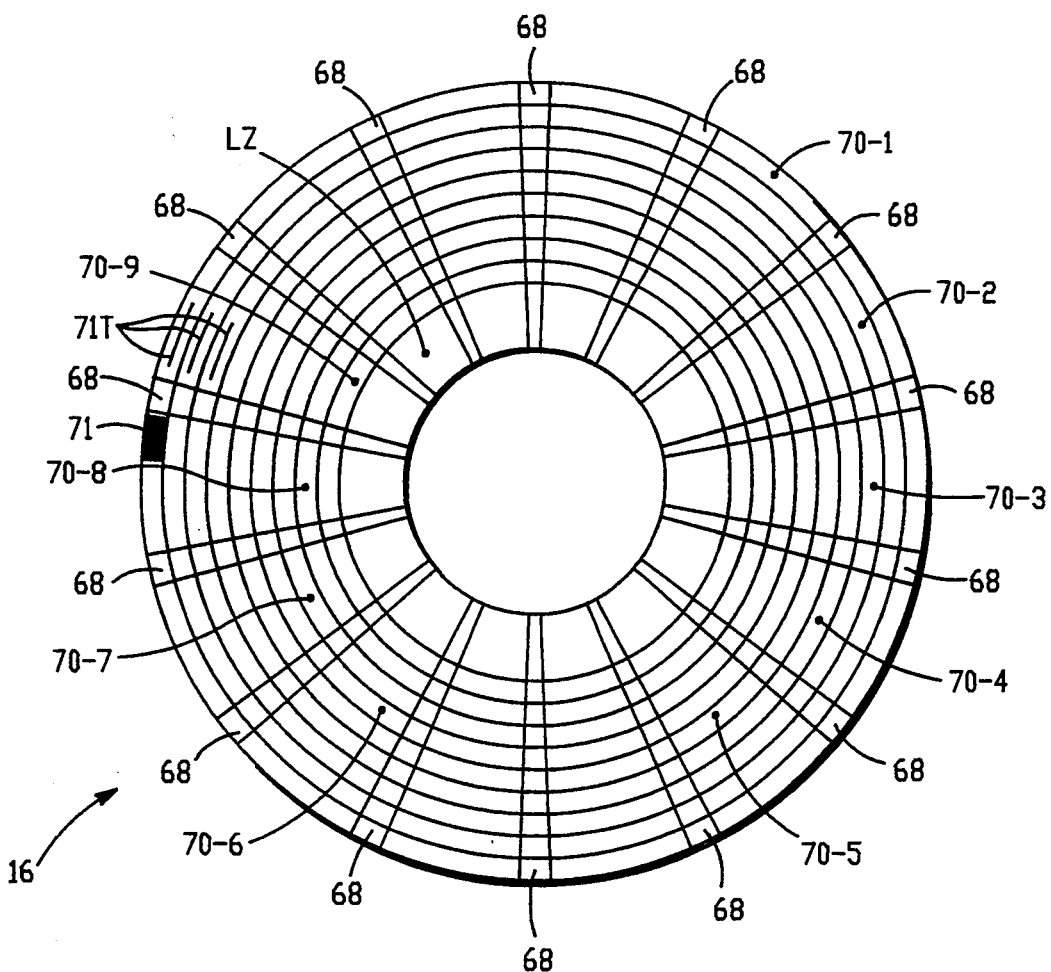
FIG.-5
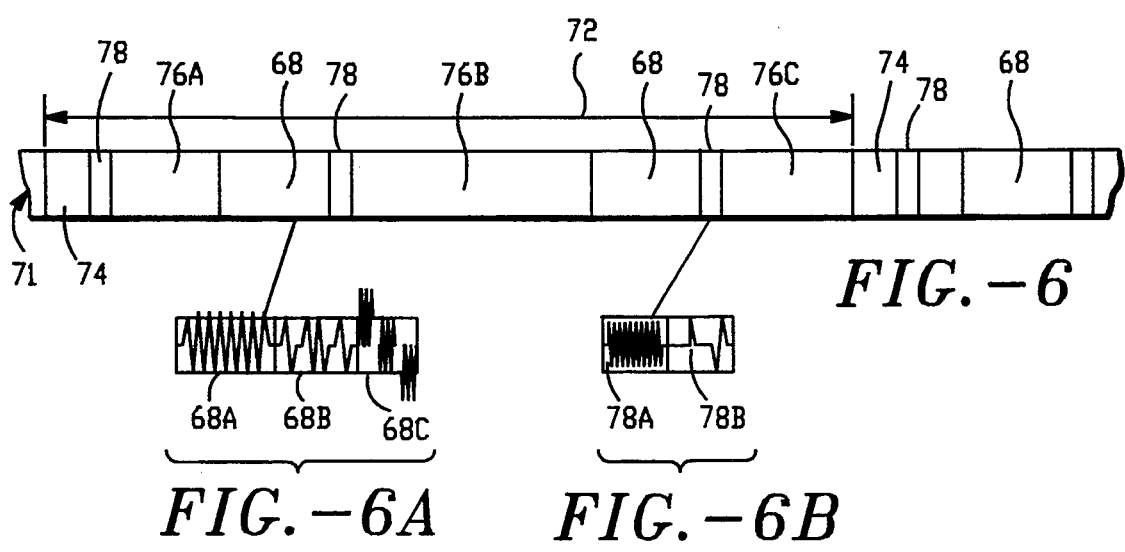
FIG.-6
FIG.-6A   FIG.-6B

| PRESENT STATE AIN | D=y(k)-y(k-M) | OUTPUTS da | db | ku | NEW STATE AOUT |
|---|---|---|---|---|---|
| 1 | D ≥ dkval | 0 | 0 | 1 | 0 |
| 1 | D ≤ 0 | 1 | 1 | 1 | 1 |
| 1 | 0 < D < dkval | 1 | 0 | 0 | 1 |
| 0 | D ≥ 0 | 0 | 0 | 1 | 0 |
| 0 | D ≤ dkvaln | 1 | 1 | 1 | 1 |
| 0 | dkvaln < D < 0 | 1 | 0 | 0 | 0 |

FIG.—43

| # | A | A' | 514 | 513 | 512 | 511 | 510 | 59 | 58 | 57 | 56 | 55 | 54 | 53 | C | C' | |
|---|---|----|-----|-----|-----|-----|-----|----|----|----|----|----|----|----|---|----|---|
| 1) | 1 | 0 | 0 | 0 | 0 | 0 | 0 | 1 | 1 | 0 | 0 | 0 | 0 | 0 | 1 | 0 | (NO ERROR) |
| 2) | 1 | 0 | 0 | 0 | 0 | 0 | 0 | 0 | 1 | 1 | 0 | 0 | 0 | 0 | 1 | 0 | (BB' SHIFTS RIGHT) |
| 3) | 1 | 0 | 0 | 0 | 0 | 0 | 1 | 1 | 0 | 0 | 0 | 0 | 0 | 0 | 1 | 0 | (BB' SHIFTS LEFT) |
| 4) | 1 | 1 | 0 | 0 | 0 | 0 | 0 | 1 | 1 | 0 | 0 | 0 | 0 | 0 | 1 | 0 | (AA' SHIFTS RIGHT) |
| 5) | 1 | 0 | 0 | 0 | 0 | 0 | 0 | 1 | 1 | 0 | 0 | 0 | 0 | 0 | 1 | 1 | (CC' SHIFTS LEFT) |
| 6) | 1 | 1 | 0 | 0 | 0 | 0 | 0 | 1 | 1 | 0 | 0 | 0 | 0 | 0 | 1 | 1 | (AA' SHIFTS RIGHT & CC' SHIFTS LEFT) |
| 7) | 1 | 0 | 0 | 0 | 0 | 0 | 0 | 1 | 0 | 0 | 0 | 0 | 0 | 0 | 1 | 0 | (B' IS MISSING) |
| 8) | 1 | 0 | 0 | 0 | 0 | 0 | 0 | 0 | 1 | 0 | 0 | 0 | 0 | 0 | 1 | 0 | (B IS MISSING) |
| 9) | 0 | 0 | 0 | 0 | 0 | 0 | 0 | 1 | 1 | 0 | 0 | 0 | 0 | 0 | 1 | 0 | (A' IS MISSING) |
| 10) | 1 | 1 | 0 | 0 | 0 | 0 | 0 | 1 | 1 | 0 | 0 | 0 | 0 | 0 | 0 | 0 | (C IS MISSING) |
| 11) | 0 | 0 | 0 | 0 | 0 | 0 | 0 | 0 | 1 | 0 | 0 | 0 | 0 | 0 | 1 | 0 | (A' AND B ARE MISSING) |
| 12) | 0 | 0 | 0 | 0 | 0 | 0 | 0 | 1 | 1 | 0 | 0 | 0 | 0 | 0 | 0 | 0 | (A' AND C ARE MISSING) |
| 13) | 1 | 0 | 0 | 0 | 0 | 0 | 0 | 0 | 1 | 0 | 0 | 0 | 0 | 0 | 0 | 0 | (B' AND C ARE MISSING) |

516  515  514  513  512  511  510  59  58  57  56  55  54  53  52  51

DISK DRIVE USING PRML SYNCHRONOUS SAMPLING DATA DETECTION AND ASYCHRONOUS DETECTION OF EMBEDDED SECTOR SERVO

This is a divisional of copending application Ser. No. 07/937,064 filed on Aug. 27, 1992.

FIELD OF THE INVENTION

The present invention relates to data storage and retrieval methods and apparatus employing 8/9ths coding and synchronized, partial response, maximum likelihood ("PRML") detection. More particularly, the present invention relates to architecture for a miniature, very high capacity hard disk drive data storage subsystem employing a partial response, class IV, maximum likelihood (hereinafter referred to as "PR4,ML") data channel having digital adaptive equalization.

BACKGROUND OF THE INVENTION

Conventional disk drives have employed peak detection techniques in order to recover digital data written as saturation recording onto a magnetizable surface media of a rotating disk. With peak detection techniques, it is necessary to space flux transitions sufficiently apart so that analog peaks in the recovered data stream may be identified and the corresponding data recovered. In order to achieve reasonable bandwidths in data channels, it has been customary to employ data coding techniques. One such technique has been to use a (1,7) RLL code. In this code, flux transitions can be no closer together than every other clock bit time period ("bit cell") nor farther apart than eight clock bit cells. (1,7) RLL codes are known as "rate two-thirds" codes, in the sense that two data bits are coded into three code bits. Thus, with a rate two-thirds code, one third of the user storage area of the storage disk is required for code overhead.

One way to decrease the code overhead is to employ a code in which flux transitions are permitted in adjacent bit cells. One such code is a (0,4,4) code. The (0,4,4) code is generally thought of as a rate eight-ninths code, meaning that nine code bits are required for eight incoming data bits. (Theoretically, the (0,4,4) code ratio is somewhat higher, approaching 0.961.) Thus, this code is significantly more efficient than a rate two-thirds code, such as (1,7) RLL. Use of a (0,4,4) code results in a significantly greater net user data storage capacity on the disk surface, given a constant bit cell-rate. However, when flux transitions occur in adjacent bit cells, as is the case with a (0,4,4) code, intersymbol interference ("ISI") results. Conventional peak detection techniques are not effective or reliable in recovering data coded in an eight-ninths code format, such as (0,4,4).

The zero in the (0,4,4) code denotes that flux transitions may occur in directly adjacent bit cells of the coded serial data stream. The first "4" denotes that a span of no more than four zeros occurs between ones in the encoder output. The second "4" signifies that the bit cell stream has been divided into two interleaves: an even interleave, and an odd interleave; and, it denotes that there can be a span of no more than four zeros between ones in the encoder output of either the odd interleave or the even interleave.

It is known that partial response signalling enables improved handling of ISI and allows more efficient use of the bandwidth of a given channel. Since the nature of ISI is known in these systems, it may be taken into account in the decoding/detection process. Partial response transmission of data lends itself to synchronous sampling and provides an elegant compromise between error probability and the available spectrum. The partial response systems described by the polynomials $1+D$, $1-D$, and $1-D^2$ are known as duobinary, dicode and class IV (or "PR4"), respectively, where D represents one bit cell delay and $D^2$ represents 2 bit cell delays (and further where $D = e^{-j\omega T}$, where $\omega$ is a frequency variable in radians per second and T is the sampling time interval in seconds). The PR4 magnitude response plotted in FIG. 1 hereof and given the notation $|1-D^2|$ emphasizes midband frequencies and results in a read channel with increased immunity to noise and distortion at both low and high frequencies. In magnetic recording PR4 is a presently preferred partial response system, since there is a close correlation between the idealized PR4 spectrum as graphed in FIG. 1, and the natural characteristics of a magnetic data write/read channel.

In order to detect user data from a stream of coded data, not only must the channel be shaped to a desired partial response characteristic, such as the PR4 characteristic, but also a maximum likelihood ("ML") sequence estimation technique is needed. The maximum likelihood sequence estimation technique determines the data based upon an analysis of a number of consecutive data samples taken from the coded serial data stream, and not just one peak point as was the case with the prior peak detection methods.

One maximum likelihood sequence estimation algorithm is known as the Viterbi detection algorithm, and it is well described in the technical literature. Application of the Viterbi algorithm to PR4 data streams within a magnetic recording channel is known to improve detection of original symbol sequences in the presence of ISI and also to improve signal to noise ratio over comparable peak detection techniques.

In an article entitled "Viterbi Detection of Class IV Partial Response on a Magnetic Recording Channel" appearing in *IEEE Trans. on Communications.* vol. Com-34, No. 5, May 1986, pp. 434–461, authors Wood and Peterson explain the derivation of PR4 as being formed by subtracting waveforms two bit intervals apart, thereby forming an analog domain ternary "eye" pattern graphed herein in FIG. 2.

The Viterbi algorithm provides an iterative method of determining the "best" route along the branches of a trellis diagram, such as the one shown in FIG. 3 hereof, for example. If, for each trellis branch, a metric is calculated which corresponds to the logarithm of the probability for that branch, then the Viterbi algorithm may be employed to determine the path along the trellis which accumulates the highest log probability, i.e., the "maximum likelihood" sequence. Since the Viterbi algorithm operates upon a sequence of discrete samples $\{y_k\}$, the read signal is necessarily filtered, sampled, and equalized.

While PRML has been employed in communications signalling for many years, it has only recently been applied commercially within magnetic hard disk drives. One recent application is described in a paper by Schmerbeck, Richetta, and Smith, entitled "A 27 MHz Mixed Analog/Digital Magnetic Recording Channel DSP Using Partial Response Signalling with Maximum Likelihood Detection", *Proc.* 1991 *IEEE International*

*Solid State Circuits Conference*, pp. 136–137, 304, and pp. 96, 97 and 265 Slide Supplement. While the design reported by Schmerbeck et al. appears to have worked satisfactorily, it has drawbacks and limitations which are overcome by the present invention. One drawback of the reported approach was its design for transducers of the ferrite MiG type or of the magnetoresistive type which simplified channel equalization requirements. Another drawback was the use of a single data transfer rate which significantly simplified channel architecture. A further drawback was the use of a dedicated servo surface for head positioning within the disk drive, thereby freeing the PR4, ML data channel from any need for handling of embedded servo information or for rapid resynchronization to the coded data stream following each embedded servo sector.

Prior Viterbi detector architectures and approaches applicable to processing of data sample sequences taken from a communications channel or from a recording device are also described in the Dolivo et al. U.S. Pat. No. 4,644,564. U.S. Pat. No. 4,504,872 to Peterson describes a digital maximum likelihood detector for class IV partial response signalling. An article by Roger W. Wood and David A. Peterson, entitled: "Viterbi Detection of Class IV Partial Response on a Magnetic Recording Channel" *IEEE Trans. on Comm.* Vol. Com-34, No. 5, May 1986, pp. 454–466 describes application of Viterbi detection techniques to a class IV partial response in a magnetic recording channel. An article by Roger Wood, Steve Ahigrim, Kurt Hallarnasek and Roger Stenerson entitled: "An Experimental Eight-Inch Disc Drive with One-Hundred Megabytes per Surface", *IEEE Trans. on Magnetics*, Vol. Mag-20, No. 5, Sep. 1984, pp 698–702 describes application of class IV partial response encoding and Viterbi detection techniques as applied within an experimental disk drive. A digital Viterbi detector that reportedly avoided an equalization process and was capable of withstanding lower signal to noise ratios is described in Matsushita et al. U.S. Pat. No. 4,847,871. These documents are representative examples of the known state of the prior art.

When zoned data recording techniques, embedded servo sectors, and e.g. thin-film heads are employed in a high performance, very high capacity, low servo overhead disk drive, the prior approaches are not adequate, and a hitherto unsolved need has arisen for an approach incorporating PR4,ML techniques into a high capacity, high performance, low cost disk drive architecture including architectural features such as e.g. thin-film heads, embedded sector servo based head positioning, and zone-data-recording techniques.

SUMMARY OF THE INVENTION

A general object of the present invention is to provide an improved, high performance, high capacity miniature disk drive electrical architecture employing a PR4,ML data channel.

A general object of the present invention is to provide an improved disk drive architecture employing PR4,ML techniques, embedded servo sectors, zoned data recording, and analog/digital adaptivity which overcomes limitations and drawbacks of the prior art.

A more specific object of the present invention is to provide a PR4, ML channel within a disk drive which includes a highly programmable analog section and a highly programmable and adaptive digital section in order to adapt to particular hardware tolerances and data channel conditions of the disk drive.

Another object of the present invention is to provide an analog/digital chip set architecture for implementing a PR4,ML coded data read/write channel within a high performance, high data storage capacity disk drive. A related specific object of the present invention is to provide a PR4,ML chip set for a disk drive including an analog chip and a digital chip, and wherein each chip includes an on-board state machine controller for controlling operating modes, and power down modes in real time, thereby adaptively reducing power consumption in function of a particular operating mode.

Another object of the present invention is to provide a (0,4,4) PR4, ML data channel employing an improved encoder-decoder/serializer-deserializer (herein "ENDEC/SERDES").

A further object of the present invention is to provide an improved Viterbi detector within a PR4, ML data channel of a disk drive having programmable detection threshold levels.

Another object of the present invention is to provide methods for rapidly adapting data channel response within a PR4,ML disk drive data channel.

One more object of the present invention is to provide an adaptive equalizer including a digital finite impulse response ("FIR") filter within a PR4, ML disk drive data channel.

Yet one more object of the present invention is to provide a filter coefficient adaptation circuit for adapting an FIR filter within a PR4, ML disk drive data channel.

A related object of the present invention is to provide a digital FIR filter and a digital filter coefficient adaptation circuit for adapting the digital FIR filter to a desired particular response of a PR4,ML disk drive data channel.

Yet another related object of the present invention is to provide a filter training method for adapting the characteristics of an FIR filter with a filter channel adapter circuit within a PR4, ML disk drive data channel, by using the sign of a sync pattern in combination with a pseudo-random sequence of data values otherwise present for data error correction purposes.

A further object of the present invention is to provide a method for training a digital FIR filter to achieve a desired particular response within a PR4,ML disk drive data channel.

Another object of the present invention is to provide rapidly acting gain, frequency and phase timing acquisition control loops employing some common digital loop filter circuitry within a PR4,ML data channel of a disk drive which also includes embedded sector servo and/or zone data recording techniques, so that gain and phase may be rapidly adjusted following interruption by an embedded servo sector, or upon switching from one data zone to another. In this regard, a related object of the present invention is to provide a dual mode timing control loop within a PR4, ML data channel of a disk drive. A further related object of the present invention is to provide an improved method for generating a VCO control signal within a dual mode timing loop of a PR4, ML data channel of a disk drive. One further related object of the present invention is to provide a zero phase start phase lock loop within a data synchronizer of a PR4, ML data channel of a disk drive. Yet another related object of the present invention is to provide a dual mode gain control loop within a PR4, ML data channel of a disk drive.

Another object of the present invention is to provide a method for using a PR4, ML data channel in an asynchronous mode in order to recover head position servo information within servo sectors embedded within concentric data tracks of a disk drive wherein the servo information is recorded at a different frequency and phase than the coded user data elsewhere recorded in the data track.

Another object of the present invention is to provide a digital peak detector for asynchronous detection of servo information and for synchronous detection of sync pattern information embedded in a data track of a disk drive employing a PR4, ML data channel.

One more object of the present invention is to provide a data ID field sync pattern detection method with improved fault tolerance within a PR4,ML disk drive data channel.

Yet another object of the present invention is to provide a highly programmable digital controller for controlling a PR4,ML disk drive data channel to enable and enhance power reduction techniques, for example.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 5 is a simplified diagram of a recording pattern formed on a data storage surface of the FIG. 4 disk drive, illustrating data zones and embedded servo sector patterns.

FIG. 6 is an enlarged lineal depiction of a segment of one data track within the multiplicity of data tracks defined within the FIG. 5 data layout plan, illustrating one data field which has been split into segments by regularly occurring embedded servo sectors.

FIG. 6A is an enlarged diagrammatic representation of flux transitions comprising one of the embedded servo sectors of the FIG. 6 lineal data track segment depiction.

FIG. 6B is an enlarged diagrammatic representation of flux transitions comprising one of the data ID headers of the FIG. 6 lineal data track segment depiction.

FIG. 43 is a table illustrating fault tolerance in detection of the FIG. 42A sync pattern in accordance with aspects of the present invention.

In the electrical block diagrams briefly described above, various vertical boxes containing hatching sometimes appear. In some but not all instances, these boxes are described in the following text. In all cases, these boxes represent clock cycle delay registers. Thus, by counting the number of vertical hatched boxes within a particular block or path, the reader will determine the number of clock cycle delays.

System Overview

Figure 4:
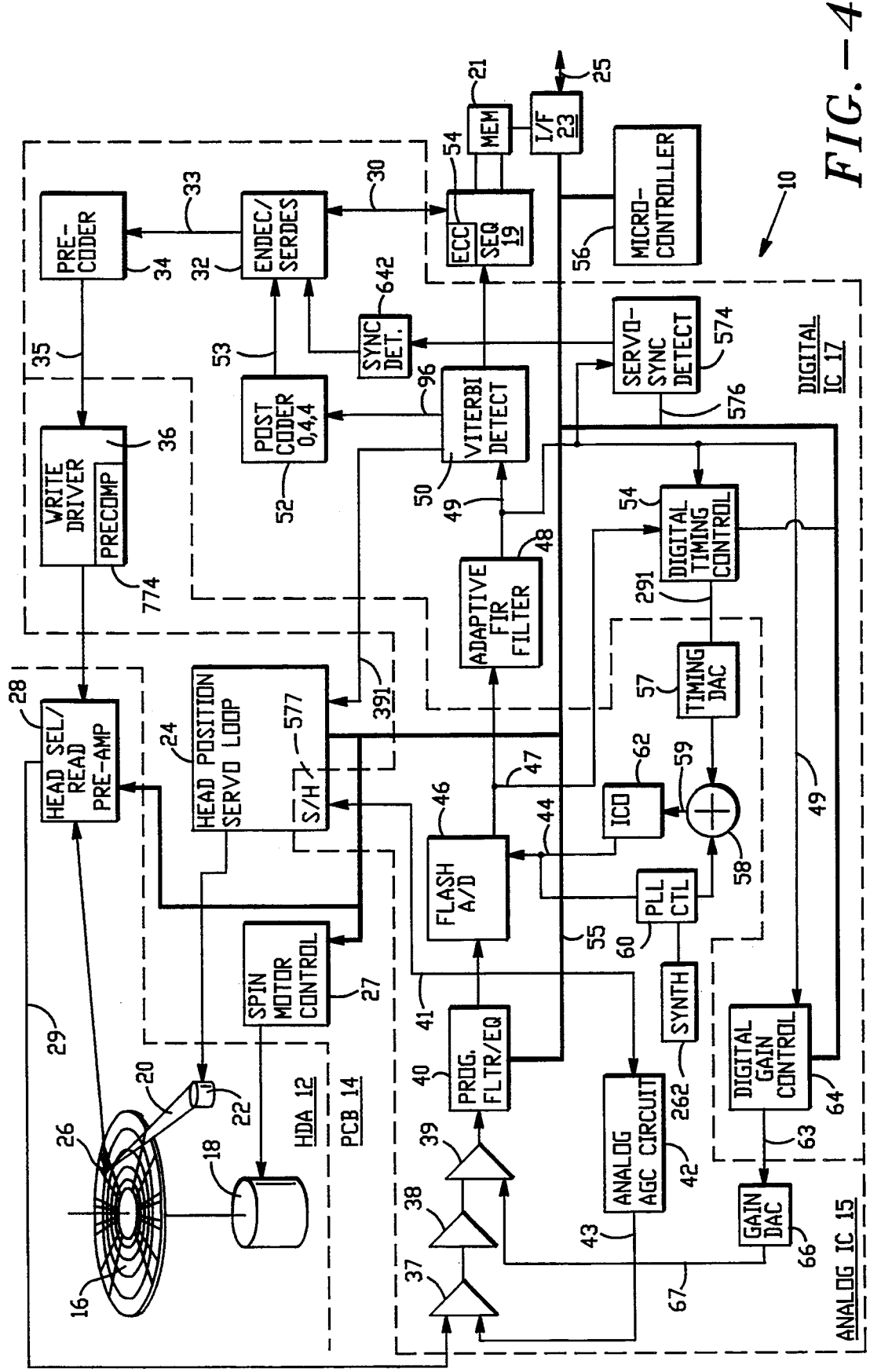
FIG. 4 is a simplified overall system block diagram of a disk drive including a PR4, ML write/read channel architecture incorporating principles and aspects of the present invention.

With reference to FIG. 4, an exemplary high performance, high data capacity, low cost disk drive 10 incorporating a programmable and adaptive PR4,ML write/read channel in accordance with the principles of the present invention includes e.g. a head and disk assembly ("HDA") 12 and at least one electronics circuit board (PCB) 14. The HDA 12 may follow a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, copending U.S. patent application Ser. No. 07/881,678, filed on May 12, 1992, and entitled "Hard Disk Drive Architecture". The disclosures of these patents and this application are incorporated herein by reference thereto.

The electronics PCB 14 physically supports and electrically connects the circuitry for an intelligent interface disk drive subsystem, such as the drive 10. The electronics circuitry contained on the PCB 14 includes an analog PR4, ML read/write channel application-specific integrated circuit (ASIC) 15, a digital PR4, ML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 55 for controlling operations of the sequencer 19, interface 23, a servo loop 24, a spindle motor controller 27, a programmable analog filter/equalizer 40, adaptive FIR filter 48, Viterbi detector 50, and a digital timing control 54 as well as a digital gain control 64. The micro-controller 56 is provided with direct access to the DRAM memory 21 via the sequencer/memory controller 19 and may also include onboard and outboard read only program memory, as may be required or desired.

The printed circuit board 14 also carries circuitry related to the head positioner servo 24 including e.g. a separate microprogrammed digital signal processor (DSP) for controlling head position based upon detected actual head position information supplied by a servo peak detection portion of the PR4,ML read channel and desired head position supplied by the microcontroller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An e.g. in-line data transducer head stack assembly 20 is positioned e.g. by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g. thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PR4, ML data channel, such as MiG heads or magneto-resistive heads, for example.

The heads 16 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g. sputter-deposited with a suitable multi-layer magnetic thin film and a protecting carbon overcoat in conventional fashion, for example. Other disks and magnetic media may be employed, including plated media and or spin-coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 4 exteriorly of the HDA 12 in an arrangement as described in the referenced copending U.S. patent application Ser. No. 07/881,678, filed on May 12, 1992, and entitled "Hard Disk Drive Architecture".

A bidirectional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4 precoding algorithm $1/(1 \oplus D^2)$. The precoded data is then passed over a path 35 to a write driver circuit 36 within the analog IC 15 wherein it is precompensated by a write precompensation circuit 774 and is then delivered via a head select function within the circuit 28 to the selected data transducer head 26. The head 26 writes the data as a pattern of alternating flux transitions within a selected data track 71 of a block 72 of data tracks defined on a selected data storage surface of the disk 16, see FIGS. 5 and 6. Embedded servo patterns are written by a servo writer, preferably in accordance with the methods described in a commonly assigned U.S. patent application Ser. No. 07/569,065 filed on Aug. 17, 1990, entitled "Edge Servo For Disk Drive Head positioner, now U.S. Pat. No. 5,170,299, the disclosure thereof being hereby incorporated by reference.

Returning to FIG. 4, during playback, flux transitions sensed by the e.g. thin film data transducer head 26 as it flies in close proximity over the selected data track 71 are preamplified by the read preamplifier circuit 28. The preamplified analog signal (or "read signal") is then sent to the analog IC 15 on a path 29 and into an analog variable gain amplifier (VGA) 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital (A/D) converter 46 which, when synchronized to user data, generates raw data samples $\{x_k\}$ samples.

Figure 1:
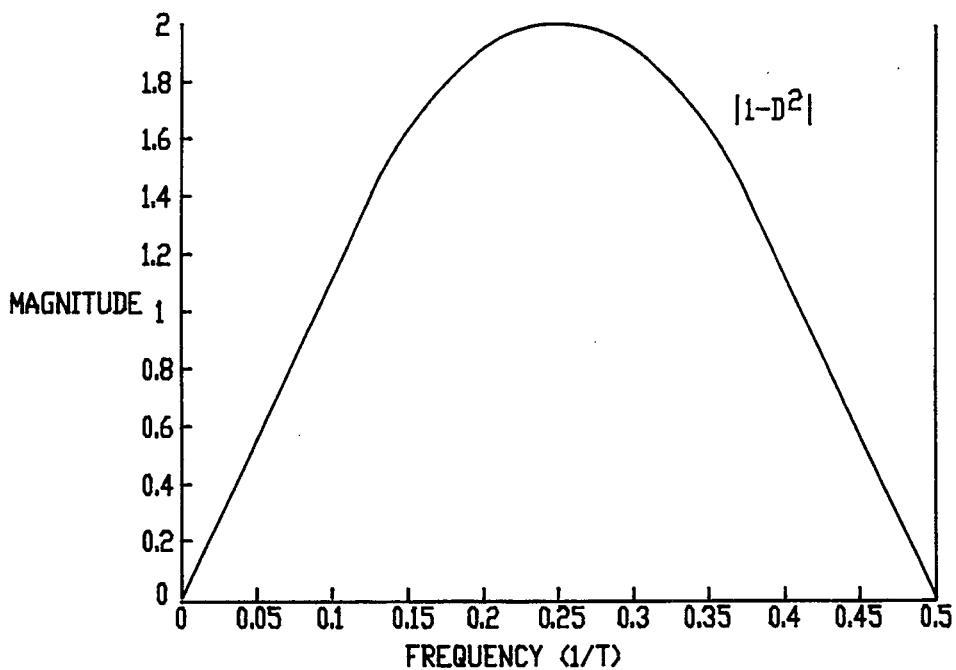
FIG. 1 is a graph of an idealized PR4 channel magnitude response spectrum.
Figure 3:
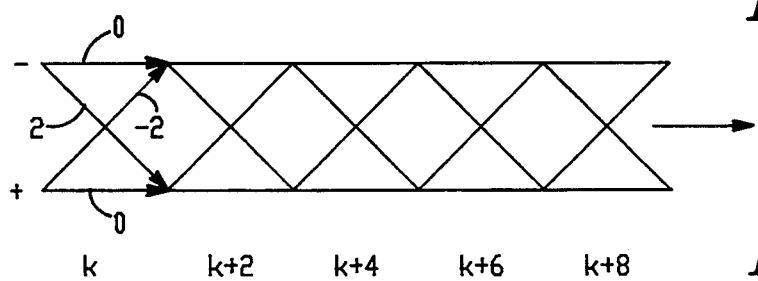
FIG. 3 is a trellis diagram exemplary of a Viterbi detector in detecting a maximum likelihood data sequence occurring within one interleave of a PR4 data stream.

The FIR filter 48 employs adaptive filter coefficients for filtering and conditioning the raw data samples $\{x_k\}$ in accordance with the desired PR4 channel response characteristics, as plotted in FIG. 1, in order to produce filtered and conditioned samples $\{y_k\}$. The bandpass filtered and conditioned data samples $\{y_k\}$ leaving the filter 48 are then passed over a path 49 to the Viterbi detector 50 which detects the data stream, based upon the Viterbi maximum likelihood algorithm employing a lattice pipeline structure implementing a trellis state decoder of the type illustrated in FIG. 3, for example. At this stage, the decoded data put out on a path 96 is in accordance with a (0,6,5) coding convention. A postcoder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and puts out eight bit user bytes which then pass into the sequencer 19 over the data path 30.

In order for the present system to work properly, the raw data samples $\{xk\}$ must be taken on the incoming analog signal waveform at precisely proper, regular locations. A dual mode timing loop is provided to control the frequency and phase of the flash analog to digital converter 46. The timing loop includes an analog timing control circuit 60, and a digital timing control circuit 54 and a timing DAC 57. A timing phase locked synthesizer circuit 262 supplies synthesized timing signals to the control circuit 60 and a timing reference signal to a summing junction 58. A sum put out by the summing junction 58 controls a current controlled oscillator 62 in order to clock the A/D 46. The oscillator 62 also includes zero phase start circuitry to provide controlled startup at an approximately correct phase with the incoming data samples.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

Data Recording Pattern

As shown in FIG. 5, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outermost zone 70-1, and radially inward zones 70-2, 70-3, 70-4, 70-5, 70-6, 70° 7, 70-8 and 70-9, for example. In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

FIG. 5 also depicts a series of radially extending embedded servo sectors 68 which e.g. are equally spaced around the circumference of the disk 16. As shown in FIG. 6, each servo sector includes a servo preamble field 68A, a servo identification field 68B and a field 68C of circumferentially staggered, radially offset, constant frequency servo bursts, for example. In addition to data fields 76 which store user data information and error correction code syndrome remainder values, for example, each data track has certain overhead information such as the FIG. 6 data block header fields 74, and data block ID fields 78. While the number of data sectors per track varies from data zone to data zone, in the present example, the number of embedded servo sectors 68 per track remains constant throughout the surface area of the disk 16. In this present example the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface. Also, the information recorded in the servo ID field 68B of each servo sector 68 is e.g. prerecorded with servowriting apparatus at the factory at a predetermined relative low constant frequency, so that the servo information will be reliable at the innermost track location, e.g. within the innermost zone 70-9. While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference.

Each data sector is of a predetermined fixed storage capacity or length (e.g. 512 bytes of user data per data sector); and, the density and data rates vary from data zone to data zone. Accordingly, it is intuitively apparent that the servo sectors 68 interrupt and split up at least some of the data sectors or fields into segments, and this is in fact the case in the present example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference. A presently preferred servo sector pattern is described in the referenced, copending U.S. patent application Ser. No. 07/569,065, now U.S. Pat. No. 5,170,299.

As shown in FIG. 6, a data track 71 includes a data block 76 for storage of a predetermined amount of user data, such as 512 or 1024 bytes of user data, recorded serially in 0,4,4 code bits in data field segments 76A, 76B and 76C of the depicted track segment. The data block 76 is shown in FIG. 6 to be interrupted and divided into segments of unequal length by several servo sectors 68 which contain embedded servo information providing head position information to the disk drive 10. Each data block 76 includes a block ID header field 74 at the beginning of the data block and a data ID header field 78 immediately preceding each data field segment including the segment 76A following the ID header 74, and the segments 76B and 76C following interruption by servo sectors 68. The data header field 78 is written at the same time that data is written to the segments 76A, 76B and 76C for example, and write splice gaps therefore exist just before each data ID header 78, before ID fields, and before servo fields, for example.

Analog Programmable Filter-Equalizer 40

The programmable analog filter-equalizer 40 is preferably a 7th order low pass filter with two programmable opposing zeros added for high frequency boost. The filter bandwidth and zero locations are each individually adjustable via control through a serial control port 778 of the analog IC 15 which is written to, and read from, by the microcontroller 56 via the bus 55 and sequencer 19 and a serial data interface to the IC 15. The cutoff frequency and zero locations of the filter 40 are set in relation to the output of a frequency synthesizer 262 within the analog IC 15. The filter 40 is designed so that the output DC bias does not change as the amplitude of the incoming signal stream varies.

Figure 7:
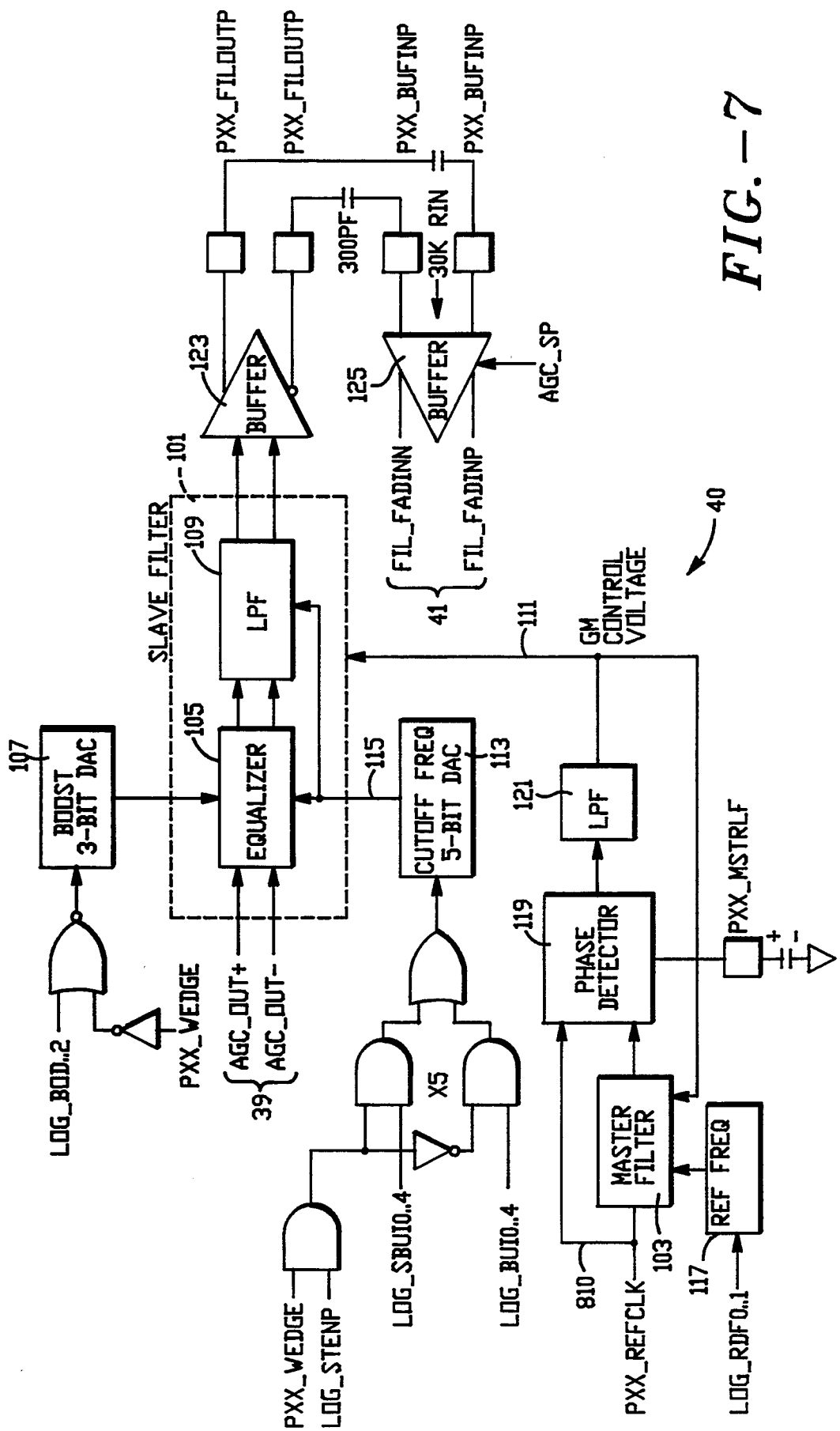
FIG. 7 is a detailed block diagram of a programmable analog filter/equalizer circuit within the FIG. 4 disk drive architecture.

A presently preferred embodiment of the analog adaptive filter-equalizer 40 is shown in FIG. 7. The differential analog signal from the VGA 38 enters the filter-equalizer circuit block 40 on a path 39 and immediately enters a slave filter 101 which is under the control of a master filter 103. The slave filter 101 includes a programmable equalizer 105 having a programmable high frequency boost characteristic which is controlled via a boost control DAC 107 in accordance with three-bit frequency boost programming values held in control registers of the analog IC 15. The DAC 107 controls selection of the two opposed zeros which are symmetrical with respect to the J-omega axis.

Five-bit cutoff frequency information related to data zone (and five bit cutoff frequency related to servo frequency) is supplied from control registers of the analog IC 15 to a cutoff frequency DAC 113 which converts the information into an analog control and supplies the control over a control path 115 to the slave filter 101.

Following analog signal channel equalization in the circuit 105, the analog signal is low pass filtered in a programmable low pass filter 109. The low pass filter is programmed by the master filter 103 in accordance with a Gm control voltage which is sent from a master control loop including the master filter 103 to the slave low pass filter 109 via a path 111.

A system reference clock on a path 810 is distributed to the master filter 103 and to a phase detector 119 within the master filter control loop. An output from the master filter 103 is also applied to the phase detector 119. The master reference clock REFCLK frequency on the path 810 is maintained constant regardless of the particular data zone 70 being followed at any particular time. Two bits comprising control values are transferred into a decode circuit 117. The decode circuit 117 converts the bit selection into an appropriate control signal and applies it to the master filter 103. Any phase error between REFCLK and the output from the master filter 103 is detected by the phase detector 119. A resultant error signal is then low pass filtered and accumulated in a low pass filter 121 and fed back to the master filter 103 (and to the slave filter 109) over the Gm control path 111. Thus, elements 119 and 121 comprise with master filter 103 a phase locked master filter control loop for controlling the characteristics of the slave LPF 109 to maintain it at the desired passband characteristics and cutoff frequency for the selected data zone 70.

The output from the slave filter 101 comprising the equalized, low pass filtered analog read signal is then buffered in a first buffer stage 123, AC coupled to a fixed gain amplifier stage 125 via capacitors connected external to the analog IC 15, and then put out over a path 41 to the flash A/D converter 46.

Flash Analog to Digital Converter 46

Figure 8:
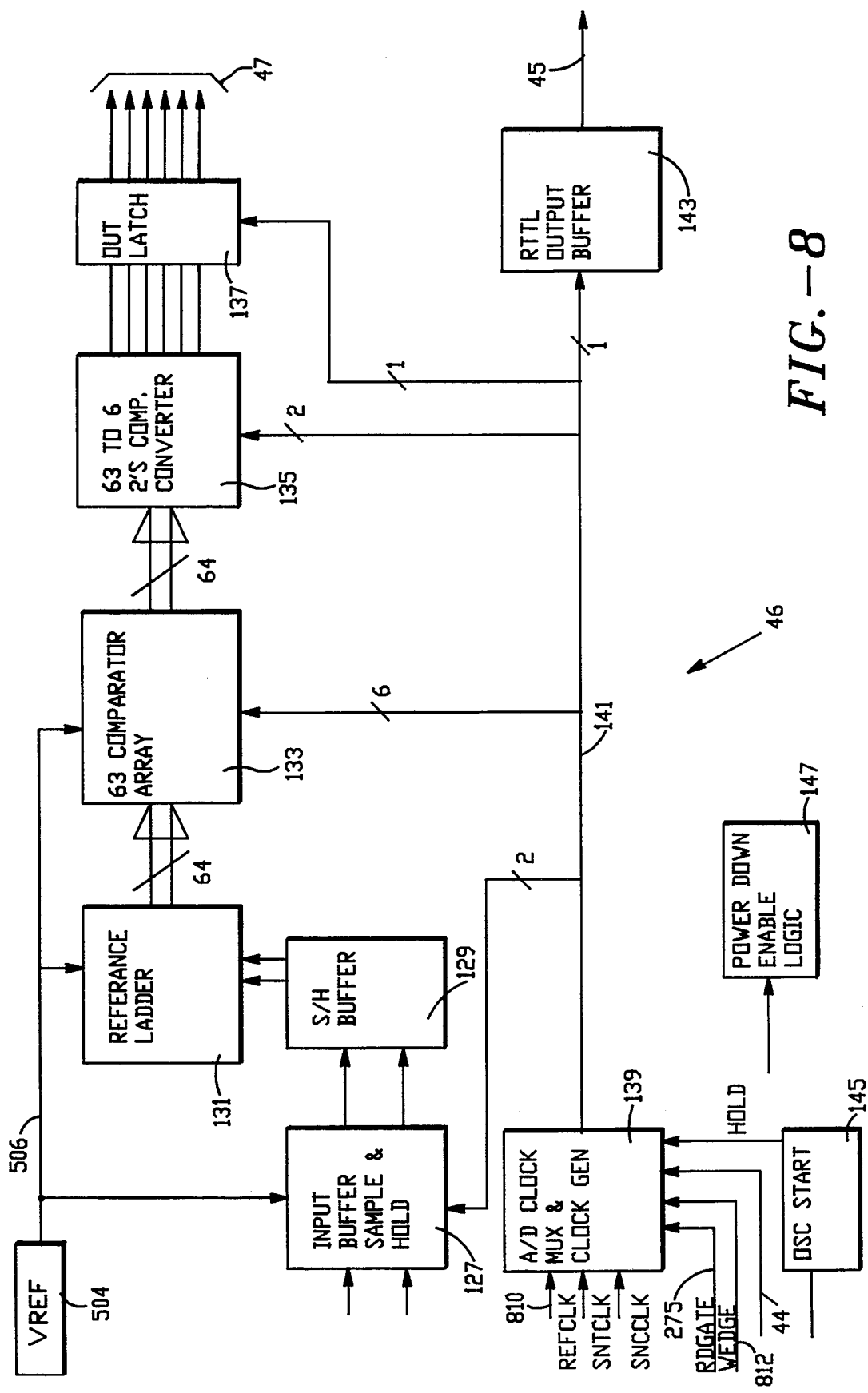
FIG. 8 is a detailed block diagram of a flash analog to digital converter used for quantizing data samples within the FIG. 4 disk drive architecture.

The flash A/D converter 46 is illustrated in FIG. 8 as a differential input 6 bit flash converter which is capable of running at a clocking rate of e.g. 78 MHz or higher. The A/D converter 46 receives the amplified and conditioned analog read signal over the path 41. An input buffer/sample & hold circuit 127 receives and holds the incoming read signal and supplies the analog samples to a sample & hold buffer 129. The buffer 129 feeds the analog samples into a reference ladder network 131. The reference ladder network puts out 64 values to a 63 comparator array 133. The resultant 063 binary values are provided over 64 lines to a 63 to 6 two's complement converter 135 which converts the values into six bit values in two's complement format. These converted values are then held in an output latch 137 and put out as the raw six bit digital samples $\{x_k\}$ over the path 47.

The digital 2s complement 6-bit samples $\{x_k\}$ represent amplitude of the analog read back signal voltage at the sample point of each sample. The samples $\{x_k\}$ nominally have values which are representative of values lying between plus and minus unity, for example. A glitchless multiplexer/clock generator 139 controls switchover between the data code clock ADCLK on the path 44 and the reference clock REFCLK on the path 810 in accordance with the read gate and servo time signals RDGATE and WEDGE provided respectively on the paths 275 and 812. The actual location (and amplitude value) of each sample upon the incoming waveform is governed by clocking signals put out by the glitchless multiplexer and clock signal generator 139 which puts out e.g. 11 clock phases over a clock bus 141 in order to control timing of operation of the analog to digital converter 46. Two clock phases are provided to the input buffer/sample & hold 127, six clock phases are provided to the comparator array 133, two clock phases are provided to the converter 135, and one phase is provided to control the output latch 137. An output buffer/driver 143 supplies the clock ADCLK to circuits external to the converter 46 including the circuits on the digital integrated circuit 17. ADCLK on the path 45 (sometimes also referred to as REFCLK in connection with the IC 17 circuitry) is maintained free of glitches or partial pulses at all times.

The A/D converter 46 is clocked either by a synchronous SAMPLECLK signal generated by the timing loop or by the REFCLK input, such as during servo wedge time when a servo sector 68 is passing beneath a data transducer head 26. If the read gate signal RDGATE and the servo time signal WEDGE are both not active, clocking of the flash A/D converter 46 is disabled to reduce switching noise on the power supply lines of the analog IC 15. An oscillator start control circuit 145 controls startup of the clock generator 139. Enable logic 147 enables the analog to digital converter 46 to be powered down under program control to save power consumption.

Viterbi Detector 50

Figures 9, 33:
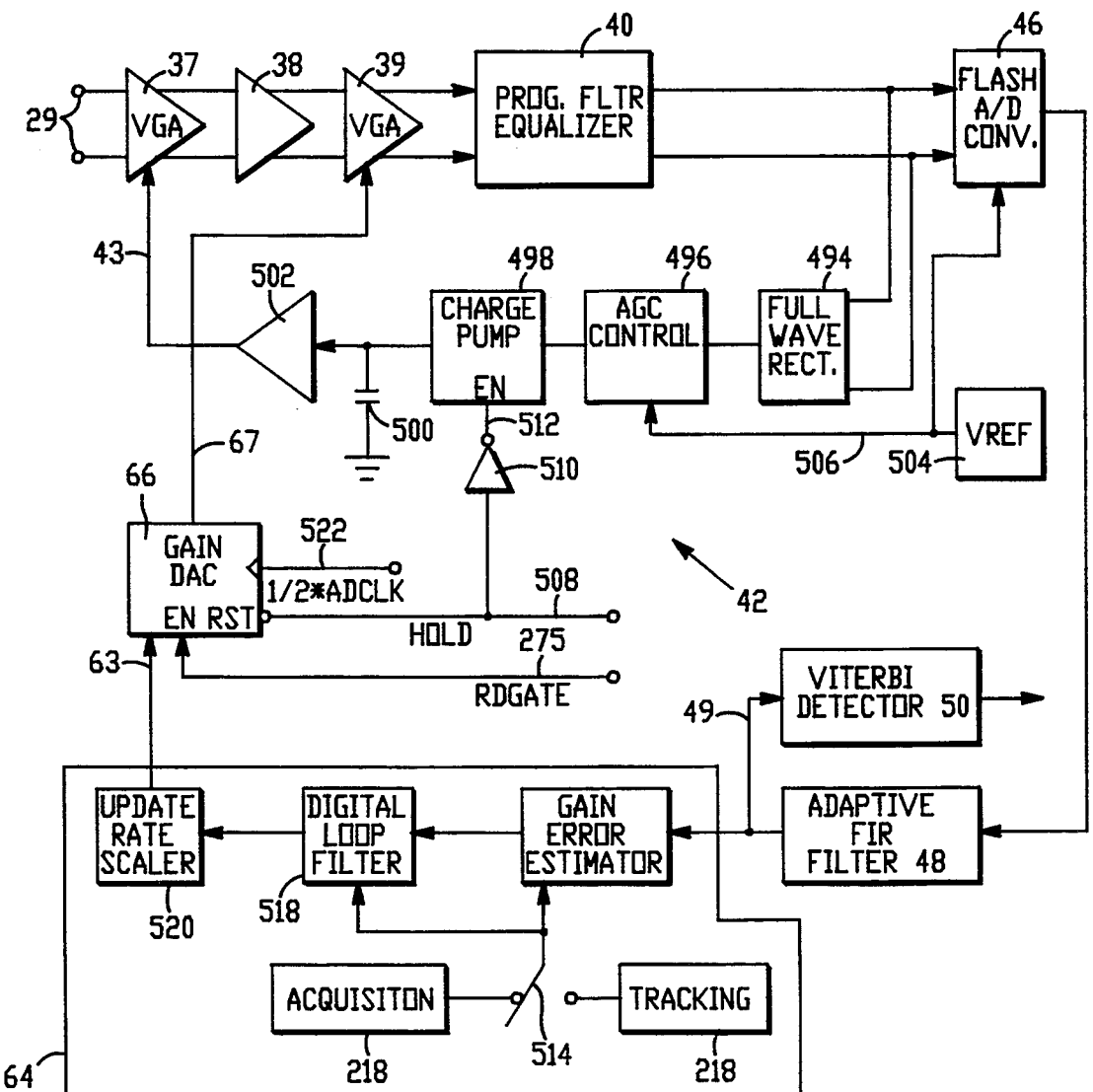
FIG. 9 is a table summarizing the trellis decode logic states of a PR4, ML Viterbi detector within the FIG. 4 disk drive architecture.
FIG. 33 is a functional block diagram of a multi-mode analog and digital gain control loop of the FIG. 4 PR4,ML disk drive architecture in accordance with aspects of the present invention.
Figure 10:
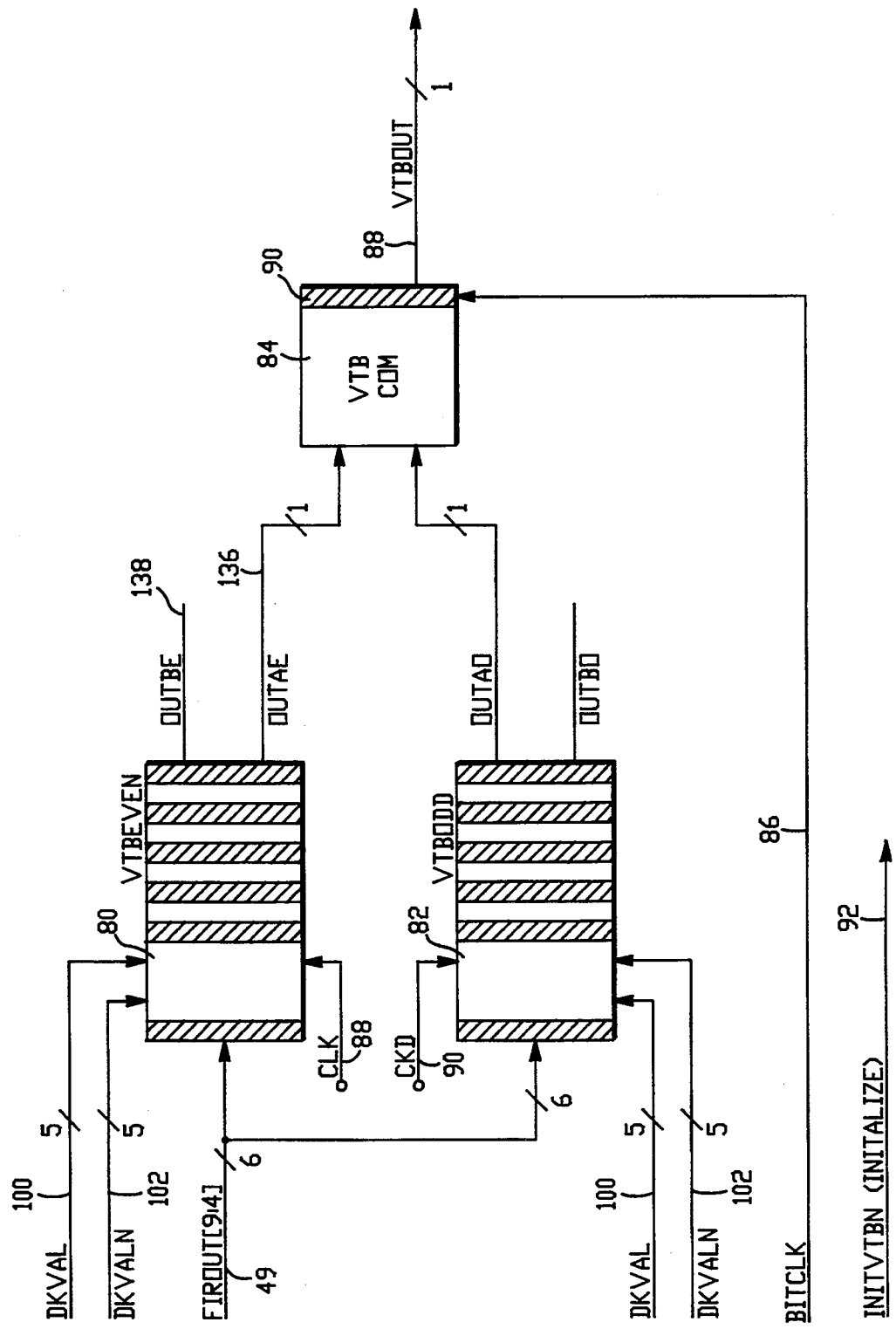
FIG. 10 is an overview block diagram of a Viterbi detector of the FIG. 4 disk drive architecture incorporating principles of the present invention.

The PR4 Viterbi detector 50 determines coded data values based upon the states tabulated in the FIG. 9 table. As shown in the FIG. 10 overview, the Viterbi detector 50 includes two identical interleave decoders: an even interleave decoder 80, and an odd interleave decoder 82. Each decoder 80, 82, receives incoming data via the path 49 from the adaptive FIR filter 48. A halved rate clock signal is used to clock each decoder 80, 82: e.g., a 36 MHz even interleave clock signal on a line 88 and a 36 MHz, phase reversed odd interleave clock signal on a line 90. Each interleave decoder 80, 82 provides two outputs: OutA and OutB. Under normal error free data decoding situations, the two outputs of each decoder 80 or 82 will be the same, so that only one of these outputs (e.g. OutA) is used for the data output.

In an error situation, OutA will not equal OutB, and this condition represents an error flag or pointer to an erasure or hole in the data stream. The error flag which may advantageously be used by error correction circuitry 54 within the sequencer 19 as a location pointer to a data error requiring ECC intervention and correction on-the-fly. When the error burst location is known, the processing required of the ECC circuit 54 is accordingly limited to determination of error correction values; and, with burst error locations being determined by the Viterbi detector 50, more burst errors may be accommodated on-the-fly than with prior approaches. In this regard, commonly assigned U.S. Pat. No. 4,730,321, U.S. patent application Ser. No. 07/650,791 filed Feb. 1, 1991, and U.S. patent application Ser. No. 07/820,283 filed Jan. 9, 1992, are pertinent, and the respective disclosures thereof are hereby incorporated herein by reference thereto.

The outputs from the interleave decoders 80 and 82 are alternatively selected by a 2:1 multiplexer 82 which provides a multiplexed output over a line 88 via a latch 90 which is clocked at the original BITCLK clocking rate (e.g. 72 MHz) on the path 86. The multiplexer 84 is clocked by a signal derived e.g. from the even clock signal on the path 88.

Heretofore, practice has been to normalize the playback information external to the Viterbi detector, and prior designs have proceeded upon the assumption that the incoming information levels are either a positive constant, zero or a negative constant (e.g., +1, 0, −1). This prior approach has been used when transducers had substantially "under-shoot free" characteristics, such as the characteristics associated with magnetoresistive head technology. With this prior approach, adequate channel equalization has been achieved by using simple, programmable analog filters upstream of the analog to digital converter.

Even though the disk drive 10 employs zoned data recording in an effort to normalize flux densities across the radially expansive data storage surface, there are still variations in flux density from data zone to data zone. In order to take into account these variations and to permit use of e.g. thin film heads which may manifest substantial under-shoot in their response to recorded flux transitions, the adaptive digital FIR filter 48 is used. The amount of equalization performed in the adaptive FIR filter 48 will influence the optimal threshold levels used in the Viterbi detector in a system using fixed point arithmetic. These conditions have led to the present discovery that adjustment of the threshold levels within the Viterbi detector 50, as well as distributed gain level adjustments and signal normalization throughout the PR4, ML data channel, significantly improve overall data channel performance.

In addition, programmable threshold levels make the task of mapping media defects with the present PR4, ML read channel much easier. In carrying out defect mapping, the detection thresholds are raised incrementally by the controller 56 until the Viterbi detector 50 starts making detection errors. These errors will first occur only at marginal data storage locations on the disk 16. This capability thus provides a very effective media test which may be carried out by the disk drive itself, after assembly, and periodically during its useful lifetime.

The even and odd interleave decoders 80 and 82 are provided with two programmable threshold levels on lines 100 and 102, the line 100 carrying a programmable positive threshold level dkval, and the line 102 carrying a programmable negative threshold level dkvaln. The positive threshold on the line 100, and the negative threshold on the line 102 are programmable within amplitude ranges LP and LN. The positive and negative threshold programming values are preferably stored in on-board registers of the register file 804 of the digital chip 17. The microcontroller 56, during idle mode, will update the dkval registers for each different data zone 70-1 to 70-9, for example. Thus, the Viterbi detector 50 is tuned to a correct threshold operating condition for each particular data zone.

Figure 2:
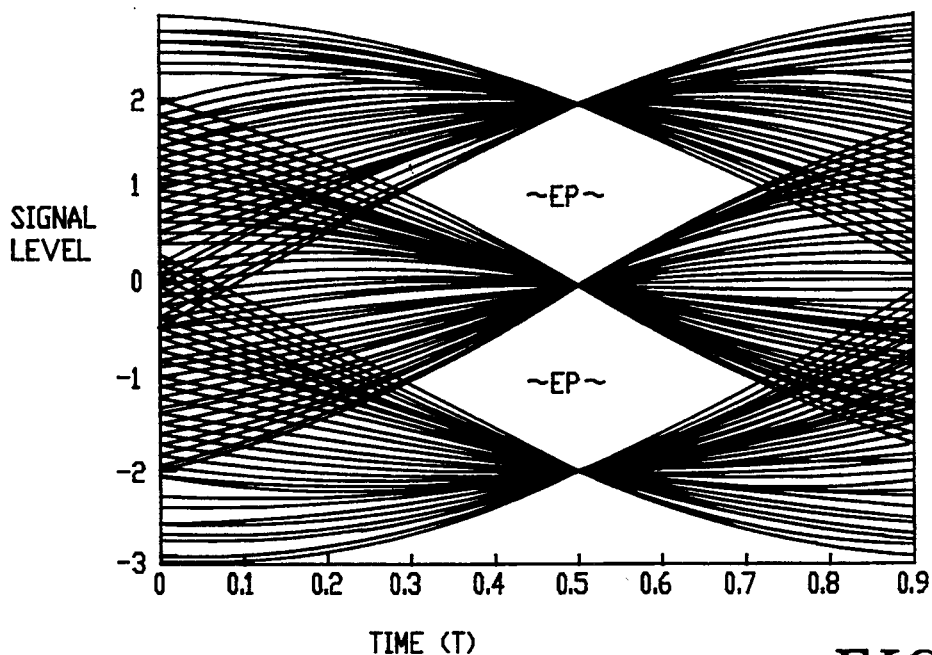
FIG. 2 is an exemplary ternary or "eye" diagram illustrating detection of signal levels in a PR4 channel.

The dkval settings are initially determined by the particular characteristics of the disk drive 10. In practice, the disk drive 10 is placed upon a test stand and tested to determine correct values for dkval for each zone. For example, a digital version of the ternary eye pattern EP FIG. 2, is observed upon an instrument and optimized (maximum vertical distance between levels) for each zone by adjustment of dkval. Each value is then recorded in firmware for the particular drive. The optimum dkval is one which enables the lowest error rate at the output of the Viterbi detector 50. This optimum level is often approximated by the particular dkval which achieves the highest signal to noise ratio at the output of the digital adaptive FIR filter 48. Further, the absolute values of the threshold ranges LP and LN are normally one half of the value of dkval, but the threshold ranges LP and LN are preferably programmable, so that the PR4,ML channel can be "marginalized" in order to determine its overall performance characteristics, and to carry out defect mapping, as explained above.

In order to start the Viterbi detector 50 at the proper time as well as to power down the detector 50 under program control, an initialization control signal INITVTBN is supplied over a line 90. The INITVTBN signal is an asynchronous clear pulse which is asserted before any user data arrives.

Figure 11:
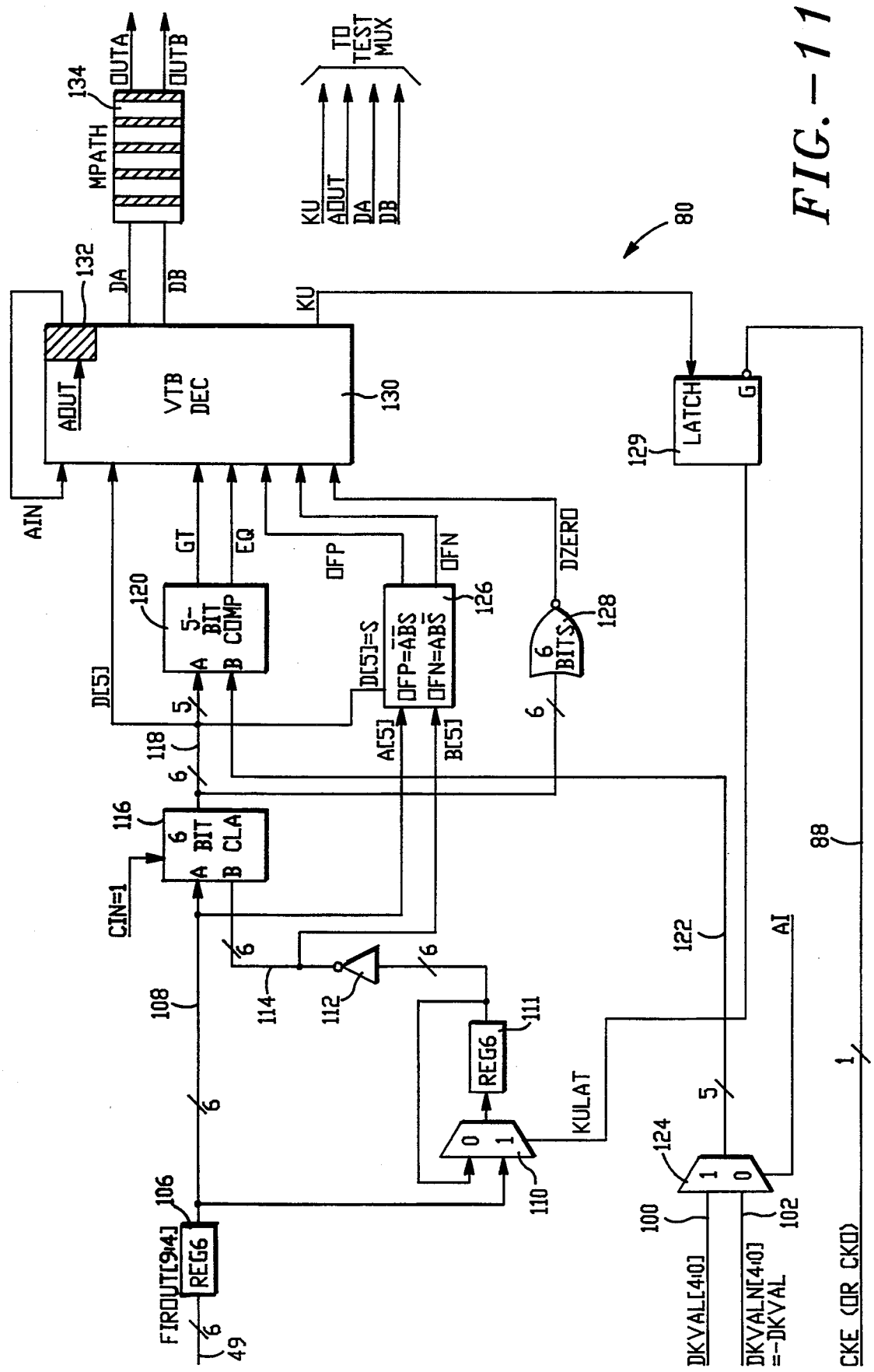
FIG. 11 is a more detailed block diagram of one interleave decoder circuit within the FIG. 10 Viterbi detector.

Turning now to FIG. 11, the even interleave decoder 80 is depicted, although its description equally applies to the identical odd interleave decoder 82 which operates on the odd clock cycle CKO in the same manner as the even interleave decoder on the even clock cycle CKE. The incoming information stream from the adaptive FIR filter 48 enters the even interleave decoder 80 over the path 49 and is latched into a clock delay register 106. A latched output on a path 108 enters a 6 bit carry-lookahead-adder (CLA) circuit 116 which functions as a very fast addition processor. An output from the register 106 is selected by a multiplexer 110 and delayed by a register 111 and then inverted by an inverter 112. The output from the inverter 112 enters the adder 116 on a path 114. The adder 116 adds an incoming six bit information value on the path 108 with an inverted and one bit cycle delayed value on the path 114, to produce a six bit sum on a path 118. The output from the register 111 is fed back to the multiplexer 110, thereby creating a latch for holding the present value.

The sum put out over the path 118 enters a five-bit comparator 120. The comparator compares the low five bit positions of the sum value on the path 118 with a multiplexed, selected threshold value (dkval or dkvaln) on a path 122 which is obtained from a multiplexer 124. The multiplexer 124 receives the positive threshold value dkval on the path 100 and the negative threshold value dkvaln on the path 102 and alternately selects between the threshold values in accordance with a present state value ain put out by a latch 132 in conjunction with operation of a decision state machine 130 described below.

Thus, for each incoming information value, and for each threshold value, the comparator 120 puts out a greater-than value (GT) or an equal value (EQ). Overflow of the adder 116 is detected by an overflow circuit 126, which puts out an overflow-positive value (OFP) and an overflow-negative value (OFN) to the decision state machine 130. A zero sum detection circuit 128 determines if the output from the adder 116 is all zeros, and if so, puts out a zero detection value (DZERO) to the decision state machine 130. A value ku put out by the state machine 130 is fed into a latch 129, and the output thereof kulat is used to control the multiplexer 110.

In summary, the summed high order data bit value D5 on the path 118, the GT, LT, OFP, OFN, DZERO and the ain values are put into the Viterbi decision state machine 130. The state machine 130 provides four signals: aout, da, db and ku, in accordance with the following program expressed in pseudo-code, as follows:

```
module 130  (ai,gt,eq,d5,ofp,ofn,dzero,aout,ku,da,db);
input       ai,gt,eq,d5,ofp,ofn,dzero;
output      aout,ku,da,db;
begin
    if (ai = 1)
        if (((leq · gt) + (eq · lgt)) · ld5 · lofn + ofp)
            decode = 0100;
        else if ((dzero) + (d5 · lofp) + (ofn))
            decode = 1111
        else
            decode = 1010;
    else
        if ((ld5 · lofn) + ofp)
```

```
                decode = 0100;
          else if (((leq · lgt) + (eq · lgt)) · d5 · lofp + ofn)
                decode = 1111;
          else
                decode = 0010
    end
    {aout, ku,da,db} = decode;
endmodule
```

The aout output from the decision state machine 130 is held in the latch 132 and clocked as the ain input to the state machine 130 and applied to control the multiplexer 124. In accordance with the initialization signal on the path 90.

Two data outputs, da and db, from the state machine 130 are sent into a memory path circuit (MPATH) 134 which implements for the particular interleave a trellis decode logic table (FIG. 9). In the FIG. 9 table, the following values have the indicated meanings:
- ain = present state
- aout = next state (this value is clocked into the flip-flop 132 and becomes ain for the next clock cycle)
- y(k) = present data sample
- y(k-M) = sampling data delayed by M unit cycles
- da, db = outputs of the Viterbi detector 50
- ku = output of the Viterbi detector 50; this value is also used to control the value of M by enabling or disabling the clock of the register 110.

Figure 12:
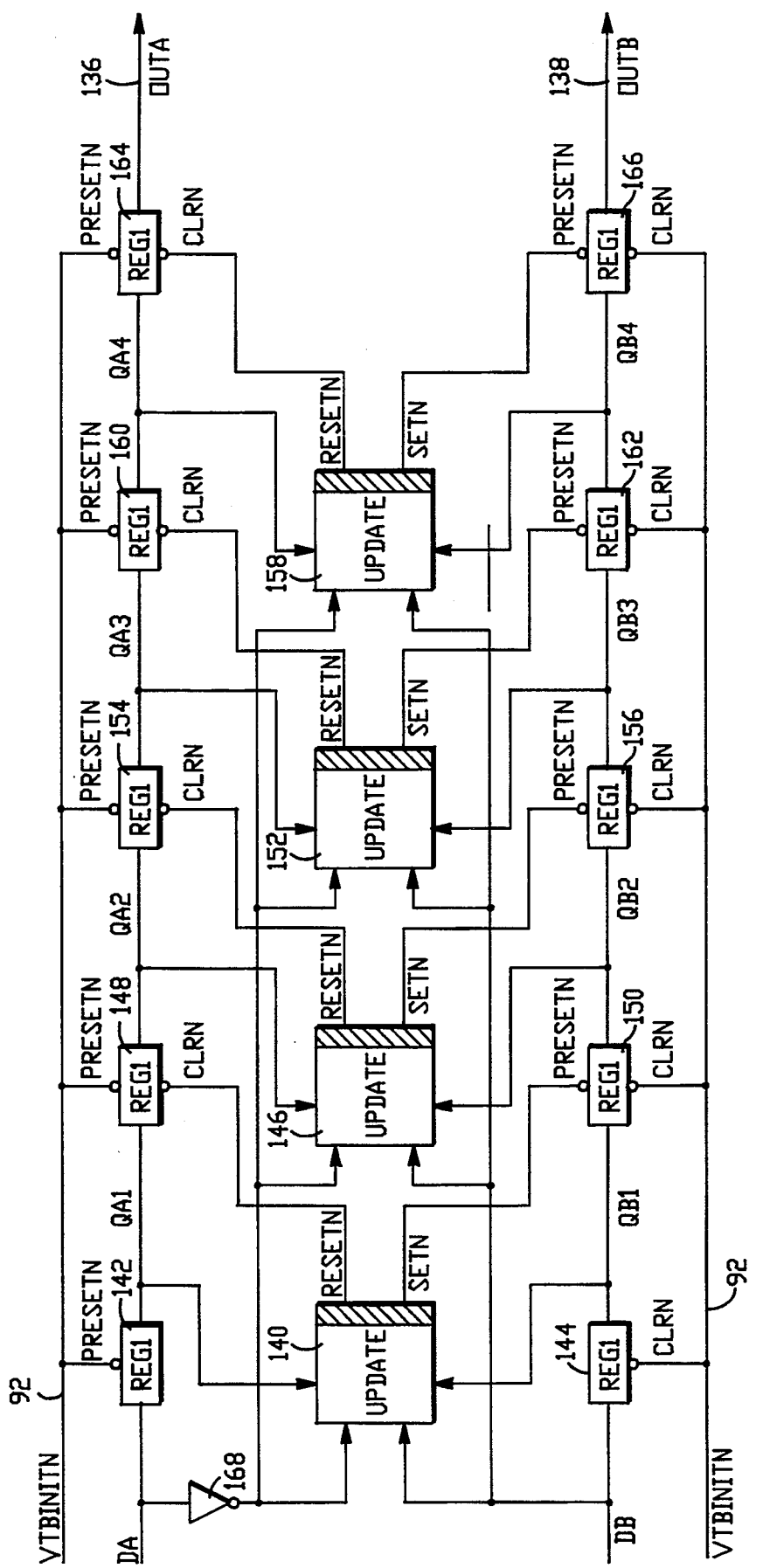
FIG. 12 is a detailed block diagram of a memory path circuit within the FIG. 11 interleave decoder circuit.

The MPATH circuit 134 is preferably implemented as shown in FIG. 12. The circuit 134 is clocked at the interleave clock rate (e.g. 36 MHz) on the path 88, and it is in the present example implemented with four pipeline update stages 140, 146, 152 and 158, and five pairs of registers 142–144, 148–150, 154–156, 160–162, and 164–166. Five register pair stages are used in order to satisfy the (0,6,5) code condition present at this location of the read channel.

Registers 142 and 144 provide outputs which are fed into update stage 140; registers 148 and 150 provide outputs which are fed into update stage 146; registers 154 and 156 provide outputs which are fed into update stage 152; and, registers 160 and 162 provide outputs which are fed into update stage 158. Registers 164 and 166 provide respectively the two Viterbi detector outputs OUTA and OUTB on the lines 136 and 138. Reset outputs of the update circuits 140, 146, 152 and 158 respectively clear registers 148, 154, 160 and 164, while set outputs of the same update circuits respectively preset registers 150, 156, 162 and 166. The initialization signal on the path 92 presets registers 142, 148, 154, 160 and 164, and clears registers 144, 150, 156, 162 and 166. An inverter 168 inverts the incoming da signal and supplies an inverse thereof as an input to the update circuits 140, 146, 152 and 158. The incoming db signal is provided directly as an input to the update circuits 140, 146, 152 and 158.

A logical decision will be made by the memory path circuit 134 upon incoming data within six clock cycles. Inputs da and db may have respective values of 00, 10 and 11. An input value of 01 is illegal and should not ever be present in the case of error free data. If the da and db inputs are respectively 00, the data is valid, and a decision is immediately reached that the data value is zero. If the input values are respectively 11, the data is again converged, and the data value is determined to be one. If the respective incoming da and db values are 10, the ultimate data value cannot be determined as the data paths are not converged, and so this data propagates from the first stage to the second stage, and so forth, until convergence occurs, at which point the data value is determined to be either zero or one. Operation of the MPATH circuit 134 is essentially in accordance with the values set forth in the table of FIG. 9.

Each of the logic update circuits 140, 146, 152, and 158 executes the same logical equations. There are four inputs to each update circuit: $\overline{Qa}$, Qb, $\overline{da}$ and db. There are two outputs from each update circuit: reset and set, which reset and set each pair of subsequent registers in accordance with the following equations:

$$\overline{RESET} = \overline{da.QA.QB}$$

$$\overline{SET} = \overline{db.QA.QB}$$

Ordinarily, for valid data, the outputs OUTA and OUTB on the paths 136 and 138 will be the same value. If there is no convergence within four clock cycles through the MPATH circuit 134, a data error condition (inequality) exists at the outputs 136 and 138. This inequality or "erasure flag" can be easily tested by an exclusive-OR gate and used to signal the error correction circuitry 54 that a data error location has been located. The ECC circuitry 54 then need only calculate the error value for that location, using a simplified and more rapidly executed on-the-fly error correction procedure.

Adaptive FIR Filter 48

Figure 13:
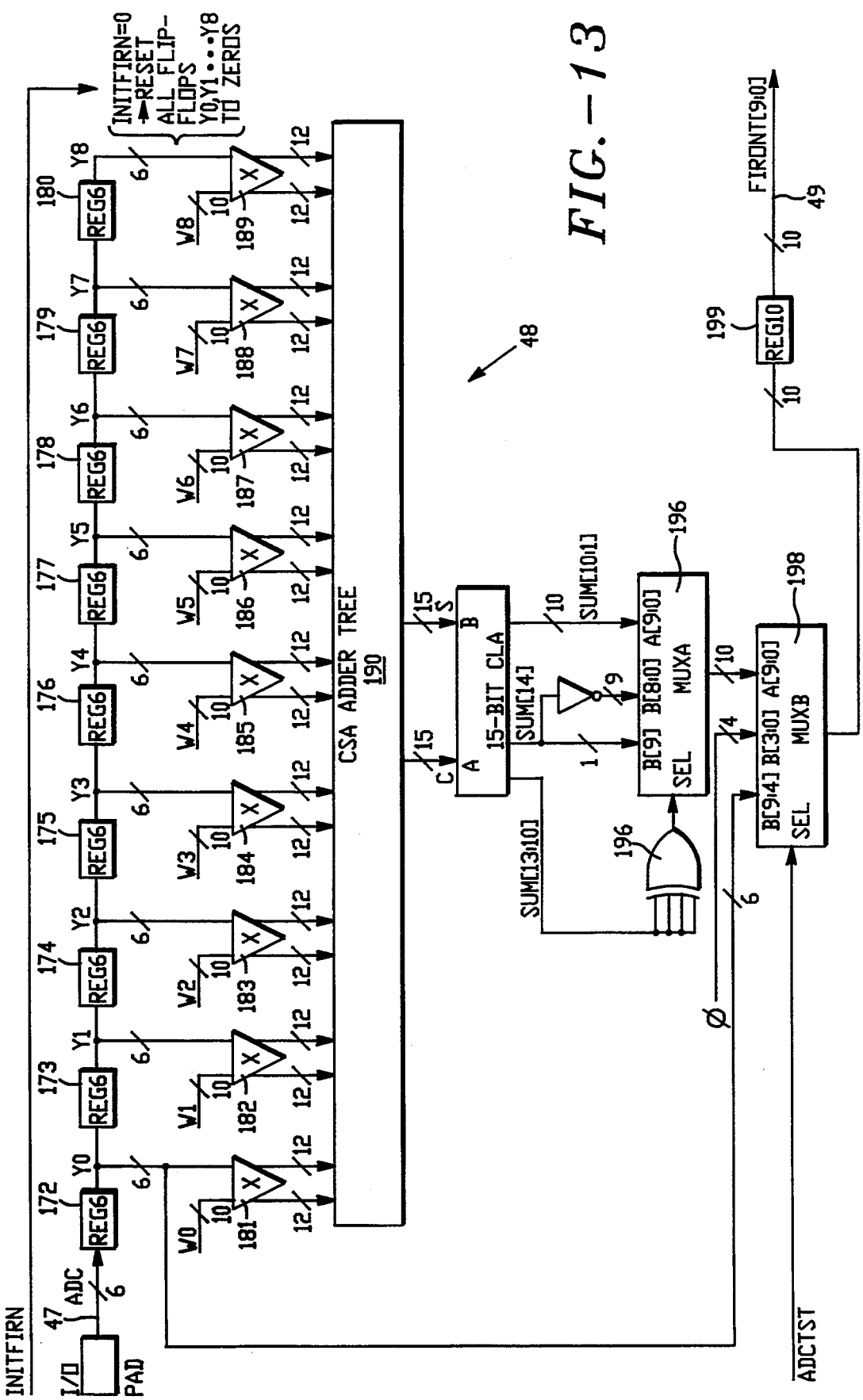
FIG. 13 is a detailed block diagram of a nine-tap programmable digital FIR filter of the FIG. 4 disk drive architecture in accordance with aspects of the present invention.

The adaptive FIR filter 48 is implemented as a nine tap digital finite impulse response filter generally following the circuitry depicted in FIG. 13. The filter 48 essentially comprises nine clock period, tandem connected delays 172, 173, 174, 175, 176, 177, 178, 179 and 180 connected progressively in tandem from the filter input line 47. There are nine multiplier stages 181, 182, 183, 184, 185, 186, 187, 188 and 189 connected respectively to taps w0 through w8 progressively taken along the delays 172 through 180 as shown in FIG. 13.

A six-level carry-save adder tree 190 employs known carry-save-add techniques to speed summation of the nine multiplier outputs with a minimized number of clock period latencies. A bit-pair recoding multiplier approach is followed in order to speed the multiplication process by enabling consideration of multiple ones of the multiplier bits simultaneously. Circuitry used within the multiplier stages 181–189 enabling bit-pair recoding is well known, see for example Cavanagh, *Digital Computer Arithmetic*, McGraw Hill Book Company, New York, N.Y. © 1984, pp, 159–173.

The resultant sums from the adder tree 190 are then combined in a carry lookahead adder circuit 192 and passed through a first multiplexer circuit 194. The sum, comprising bit positions [10:1] is provided directly to the multiplexer circuit 194, while a saturation value generated from sum [14] and an inverter 195 is presented at another input of the multiplexer 194. An overflow circuit comprising an exclusive OR gate 196 compares bits [13:10] of the sum put out by the adder 192 and controls the operation of the multiplexer 194. A second multiplexer 198 enables the FIR filter 48 to be bypassed in accordance with a control signal ADCTST. A cell delay register 199 delays the resultant output from the FIR filter 48 by one clock cycle and then puts conditioned data samples $\{y_k\}$ onto the bus 49.

There are nine 10 bit programmable multiplier coefficients w0, w1, w2, w3, w4, w5, w6, w7 and w8 which respectively feed into the multiplier stages 181 through 189. These programming coefficients w0–w8 control the characteristics of the FIR filter 48. Each coefficient is held in a ten bit register which feeds into each multiplier stage 181 through 189. The programmable multiplier coefficients may be provided from the register file 804 of the digital IC 17. During servo wedge time, servo coefficients are substituted for the data coefficients w0–w8 applicable to a particular data zone. When data zones are changed, new coefficients are provided to adapt the FIR filter 48 to the particular data zone. Thus, whenever data zones are changed, or selection of another data transducer head and data surface is made, or when servo data is being read from a servo sector, the micro-controller 56 obtains new coefficient values (12 bytes) from a storage location (such as the buffer 21) and loads them into the register file 804 of the digital ASIC 17. The new 10-bit coefficient values w0–w8 will then be provided to the multipliers 181–189 thereby to adapt the FIR filter 48 to the changed operating condition.

The filter coefficients may be adapted in real time by a filter coefficient adaptation circuit 222 based upon the incoming user data stream in a process known as "decision-directed" adaptation mode. Alternatively, or in addition to decision-directed adaptation, the coefficients may be adapted by an FIR filter training methodology carried out during a calibration routine, as at power on. Both approaches are discussed hereinbelow. During servo signal processing time, when the servo sector 68 interrupts the data field 76, servo coefficients are loaded into the FIR filter 48 to configure it as a low pass filter suitable for filtering the servo ID field information 68B.

The provision of nine taps in the adaptive FIR filter 48 has been discovered to be ideally appropriate within the presently preferred disk drive architecture 10 for a wide variety of responses from presently available thin film data transducer heads. Basically, responses of thin film heads responding to test patterns recorded at varying data densities were measured and recorded. In terms of measured performance compared with FIR filter circuit complexity, diminishing performance gains are realized when the adaptive FIR filter 48 is structurally or functionally extended beyond about nine taps.

The incoming data signal, $x_k$, on the path 47 has a 6 bit resolution extending between $-1$ and $1-2^{-5}$ (as coded in 2s complement notation). The adaptive multiplier coefficients w0–w8 are each 10 bits in resolution, including one sign bit, and nine following fractional positions. When each 6 bit coefficient is multiplied by a 10 bit multiplier, a 16 bit product normally would result. In practice, the multiplier outputs in carry-save form are limited to 12 bits, with three lower order bits being truncated and generation of the final MSB being deferred to the CSA tree 190. In order to detect the overflow that might occur when adding the nine multiplier 12-bit results, 15 bits are required at the CSA tree 190 output. If there is an overflow in the CLA 192 output, the 10-bit result is saturated at values either of $-1$ or $1-2^{-9}$, depending upon sign.

In practice, the FIR filter 48 is adapted to different head responses. Every data transducer head will be expected to have a different response to data recorded in each one of the data zones shown in FIG. 5. The filter coefficients w0–w8 are adapted so that the action of filtering the read signal generated by a particular head and zone produces output samples corresponding to a PR4 $(1-D^2)$ response. This adaptability thus enables acceptance and use of a much broader range of heads and media in manufacturing. The resultant disk drive system 10 can thus have relaxed tolerances for heads and media relative to a drive having only a fixed filter. Another advantage is that there is no need to compromise for various locations and characteristics from the disk. The FIR filter 48 can be adaptively optimized in real time for every zone, instead of being restricted to a single, compromised setting for all zones.

While it is understood in the art that 6 bits of resolution are needed for the samples $x_k$ at the input path 47, the need for 10 bits of resolution in the adaptive update of the filter coefficients has not generally been known or understood. This 10 bit requirement results from use of the "signed-LMS" (least mean square) algorithm.

Adaptation of FIR Filter 48

As previously mentioned, the digital FIR filter 48 is capable of being adapted to the channel conditions so as to produce the desired PR4 channel response as graphed in FIG. 1. As noted above, the preferred adaptive algorithm used to adapt the FIR filter 48 is the so-called "signed-LMS" algorithm described by:

$$\underline{w}_{k+1} = \underline{w}_k - \mu e_k sgn(\underline{x}_k) \qquad (1)$$

where $w_k = [w0, w1 \ldots w8]$ is a vector of filter coefficients at time k, $\mu = 2^{-p}$, where $(1 \leq p \leq 8)$, is a programmable step size, $e_k = y_k - dkval \cdot \hat{y}_k$, and $x_k = [x_k, x_{k-1} \ldots x_{k-8}]$ is a vector of delayed filter input values. The variable $y_k$ represents the filter output, and the variable $\hat{y}_k$ represents the "desired response"; i.e., the desired filter output value at time k (see equation (14) below). The signum function is defined by:

$$\text{sgn}(x) = 1 \text{ for } x \geq 0 \qquad (2)$$
$$= -1 \text{ for } x < 0 \qquad (3)$$

By way of further explanation and contrast with the presently preferred method, the standard LMS algorithm is described by:

$$\underline{w}_{k+1} = \underline{w}_k - \mu e_k \underline{x}_k \qquad (4)$$

The main drawback of the standard LMS algorithm is the complexity of the $e_k \underline{x}_k$ multiplication. The present inventors have discovered that by using signed-LMS instead, performance losses as measured by filter output signal-to-noise ratio are very small, and typically less than 0.2 dB. At the same time, complexity in the filter coefficient adaptive update is greatly reduced, since the $e_k x_k$ multiplication is avoided.

Figure 14:
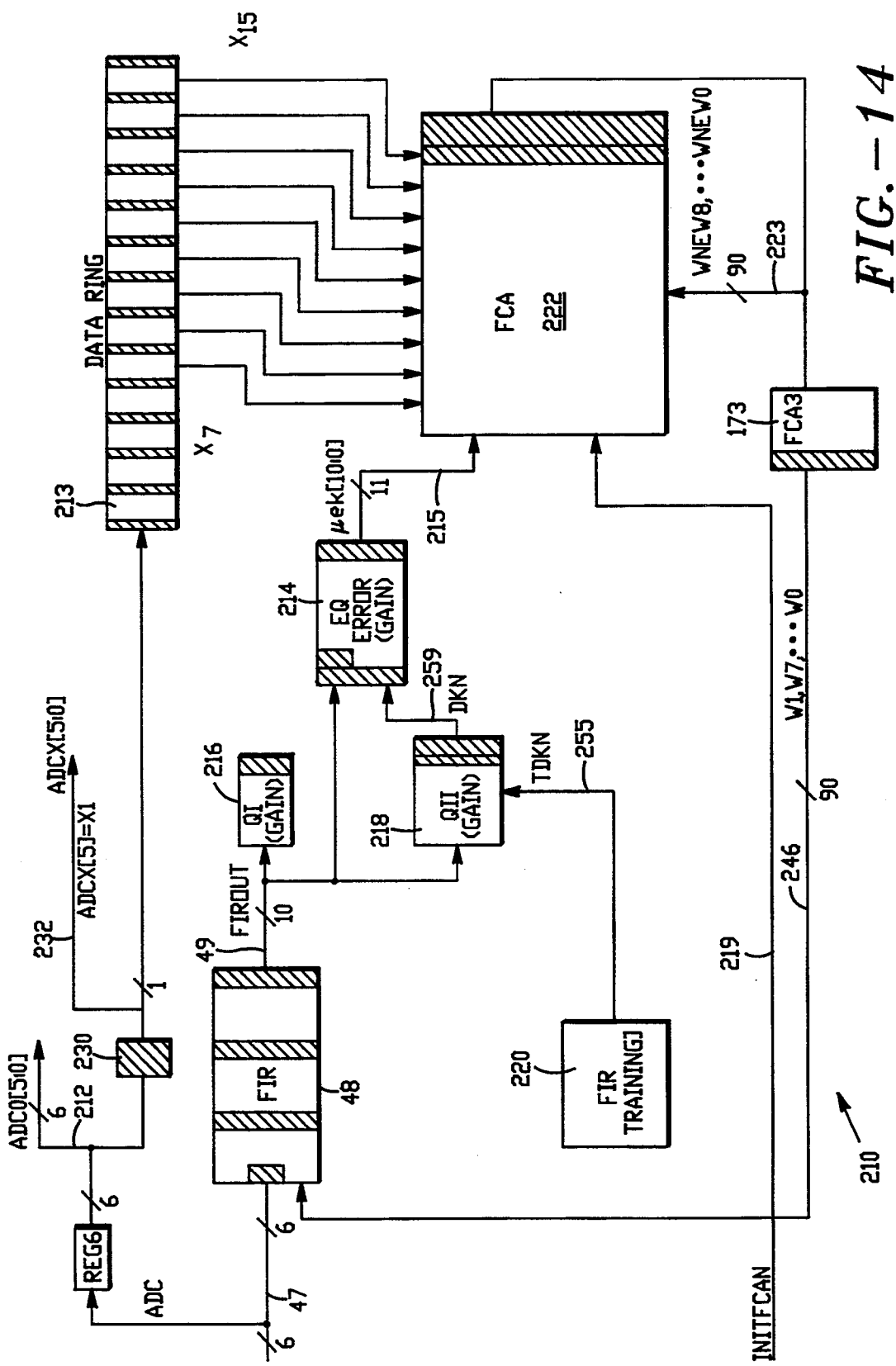
FIG. 14 is a block diagram of an FIR filter coefficient adaptation circuit for adapting the FIG. 13 FIR filter to read channel conditions within the FIG. 4 disk drive architecture.
Figure 18:
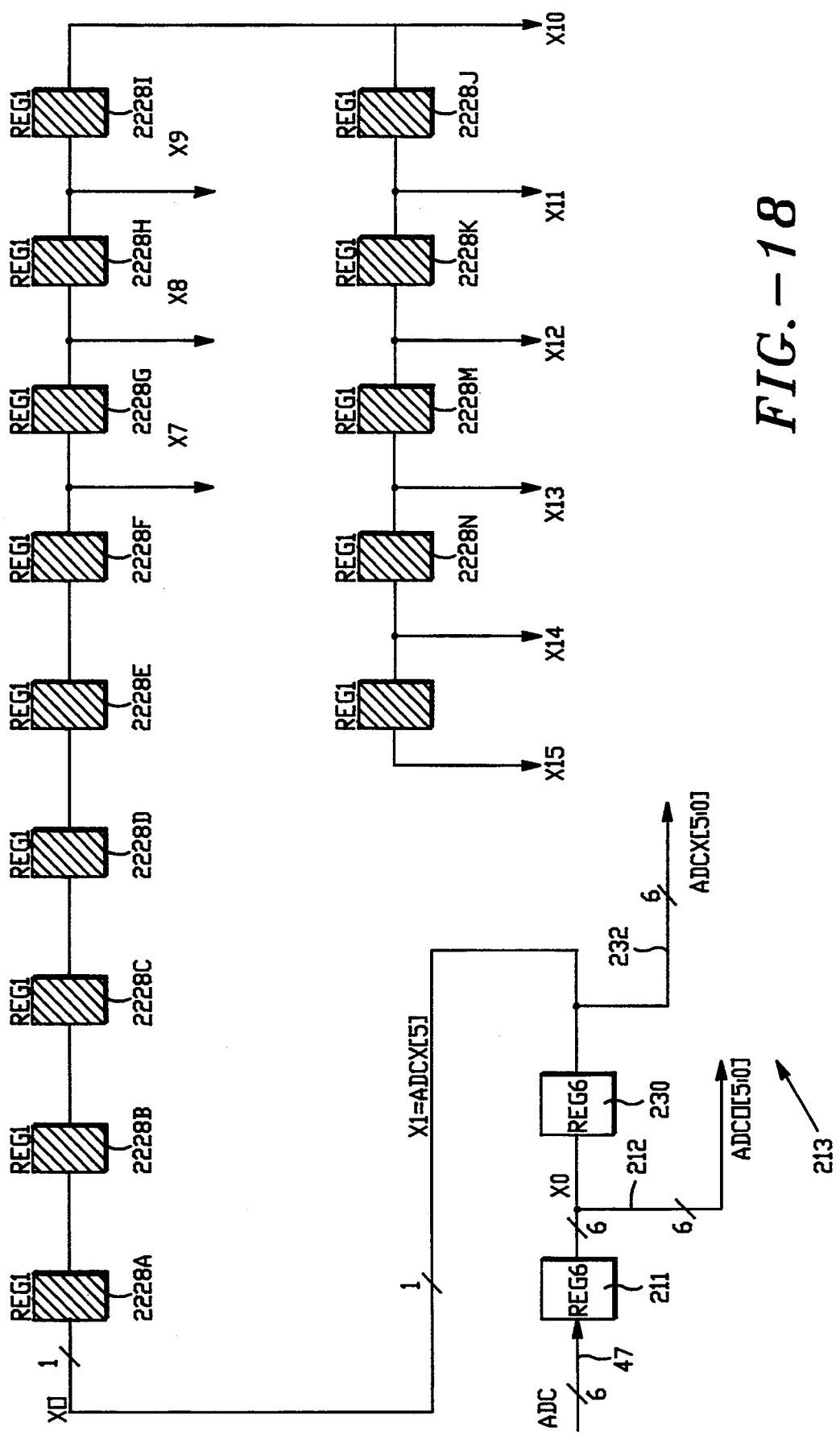
FIG. 18 is a more detailed block diagram of a data ring circuit block shown in FIG. 14.

An overall FIR filter adaptation architecture 210 is illustrated in FIG. 14. The incoming raw data samples on the path 47 are clocked through a register 211 to a path 212, and through a second register 230 to a path 232. The path 232 leads through a data ring 213 (FIG. 18) comprising a series of fourteen flip-flops 228a, 228b, 228c, 228d, 228e, 228f, 228g, 228h, 228i, 228j, 228k, 228m, and 228n, which are synchronously clocked at the ADCLK rate. Outputs from the sixth through the fourteenth flip-flops provide respectively X[7] through X[15] values which are applied as multiplier values to a filter coefficient adaptation circuit 222, described in greater detail in connection with FIGS. 15 and 16.

As shown in FIG. 4, the output path 49 from the FIR filter 48 leads directly to the digital gain control circuit 64. Several of the elements of the gain control circuit 64 are shown in FIG. 14 and are used with the filter coefficient adaptation circuit 222 to provide updated filter coefficients. One of the elements of the digital gain control circuit 64 is an equalizer error computation block 214. Other elements include a first gain quantization block 216 which is normally active during an initial gain acquisition mode to set the PR4, ML channel gain, and a second gain quantization block 218 which is normally active during a subsequent tracking mode to maintain proper gain characteristics in the PR4, ML channel while user data is being read. The second gain quantization block 218 also provides an output dkn which feeds into the equalizer error block 214. The equalizer error block 214 within the gain control circuit 64 calculates and puts out $\mu e_k$ values on a path 215 to the filter coefficient adaptation circuit 222.

An FIR filter training circuit 220 provides an output TDKn on a path 255 which feeds into the second gain control block 218. FIR filter coefficient adaptation training mode is discussed in the section immediately following this section.

Figure 15:
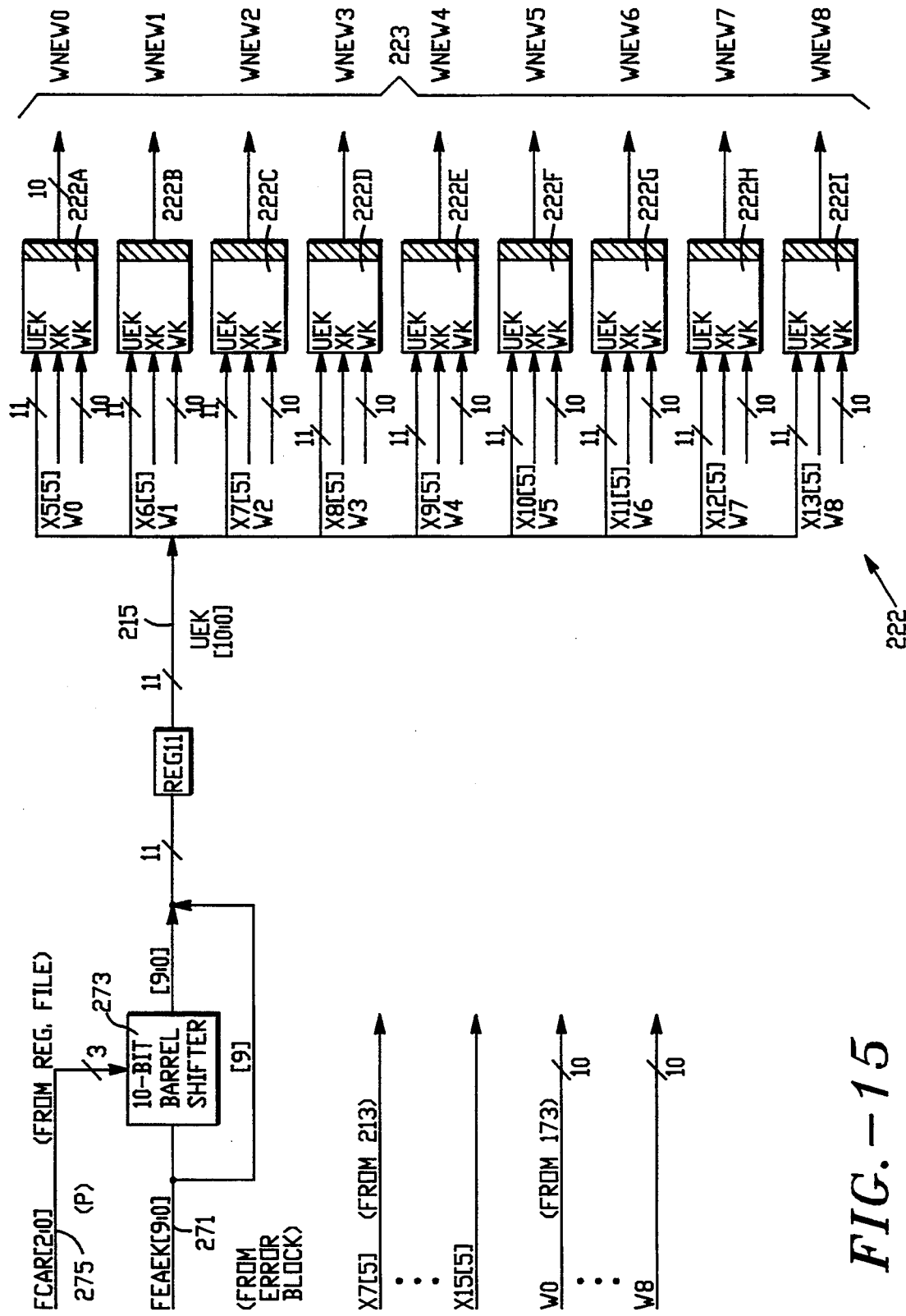
FIG. 15 is a detailed block diagram of a portion of the filter coefficient adaptation circuit block shown in FIG. 14.

The filter coefficient adaptation circuit 222 includes nine coefficient calculation circuits 222a, 222b, 222c, 222d, 222e, 222f, 222g, 222h, and 222i, as shown in FIG. 15. These circuits implement a signed least mean squares recursive coefficient adaptation methodology which is preferred in providing coefficient adaptation in accordance with the equation:

$$\underline{w}_{k+1} = \underline{w}_k - \mu e_{k-L} sgn(\underline{x}_{k-L}) \quad (1')$$

wherein all variables are as defined above. It should be noted that in order to achieve a high speed implementation, pipelining is used. The pipelined architecture introduces the delay term "L" in the update term of equation (1').

Figure 16:
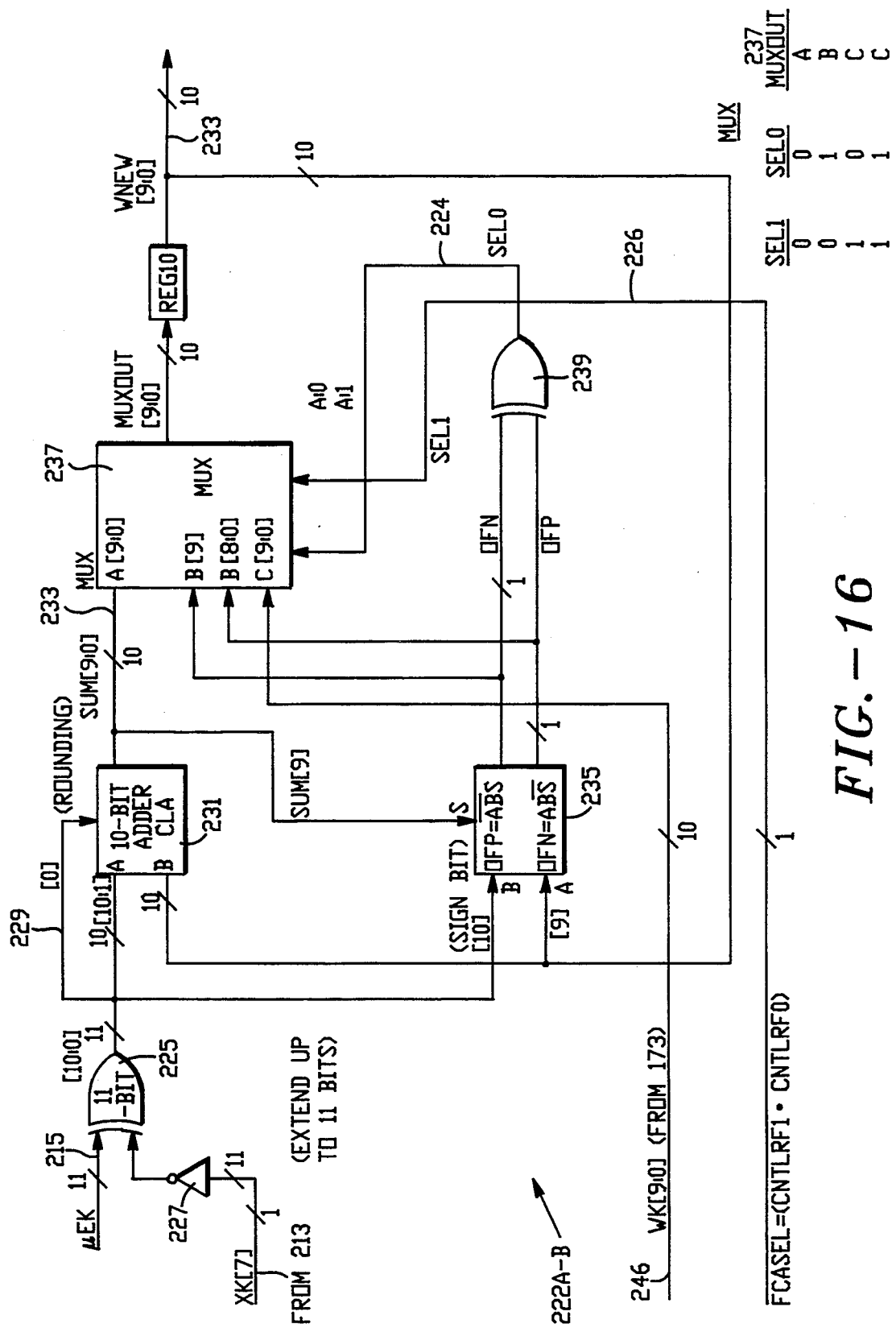
FIG. 16 is a detailed block diagram of one of nine processing circuits within the FIG. 15 filter channel adaptation circuit block.
Figure 17:
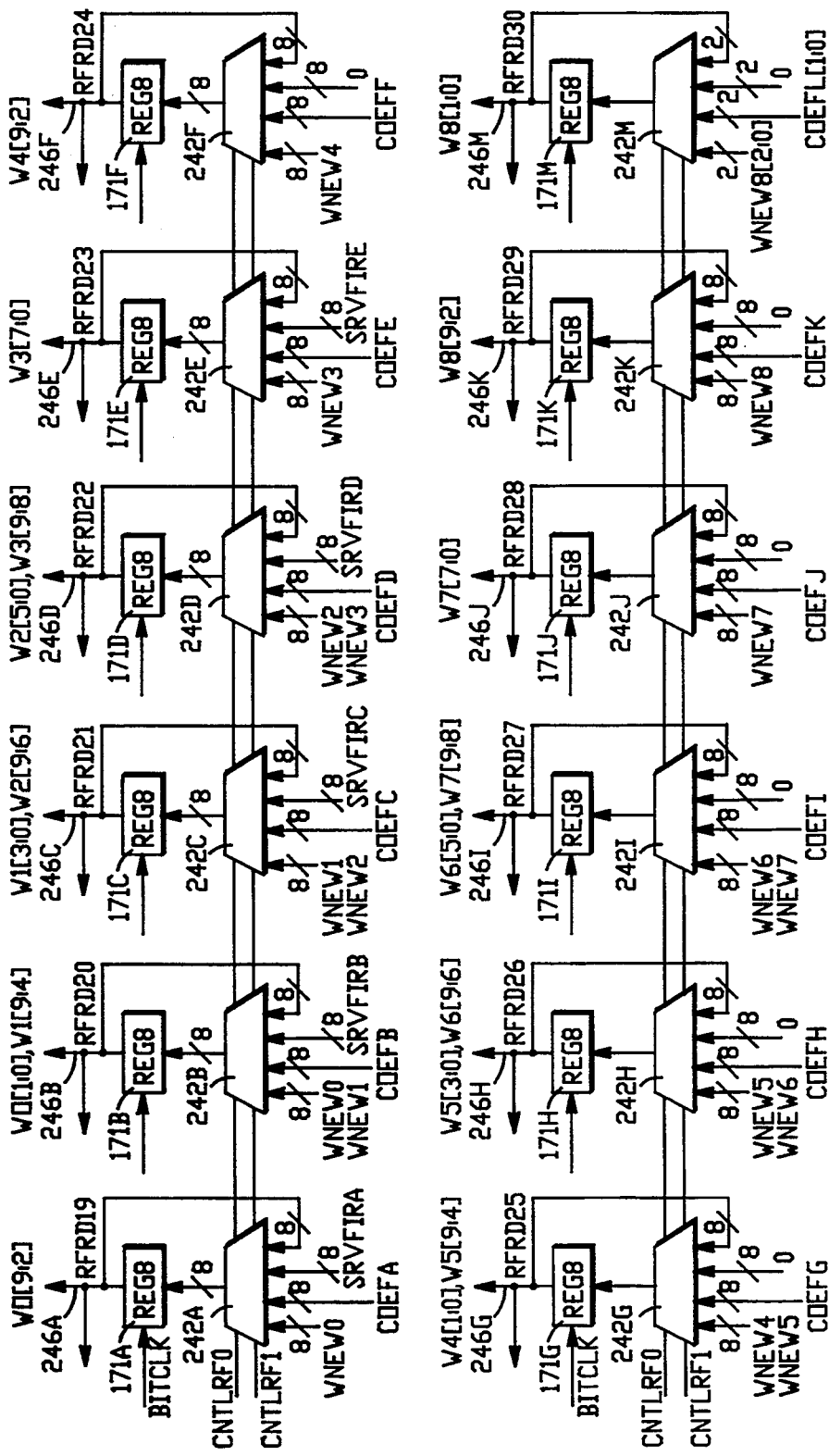
FIG. 17 is a block diagram of a coefficients multiplexer array used selectively to provide coefficient values to the FIG. 13 FIR filter.

A representative one of the calculation circuits 222a-i, is illustrated in FIG. 16. Therein, the $\mu e_k$ value on the path 215 is multiplied by a number which is the inverse of the bits $x_k$ from the data ring 213. An exclusive-OR gate 225 and an inverter 227 implement the multiplication. The resultant eleven bits of the product are applied on a path 229 to one input of a ten-bit carry look-ahead adder 231. Another input to the adder 231 is provided by the coefficients $w_{new}$ which are applied over a path 223. The resultant sum put out over a path 233 comprises the updated ten bit coefficient. An overflow logic circuit 235 monitors the sum on the path 233 and provides positive and negative saturation outputs in the event of overflow. The sum on the path 233 and the positive and negative saturation values are applied as inputs to a multiplexer 237. An OR gate 239 tests high bit outputs from the overflow and puts out a control signal SEL0 on a path 224 to cause the multiplexer 237 to select and put out overflow saturation values OFP and OFN, in lieu of the sum, as the new coefficient whenever an overflow has been detected. Another control signal SEL1 on a path 226 causes the multiplexer 237 to be preset with and put out coefficients wk supplied from the coefficient selector circuit 173 (FIG. 17). The control SEL1 overrides the control SEL0.

Turning to FIG. 17, the coefficient selector circuit 173 includes twelve eight bit registers 171a, 171b, 171c, 171d, 171e, 171f, 171g, 171h, 171i, 171j, 171k and 171m, which are provided to hold the nine ten-bit coefficients. Since these are eight bit registers, several registers are needed to hold the bits of each ten bit coefficient. The last register 171m only holds two bits. There are twelve multiplexers 242a–m which are also associated with the twelve registers 171a–m, and each multiplexer 242 includes four inputs, controlled by two control lines CNTLRF0 and CNTLRF1. One input is the updated coefficient whew which is recursively generated and put out by the filter coefficient adaptation circuit 222. Another input COEF is provided directly from a control register file 804 contained within the digital IC 17. This file is written by the microcontroller 56 via the bus 55, and it holds coefficients w0–w8 for e.g. a newly selected data zone 70 which is being accessed by the head positioner servo 24, for example. These coefficient values are typically values which were developed during the FIR training routine from the training track of a particular zone, or which were the most recent values developed by the adaptation circuit 222 when the particular data zone was last accessed. However, these values are static values. A third input to registers 242a–e is provided for the servo coefficient values SRVFIRA-E which are also stored in the register file 804. In servo mode, registers 242f–m are loaded with null (zero) values. A final input to the registers 242a–m is a loop back path 246 taken from the output of each register 171 and which thereby implements and provides a latch function for holding the present coefficient value being applied to the multipliers 188–204.

FIR Filter Training

Since analog data signals vary from the inside diameter zone 70-9 to the outermost zone 70-1, and since these signals also vary from head to head, and may vary with temperature, etc., the performance of the FIR filter 48 is enhanced by "training". By "training" is meant that a known data pattern reproduced from the disk surface is compared with a reference encoded data pattern. Any errors are used to adjust the FIR filter coefficients such that the squared-error value is minimized.

In accordance with principles and aspects of the present invention, each data zone is provided with a dedicated training track or sector 71t which has been recorded with a known pseudo-random data pattern. In the present example, the Galois field data block pattern for use with the Reed-Solomon error correction circuit 54 is used for convenience. This Galois field pattern is contained in a firmware memory accessed by the microcontroller 56. The training track or sector 71t is preferably located at the center of each data zone 70 and therefore represents an average track characteristic for that particular zone. The training track or sector follows the format set forth in FIG. 6, for example, but does not include any user data, the data fields being occupied with the known pseudo-random data pattern.

Figure 19:
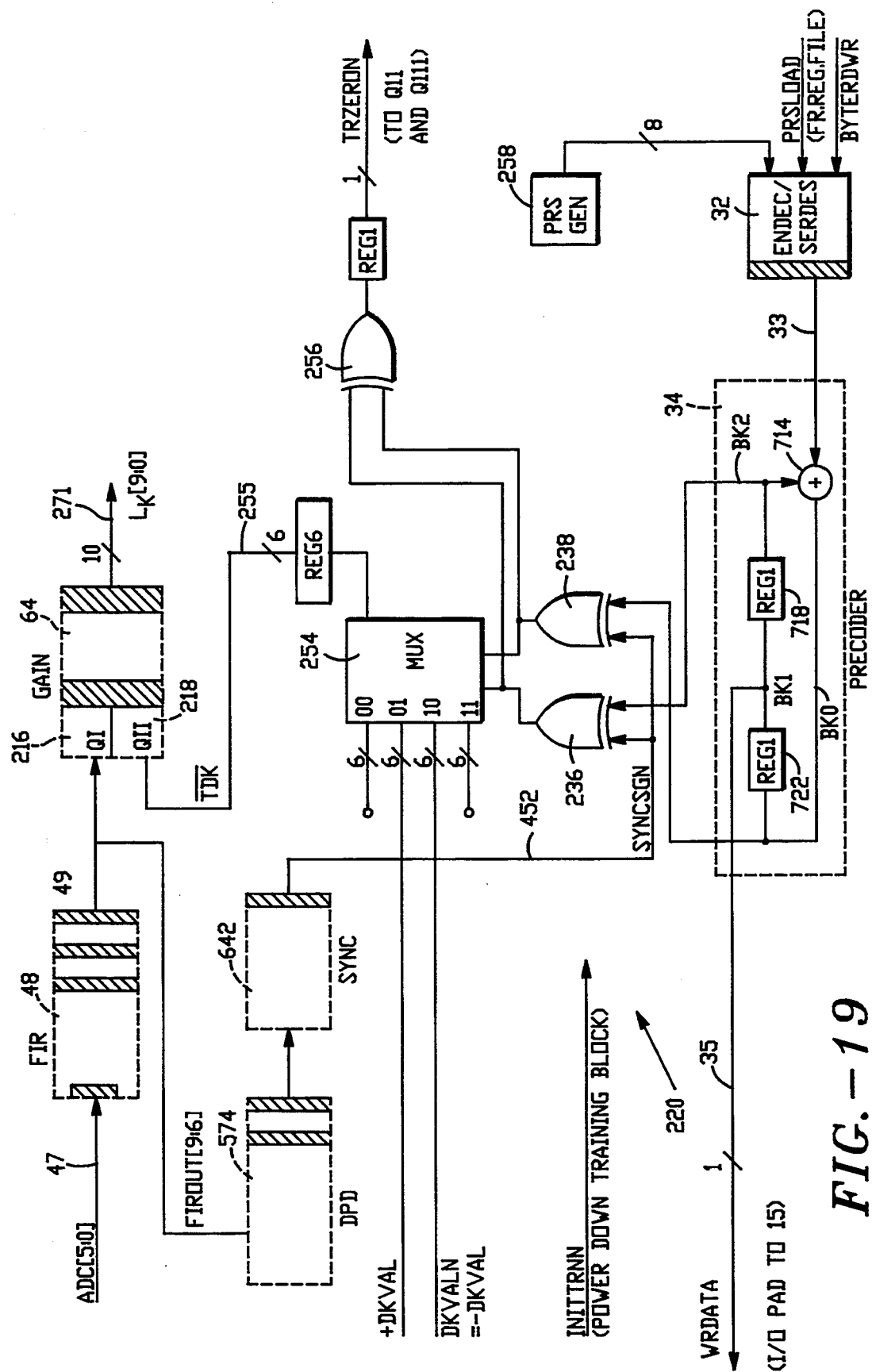
FIG. 19 is a block diagram illustrating aspects of FIR filter training in accordance with aspects of the present invention.

FIR filter training mode circuitry is shown in FIG. 19. Therein, the FIR filter training circuit 220 includes two exclusive-OR gates 236 and 238 which have one commonly connected input. The commonly connected input receives a signal on a path 452 taken from the read channel including the FIR filter 48, a sync/servo digital peak detector circuit 574, and a sync pattern recognition circuit 642. Another input of the exclusive-OR gate 236 is connected to a BK2 output of the precoder 34 within the write mode circuitry. Another input of the exclusive-OR gate 238 is connected to a BK0 output of the precoder 34. The precoder 34 is described in further detail in conjunction with FIG. 46 hereinafter.

Eight bit pseudo-random data bytes from a pseudo-random sequence source 258 (such as the Galois field ECC data pattern) are passed through the ENDEC/SERDES 32 and become nine-bit, serial (0,4,4) code patterns which are then passed through the precoder 34. A SYNCFOUND control signal initiates this process. An output BK1 from the precoder (available when the channel is in "write" mode) provides the write data signal WRDATA on the path 35 which leads to the write driver 36. The other two outputs BK0 AND BK2 are applied as inputs to the exclusive-OR gates 260 and 262.

The SYNCSGN output from the sync pattern recognition circuit 642 indicates whether the synchronization peak was positive or negative. The sign of the sync pulse within the ID field header 78 is needed to determine the polarity of the reference signal that will be compared to the data being read back from the disk during the FIR filter training mode and this sign value is applied to the exclusive-OR gates 260 and 262 over a path 452. The outputs from the exclusive-OR gates 260 and 262 are used to select the input to a multiplexer 254. The multiplexer 254 selects one of three inputs: dkval, Zero, and dkvaln. The output from the multiplexer 254 is thus an idealized ternary reference PR4 output data stream based upon the input data being generated by the pseudo-random sequence generator 258. The output on a path 255 comprises a six bit $\overline{TDK}$ signal (-reference data) which is sent into the second gain loop quantizer circuit 218.

After the precoder 34 has been initialized to 0,0, or to 0, 1, the output from the multiplexer 254 is in accordance with the following table:

| SYNCSGN on 452 | Bk0 | Bk2 | $2^1$ | $2^0$ | $\overline{Tdk}$ |
|---|---|---|---|---|---|
| 0(+) | 0 | 0 | 0 | 0 | 0 |
| 0 | 0 | 1 | 1 | 0 | −dkval |
| 0 | 1 | 0 | 0 | 1 | +dkval |
| 0 | 1 | 1 | 1 | 1 | 0 |
| 1(−) | 0 | 0 | 1 | 1 | 0 |
| 1 | 0 | 1 | 0 | 1 | +dkval |
| 1 | 1 | 0 | 1 | 0 | −dkval |
| 1 | 1 | 1 | 0 | 0 | 0 |

Figure 24:
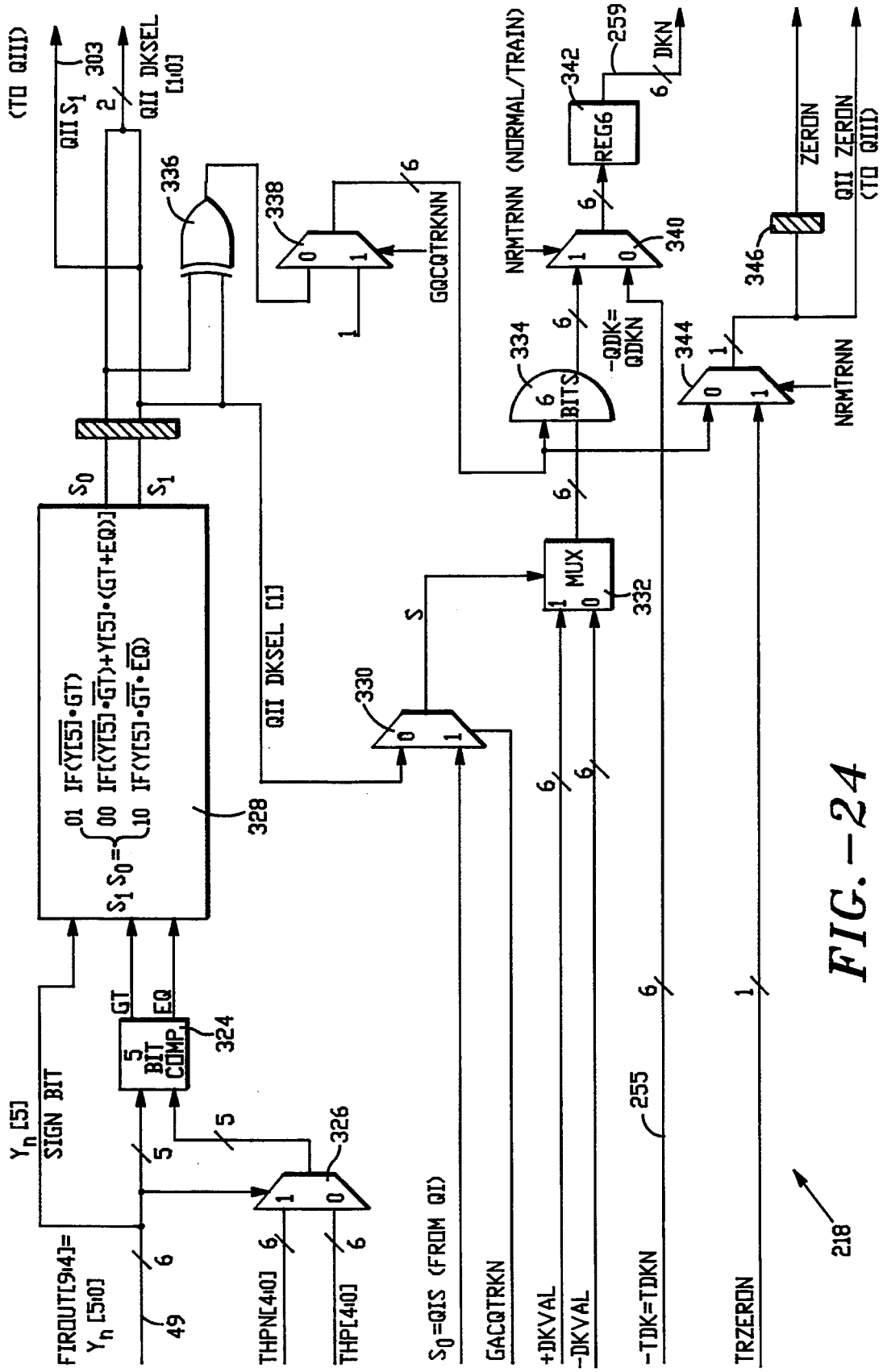
FIG. 24 is a detailed block diagram of a tracking mode quantizer circuit block shown in the FIG. 22 block diagram.

With reference to FIG. 24, the second gain loop (and timing loop) quantizer circuit 218 is depicted. This circuit is used during tracking mode by both the gain and timing loops. The $\overline{TDK}$ signal on the path 255 passes through a multiplexer 340 which is set to FIR filter training mode by a normal/training logical signal NRMTRNN and passes through a cell delay register 342 and out of the circuit 218 as a $\overline{DK}$ signal on a path 259 and into the timing equalizer error circuit 214 (FIG. 36).

Figure 36:
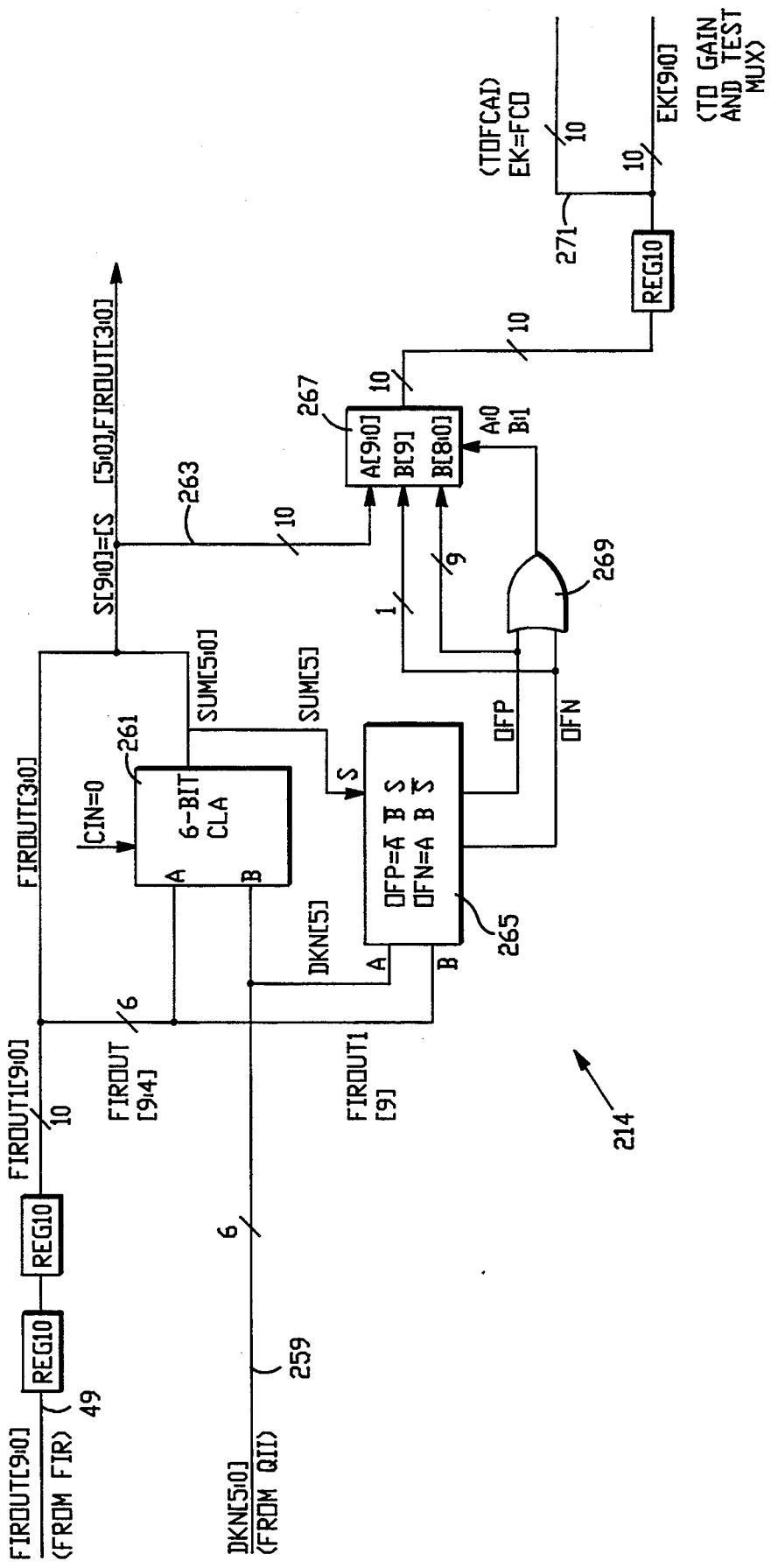
FIG. 36 is a detailed block diagram of an equalizer error calculation circuit within the digital gain control block shown in FIG. 34.

At the same time, the conditioned digital data sample stream from the FIR filter 48, representing the equalized output corresponding to the pseudo-random sequence test pattern being reproduced simultaneously from a selected training track 71t is applied over the path 49 directly to the equalizer error circuit 214 depicted in detail in FIG. 36. The equalizer error circuit 214 adds the $\overline{DK}$ value on the path 259 to the six high order bits of the 10 bit signal on the path 49 in a carry lookahead adder circuit 261 to produce a 10 bit result on a path 263 on which the low order four bits from the FIR filter 48 are mapped around the adder circuit 261 and appended to the resultant six bit sum therefrom. An overflow circuit 265 checks for overflow and puts out a positive or negative overflow saturation value through a multiplexer 267 as the overflow case may be. An OR gate 269 controls selection of the multiplexer 267 between the error value on the path 263 and the saturation values from the overflow circuit 265.

The resultant $e_k$ value is then passed through a delay latch and then supplied over a path 271 to a ten bit barrel shifter circuit 273 (FIG. 15) which multiplies the resultant $e_k$ by a value $\mu$ which is developed from a minus exponent p on a path 275, where $\mu = 2^{-P}$. The value p is a value which is stored in the register file 804 and represents the previously described programmable coefficient adaptation step size. The resultant product put out by the barrel shifter 273 is thus the $\mu e_k$ value which is applied over the path 215 to the filter coefficient adaptation circuit 222, as shown in FIG. 14.

During the filter training mode, the error value on the path 215 causes the recursive adaptation circuit 222 to adjust the filter coefficients to minimize the squared-error value. The coefficients thus developed during the training mode are stored in the eight bit registers 171 shown in FIG. 17. The microcontroller 56 obtains these values via the bus structure 55 and stores them in a storage location designated by firmware for storage of coefficients for the particular data zone 70-n. This process is repeated for each head and data zone, and coefficients for the FIR filter 48 are developed and stored. The FIR filter training mode is carried out normally as a part of a drive calibration routine which may occur during a power up sequence, and subsequently during periodic drive recalibration routines. Before entering the training mode the FIR coefficients are preloaded to an initial state that facilitates rapid convergence of the signed-LMS algorithm.

Returning to FIG. 24, in a decision-directed FIR filter adaptation mode carried out in real time during user data reading operations, the state of the multiplexer 340 selects and puts out a decision based on the FIR filter output as the $\overline{DK}$ value for every data sample over the path 259 to the equalizer error circuit 214, FIG. 15. This estimated decision value is then processed by the equalizer error circuit 214 to produce a new $\mu e_k$ value on the path 215 which results in update of coefficient equation (1'). New coefficients are thus provided at each new data sample time. With the foregoing description of the equalizer error circuit 214 in mind, it will now be appreciated that the described circuitry will provide for adaptive updating of the FIR filter coefficients based upon user data in the decision directed filter adaptation mode, as well as in the FIR filter training mode.

Multi-Mode Timing Loop

In a sampled data system such as PR4, ML, it is necessary to sample and quantize the incoming analog information with the flash A/D converter 46 at predetermined proper sampling times. In order to perform properly timed sampling, it is necessary to generate a clock for the A/D converter 46 which is properly synchronized and phase aligned with the incoming data stream. The multi-mode timing loop implements automatic, rapid frequency and phase alignment with the incoming data in order to carry out sampling correctly.

As shown in FIG. 4, the multi-mode timing loop comprises the combination of an analog-based timing loop including the analog phase locked loop control circuit 60, the timing summing junction 58, and the ICO 62 which controls the timing of samples taken and put out by the flash A/D 46; and, a digital-based timing loop including the digital timing control circuit 54, the timing DAC 57, the summing junction 58 and the ICO 62. The flash A/D converter 46 provides a common path for both timing loops. The multi-mode timing loop has two main operating modes: non-read and data read. During non-read, the timing is controlled by the analog based timing loop. During read mode, when timing is controlled through the digital timing control circuit 54, there are two sub-modes: acquisition and tracking. In the acquisition mode, raw data samples $\{x_k\}$ are taken from the path 47 between the flash A/D 46 and the FIR filter 48. During tracking, conditioned data samples $\{y_k\}$ are taken from the path 49 between the FIR filter 48 and the Viterbi detector 50. Non-read mode will be discussed first.

Figure 20:
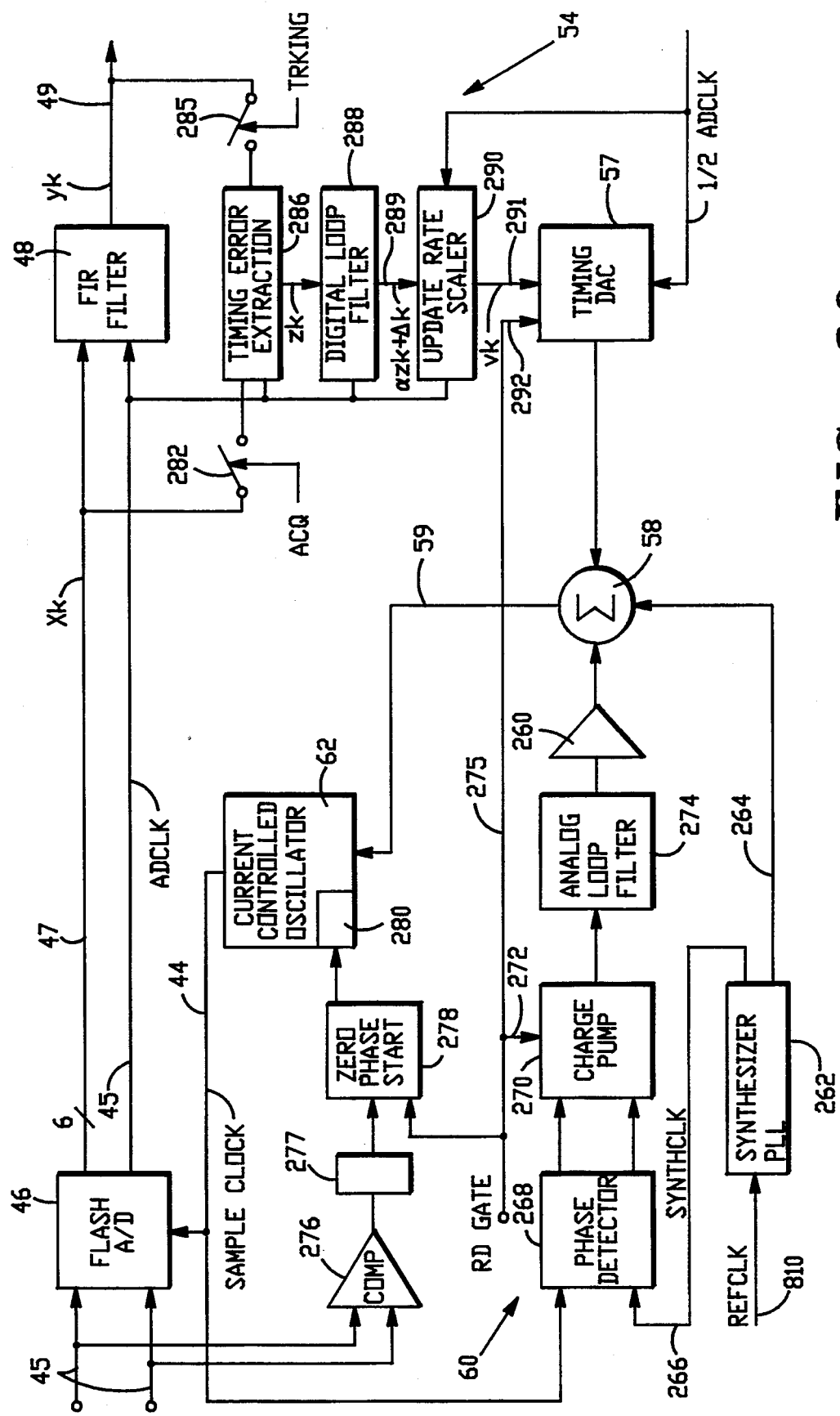
FIG. 20 is a functional block diagram of a multi-mode timing loop of the FIG. 4 disk drive architecture in accordance with aspects of the present invention.

With reference to FIG. 20, during non-read mode, the frequency synthesizer 262 receives a reference clock frequency REFCLK over a path 810 from a clock source thereof, such as a crystal oscillator operating at the basic system clocking rate. The synthesizer 262 generates a plurality of predetermined frequencies corresponding to the respective data rates of the data zones 70-1 to 70-9, for example, and puts out a synthesizer current reference value over a path 264 to the timing summing junction 58, which passes it to the ICO 62 over a path 59. (The timing DAC 57 in the digital-based timing loop is not enabled during non-read mode). The synthesizer 262 also puts out a synthesizer clock signal SYNTHCLK on a path 266.

The SYNTHCLK signal on the path 266 enters a phase detector 268 wherein it is compared with an A/D converter clock signal (SAMPLECLK) provided over the path 44 from the output of the ICO 62. The phase detector 268 puts out a phase error signal to control an analog charge pump 270. When enabled by an enable signal on a path 272 which is derived from RDGATE 275, an output from the charge pump 270 passes into an analog loop low pass filter 274. The loop filter 274 includes a charge storage device which accumulates and stores a value established by the charge pump 270. A transconductance amplifier/buffer 260 converts the timing error signal voltage held on the charge storage device into a current level and applies it as another input to the analog current summing junction 58.

When the timing loop is in the non-read mode, a read gate signal (RDGATE) on the path 275 will be false, and the enable signal 272 will be true, thereby establishing a direct signal path between the analog charge pump 270 and the analog loop filter 274. Thus, during the non-read mode, the charge pump 270 charges up the charge storage device in the loop filter 274. At the same time, another enable 292 (also derived from the RDGATE signal on the path 275) inhibits the DAC 57, and the only signal put out from the summing junction 58 is a sum of the signals received from the synthesizer 262 on the path 264 and the analog error signal from the buffer 260. This analog current error sum is applied over the path 59 directly to control the ICO 62 which in turn generates and puts out a SAMPLE CLOCK signal on a path 44 to the flash A/D 46. The SAMPLECLK signal on the path 44 is converted into the ADCLK signal in the flash A/D 46 as previously explained and supplied to the digital IC 17 and its circuits associated with the timing loop. SAMPLECLK is also put out to the phase detector 268 over the path 44. Operation of the analog timing loop including the synthesizer 262, summing junction 58, ICO 62, flash A/D 46, phase detector 268, charge pump 270, analog loop filter 274 and buffer 260 results in phase lock of the ADCLK signal to the synthesized clock frequency SYNTHCLK put out by the frequency synthesizer PLL 262. Ordinarily, the timing loop remains in non-read mode unless or until user data is to be read back from a disk surface. Data write-to-disk operations are timed directly by the synthesizer 262. Recovery of servo sector data samples is timed asynchronously by supplying REFCLK on the path 810 directly to the flash A/D 46.

Figure 21:
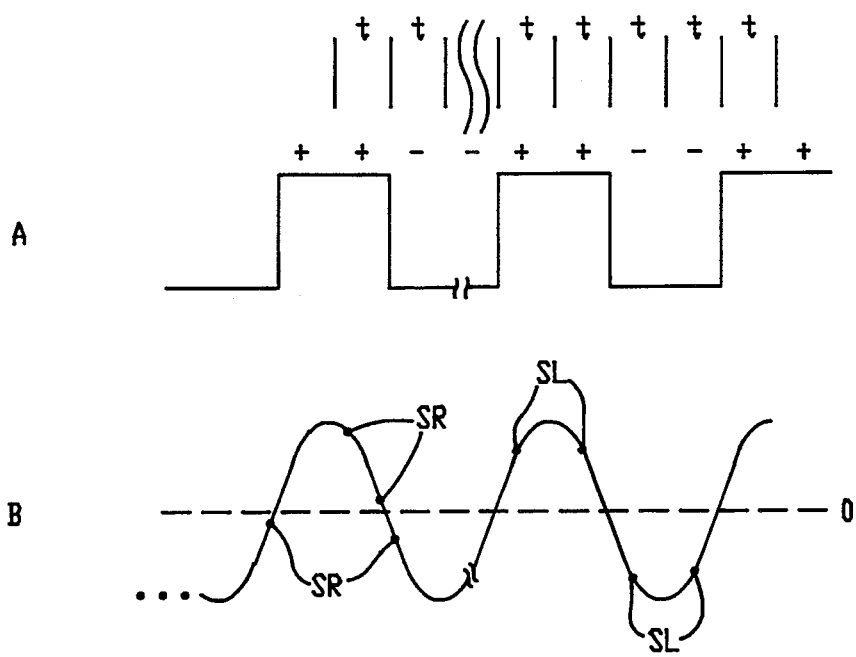
FIG. 21 is a series of waveform graphs illustrating write current and readback signals of a preamble field of the data track pattern of FIGS. 5 and 6, illustrating timing loop synchronization.

Read mode is entered whenever PR4,ML user data is to be read from the disk surface. At the beginning of every recorded data segment e.g. 76A, 76B and 76C, the data header 78 includes a constant frequency data pattern field 78A (such as an AGC field). This pattern is recorded in accordance with a square wave saturated recording current of the type illustrated in FIG. 21, graph A. During playback, the head 26 processes the detected flux transitions such that playback resembles a sinewave as shown in FIG. 21, graph B.

The preamble pattern is used to lock up the timing loop to a good initial starting phase, and to synchronize the read clock to the data pattern to be read. The playback response of the preamble pattern is also used to set the initial gain settings as is conventional with AGC fields such that when the data cell pattern leaves the FIR filter 48, a nominal ternary (i.e. three level) signal is present.

At the beginning of playback of the preamble pattern, the read gate signal (RDGATE) on the path 275 changes logical state such that the analog enable signal 272 becomes false while the digital path enable signal 292 becomes true. At the beginning of the acquisition mode, the flash analog to digital converter 46 is sampling the incoming waveform at approximate sample locations along its locus (depending upon the accuracy of zero phase start circuitry 278), such as at locations SR in FIG. 21, graph B. During acquisition mode, the timing phase locked loop (PLL) thus comprises the timing control block 54 (including a timing error extraction function 286, a digital PLL loop filter function 288, and an update rate scaler function 290), the DAC 57 and its enable control 292, the summing junction 58, the current controlled oscillator 62 and the flash A/D 46.

In this initial timing acquisition mode raw data samples $\{x_k\}$ are input to the timing error extraction function 286 directly from the output of the flash A/D 46 via a path diagrammatically indicated as a closed switch 282, since the FIR filter 48 may not yet be adapted to an optimal response for the particular data zone from which user data is to be read back, and also to avoid the processing latency through the FIR filter 48 and resultant delay in timing loop phase lock. The timing error extraction function 286 generates and puts out a sampling phase error estimate $z_k$ based upon the difference between desired timing and present timing.

The error metric $z_k$ put out from the timing error extraction function 286 is then passed through a digital loop filter function 288. The resultant low pass filtered error metric, described by the relation $\alpha z_k + \Delta_k$ is then passed through the update rate scaler function 290 which processes and puts out sample group error metric estimates $v_k$ at e.g. one half of the initial error metric clocking rate. By using a one half rate for the error metric being fed to the DAC 57, and by clocking the DAC 57 at a ½ ADCLK rate, improvements in power consumption and noise immunity are realized at the digital to analog interface. Basically, two successive error metric samples are averaged, and the average is put out. The overhead attributable to the process within the update rate scaler function amounts only to one additional clock cycle of latency at the sample rate, which does not significantly degrade the convergence time.

The acquisition timing error estimate is described by the following:

$$z_k^a = -x_k \hat{x}_{k-1} + x_{k-1} \hat{x}_k \qquad (5)$$

Within the timing error extraction function, the following relation is obtained:

$$\hat{x}_k = signum\ (x_k - \eta_k) \qquad (6)$$

where signum $(x) = +1$ for $x \geq 0$ and $-1$ for $x < 0$, and $$\eta_k = E \cdot \hat{x}_{k-2}, \qquad (7)$$

where E is a programmable constant.

The digital low pass filter function generates the following:

$$\Delta_{k+1} = \Delta_k + \beta z_k \qquad (8)$$

The scaling function $\alpha$ in acquisition mode is defined by the following:

$$\alpha^a = 2^{-n1} + 2^{-n2} \qquad (9)$$

where n1 lies between 0 and 7 and n2 lies between 1 and 8.

The scaling function $\beta$ in acquisition mode is defined by the following:

$$\beta^a = 2^{-m1} + 2^{-m2} \qquad (10)$$

where m1 lies between 1 and 8, and m2 lies between 2 and 9.

The update rate scaler function 290 provides the sample group error metric estimates $v_k$ in accordance with the following function:

$$v_k = \tfrac{1}{2}[(\alpha z_k + \Delta_k) + (\alpha z_{k-1} + \Delta_{k-1})] \qquad (11)$$

for even timing samples and $$v_k = v_{k-1} \qquad (12)$$

for odd timing samples, thereby halving the clocking rate for the error metric being supplied to the timing DAC 57.

When enabled by the enable signal 292, the timing DAC 57 converts the scaled sample group error metric estimates $v_k$ into analog current values and applies those values through the control signal path 292 to the timing summing junction 58. At the same time, the non-read mode reference value stored in the charge storage element of the analog loop filter 274 is also applied as a current to the summing junction 58 as a static starting reference for the particular data zone. In this manner, the error metric signal supplied by the DAC 57 acts as a vernier control so as to adjust the held (but no longer updated) static reference value. This approach, which comprises one aspect of the present invention, enables the current controlled oscillator 62 to be operating at very nearly the appropriate frequency when it is switched from non-read mode to read mode (acquisition sub-mode). This approach thus reduces the amount of ICO adjustment required and speeds up the acquisition time. Any slow discharge of the value held in the charge storage device of the analog loop filter 274 may be compensated for by slowly adjusting the digital input to the DAC 57. This adjustment is minor and is well within the dynamic range of the DAC 57 which is operating at one half of the original error metric clocking rate (SAMPLE CLOCK on the path 44).

The timing acquisition sub-mode has a duration which generally corresponds to a time during which the head 26 passes beneath the constant frequency data ID preamble field 78A. Once this predetermined time interval has passed and samples have been taken of the preamble field 78A, the switch 282 opens, and another switch 285 is closed, thereby switching the input of the digital timing error extraction circuit 286 from the raw samples $\{x_k\}$ from the A/D converter 46 to conditioned samples $\{y_k\}$ from the FIR filter 48.

The tracking mode timing error estimate is described by the following:

$$z_k^t = -y_k \hat{y}_{k-1} + y_{k-1} \hat{y}_k \qquad (13)$$

Within the timing error extraction function, the following relation is obtained:

$$\hat{y}_k = 1\ if\ y_k > THP;$$

$$0\ if\ -THP \leq y_k \leq THP;\ and$$

$$-1\ if\ y_k < -THP \qquad (14)$$

where THP is a programmable threshold.

The digital low pass filter function provided by equation (8) above generates the same function during tracking as during acquisition, with the exception that $z_k^t$ of equation (13) is used in place of $z_k^a$ of equation (5).

The scaling function G in tracking mode is defined by the following:

$$\alpha^t = 2^{-3} + 2^{-n4} \qquad (15)$$

where n3 lies between 0 and 7 and n4 lies between 1 and 8.

The scaling function $\beta$ in tracking mode is defined by the following:

$$\beta^t = 2^{-m3} + 2^{-m4} \qquad (16)$$

where m3 lies between 1 and 8, and m4 lies between 2 and 9.

The update rate scaler function 290 similarly provides the sample group error metric estimates $v_k$ during tracking mode in accordance with the same function (11) as is employed during acquisition mode, with the above terms changed accordingly for tracking. The tracking values result in a narrower bandwidth timing loop, with superior signal to noise ratio during tracking mode, thereby providing increased stability and robustness during data tracking operations of the disk drive 10.

Figure 22:
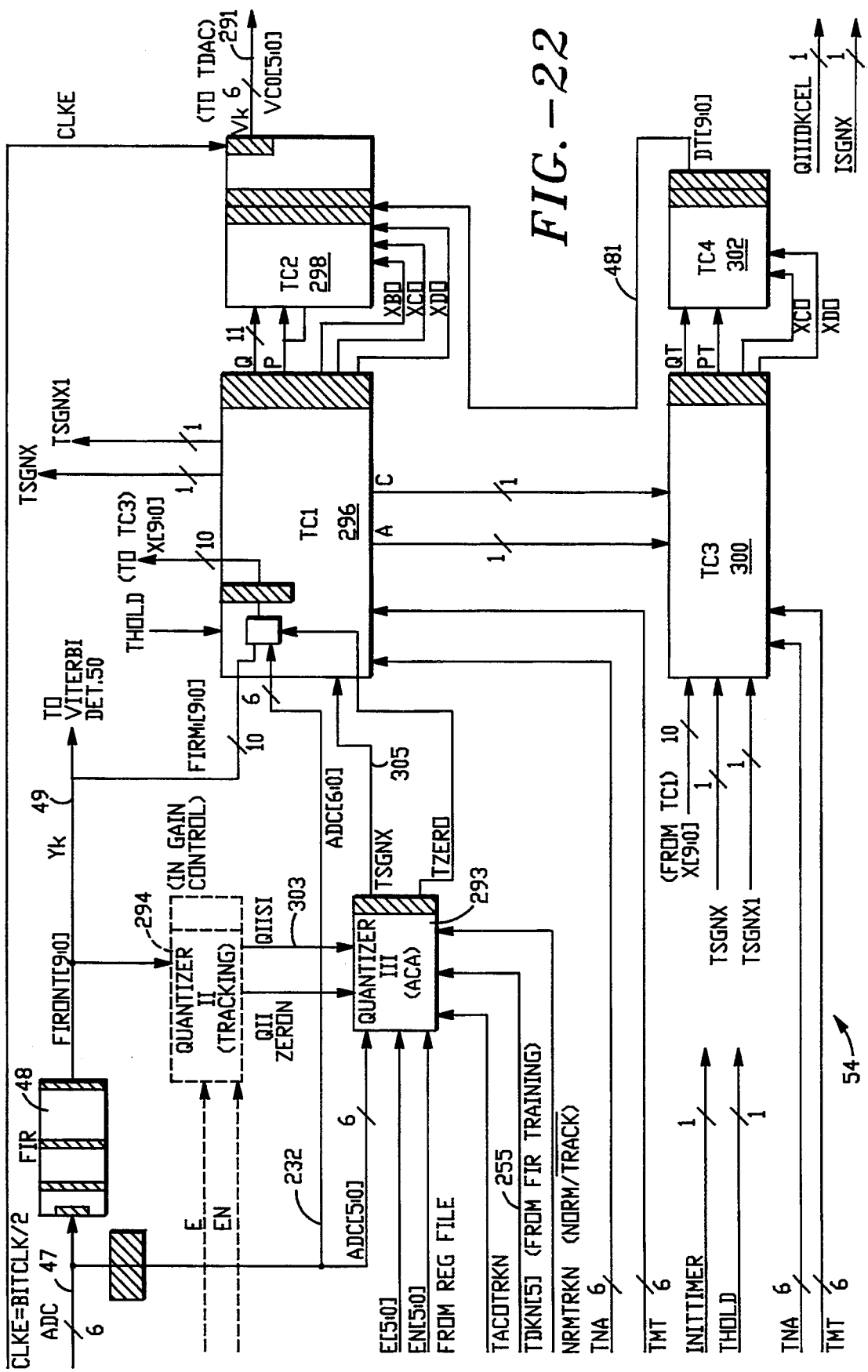
FIG. 22 is a structural block diagram of a portion of the digital timing control block shown in FIG. 4 and in greater functional detail in the FIG. 20 block diagram.

FIG. 22 sets forth a more detailed overview block diagram of the timing control circuit 54 including the error extraction function 286, digital loop filter function 288 and update rate scaler function 290. It will be immediately apparent to those skilled in the art that the error extraction function, digital loop filter function 288 and update rate scaler function 290 are distributed throughout the circuit blocks summarized in the FIG. 22 overview and that there is no block by block correlation with these three functions. Also, in FIG. 22 the switches 282 and 284 are seen to be implemented within two quantizer circuits, an acquisition quantizer 293 (shown in FIG. 23) and a tracking quantizer 294 (shown in FIG. 24). The tracking mode quantizer 294 is also used within the gain loop, to be described hereinafter.

The acquisition quantizer 293 calculates and puts out sgn ($\hat{x}_k$) values on a path 301 during acquisition mode, and the quantizer 294 calculates and puts out $\hat{y}_k$ values on a path 303 ti quantizer 293 during tracking mode. One of these values, as selected by the multiplexers 314 and 316 and put out on a path 305, together with undelayed values $x_k$ (during acquisition) and $y_k$ (during tracking), feed into a first timing calculation circuit 296. The first timing calculation circuit 296, described in greater detail in FIG. 25, performs part of the calculations described above and passes partial results to a second timing calculation circuit 298 described in greater detail in conjunction with FIG. 26, and also to a third timing calculation circuit 300 described in conjunction with FIG. 27. The third timing calculation circuit 300 feeds partial results to a fourth timing calculation circuit 302 shown in, and described in conjunction with, FIG. 29 which provides an output path back to the second timing calculation circuit 298.

Figure 23:
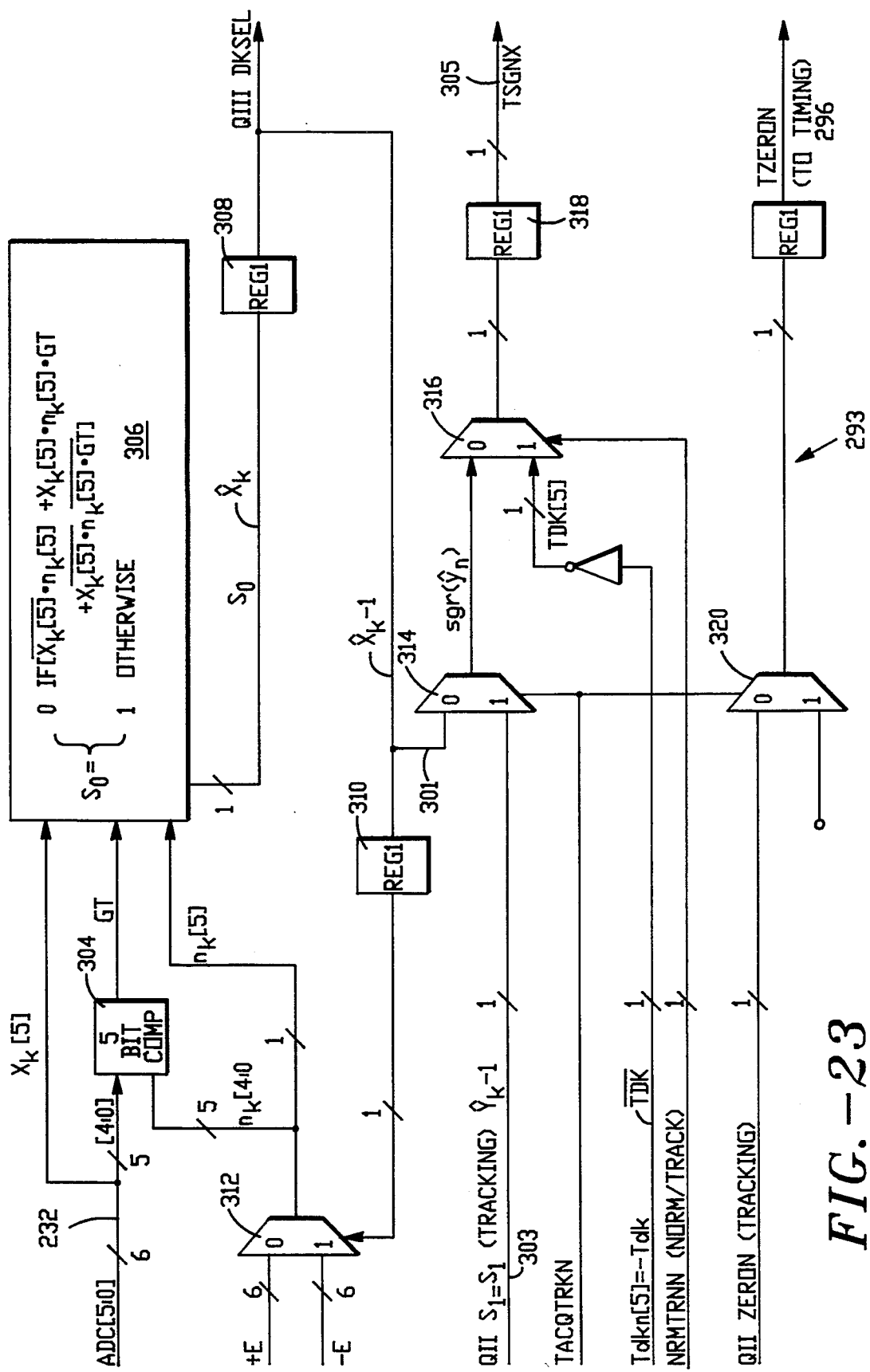
FIG. 23 is a detailed block diagram of an acquisition mode quantizer circuit block shown in the FIG. 22 block diagram.

Turning now to FIG. 23, the acquisition quantizer 293 includes a five-bit comparator 304 which receives five low order bits of the unconditioned digital samples directly from the flash analog to digital converter 46 via the path 47. A high order sign bit enters a logic array 306 which generates the function $\hat{x}_k$ in accordance with formula (6) above. This value is delayed by a register delay 308 and fed back on the path 301 through a second register delay 310 to yield $\hat{x}_{k-2}$, a binary value used to control a multiplexer 312 which multiplies programmable constants +E and −E which are held in the register file 804 of the digital IC 17 by the binary value $\hat{x}_{k-2}$ to yield $\eta_k$, a five-bit value. The resultant value $\eta_k$ put out by the multiplexer 312 is supplied to the five-bit comparator 304 and to the logic array 306.

Figure 25:
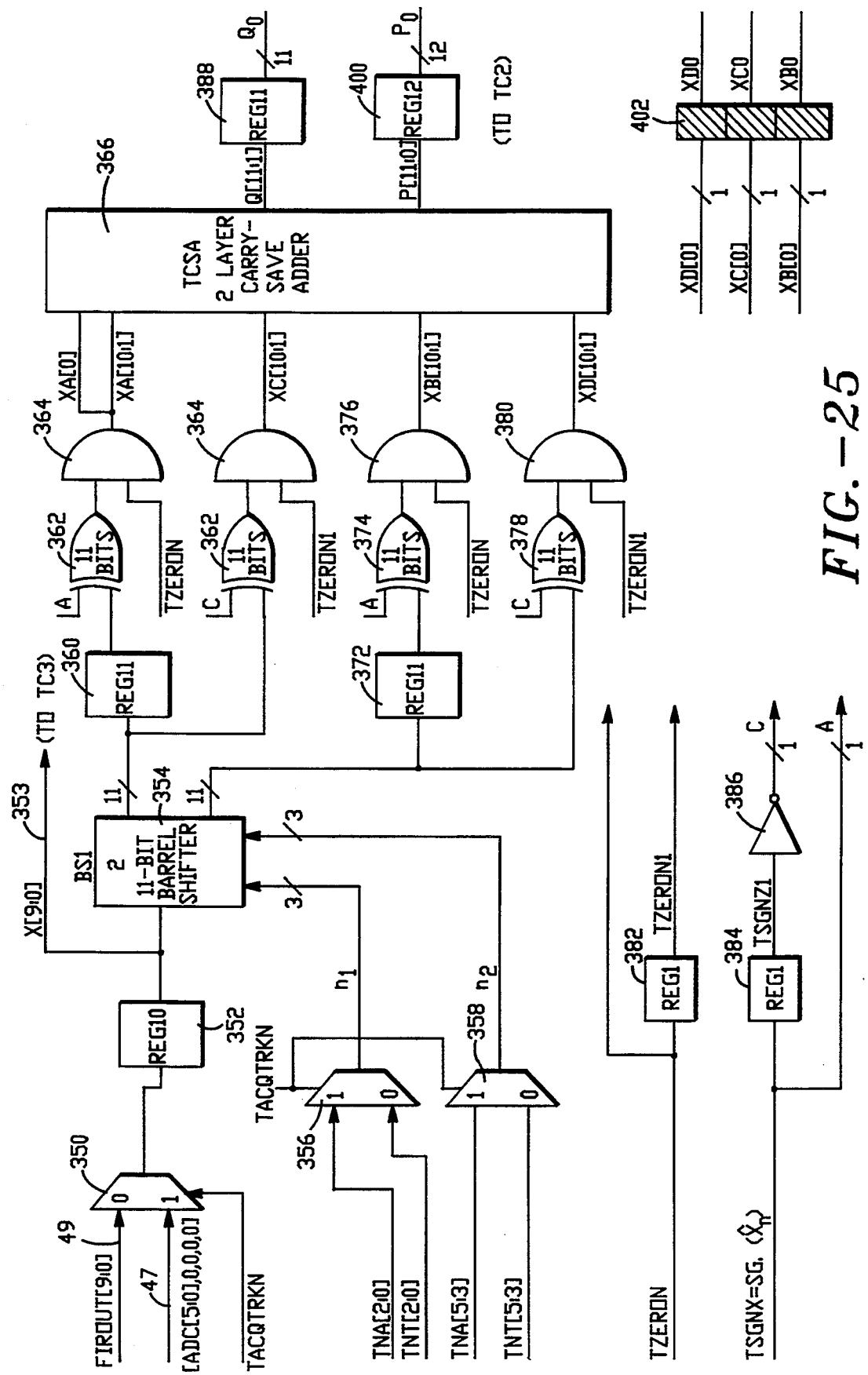
FIG. 25 is a detailed block diagram of a first timing calculation circuit block shown in the FIG. 22 block diagram.

The resultant value $\hat{x}_{k-1}$ is selected during acquisition mode by the acquisition/tracking mode multiplexer 314, and by the normal/training mode multiplexer 316, and a register delay 318 which yields the sgn($\hat{x}_k$) value (during acquisition) or sgn($\hat{y}_k$) (during tracking). This selected value is put out on the path 305 which extends to the first timing calculation circuit 296 (FIG. 25). Another multiplexer 320 selects between a tracking zero value TZERON and 1 in accordance with an acquisition/tracking mode selector signal TACQTRKN which also controls the multiplexer 314. A register delay 322 delays the output from the multiplexer 320 by one clock cycle, and provides the delayed output TZERON to the first timing calculation circuit 296.

The tracking quantizer 294 is shown in FIG. 24 as including a five-bit comparator 324 which receives via the path 49 the five low order bits of the digital samples $y_k$ which have been conditioned by passing through the adaptive FIR filter 48. At the same time a high order sign bit controls a multiplexer 326 which selects between positive and negative programmable threshold values +THP and −THP which are stored in the register file 804 of the digital IC 17. The result of the comparison provided by the circuit 324 and the logic array 328 is $\hat{y}_k$ in accordance with equation (14). This value is passed back to the acquisition quantizer 293 over the path 303 and is selected and put out by the multiplexer 314 during tracking mode.

In addition, a second value dksel is passed through a multiplexer 330 during tracking mode and used to control a six-bit multiplexer 332 which selects between positive and negative reference values +dkval and a −dkval which are part of the digital gain loop. The selected dkval is passed through an AND gate 334 which ands a high order bit from a selector 338 with the values put out by the multiplexer 332. The high order bit from the selector is provided by an exclusive OR gate 336 which compares the bit values S0 and S1 put out by the logic array 328. A selector 340 selects between the selected dkval signals and a six-bit $\overline{TDK}$ value, depending upon whether the FIR filter is in normal mode or is in training mode. A six bit delay register 342 provides one clock cycle delay to the output from the selector 340 and passes the delayed VALUE to other digital circuitry of the gain loop over the path 259. A single bit selector 344 and a delay register 346 provide the ZERON signal to the selector 320 of the acquisition quantizer 293.

Turning to FIG. 25, the first timing calculation circuit 296 includes a selector 350 which selects between the conditioned digital samples $\{y_k\}$ on the path 49 from the FIR filter 48 during tracking mode, and the unconditioned samples $\{x_k\}$ from the flash A/D 46 during acquisition mode. The selected values are delayed by a register delay 352 and are then passed into a first barrel shifter 354 (described in greater detail in FIG. 30). Two selectors 356 and 358 select between acquisition and tracking scaling values, and the selected values are fed into the barrel shifter 354.

During acquisition mode, the barrel shifter 354 generates $\alpha 1 x_k$, and $\alpha 2 x_k$. A delay register 360 yields $\alpha 1 x_{k-1}$, and a delay register 372 yields $\alpha 2 x_{k-1}$. The delayed value from the register 360 passes through an exclusive OR gate 362 and an AND gate 364 to reach a two-layer carry-save adder 366. The adder 366 is described in greater detail in FIG. 30. The undelayed $\alpha 1 x_k$ value from the barrel shifter 354 is passed through an exclusive OR gate 368 and an AND gate 370 before reaching the adder 366. The delayed $\alpha 2 x_{k-1}$ value from the register 372 passes through an exclusive OR gate 374 and an AND gate 376 before reaching the adder 366; and, the undelayed $\alpha 2 x_k$ value from the barrel shifter 354 passes through an exclusive OR gate 378 and an AND gate 378 before reaching the adder 366. During tracking mode the values $\{x_k\}$ are replaced by the values $\{y_k\}$ The exclusive OR gates 362 and 374 compare the incoming values with A values, while the exclusive OR gates 368 and 378 compare the incoming values with C values. A sign decoder comprising a clock period delay 384 and an inverter 386 generates the C value from the A value in accordance with the following table:

| SIGN DECODER TABLE | | | |
|---|---|---|---|
| $\hat{x}_{k-1}$ | C | $\hat{x}_k$ | A |
| 0 (+1) | 1 | 0 (+1) | 0 |
| 0 (+1) | 1 | 1 (−1) | 1 |
| 1 (−1) | 0 | 0 (+1) | 0 |
| 1 (−1) | 0 | 1 (−1) | 1 |

Figure 26:
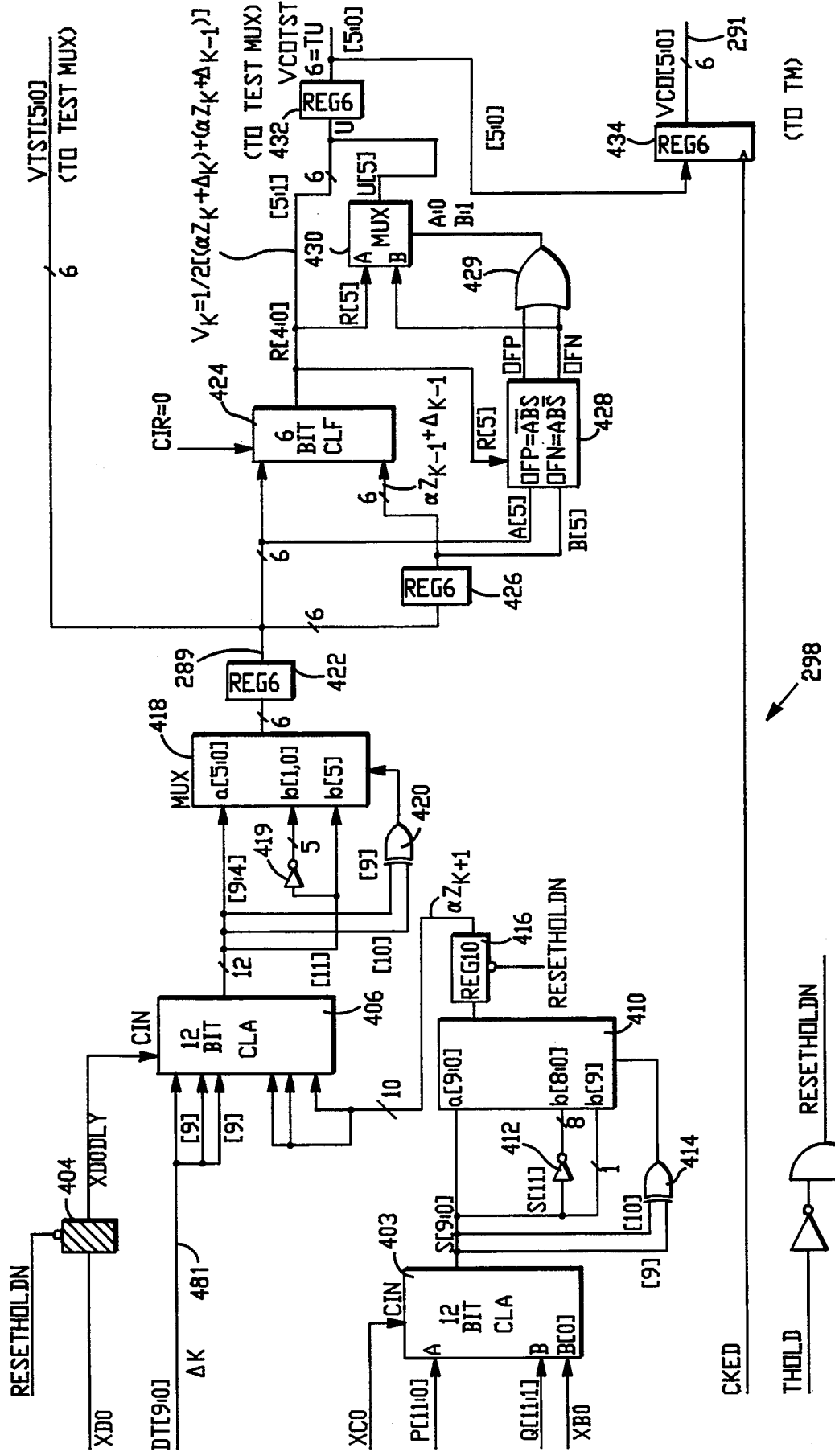
FIG. 26 is a detailed block diagram of a second timing calculation circuit block shown in the FIG. 22 block diagram.

The signal TZERON put out from the delay 322 of the acquisition mode quantizer 293 passes directly as an input to the AND gates 364 and 376. A clock delay register 382 delays the TZERON signal by one clock period and provides a delayed signal TZERON1 to the AND gates 370 and 380. The adder 366 thus combines the four inputs to provide two outputs Q and P which are sums of the four inputs. This operation is part of the calculation needed to arrive at the scaling function $\alpha$ per formula (9) during acquisition and per formula (15) during tracking. The Q value is delayed by a clock period delay 388 and the P value is delayed by a clock delay 400. The delayed Q and P values are then put out to the second timing calculation circuit 298 (FIG. 26). Values XB0, XC0 and XD0 are delayed by a clock period delay register 402 and are also put out the the second timing calculation circuit 298.

Turning now to FIG. 26, the second timing calculation circuit 298 receives the $\Delta_k$ term from the fourth timing calculation circuit 302 over a path 481. The ten-bit $\Delta_k$ term is sent into a 12 bit carry-lookahead adder 406 where it is combined with the $\alpha z_k$ term. This latter term is obtained from a logic array including a 12 bit carry-lookahead adder 408, and a ten bit selector 410. The adder 408 combines the Q and P values received from the first timing calculation circuit 296. A carry input is provided by the XC0 value, and a low order bit position for the Q value is provided by the XB0 value. A ten bit sum from the adder 410 is passed directly into one input of the selector 410, while the same sum is inverted by an inverter 412 and passed directly into the other input of the selector 410. An exclusive-OR gate 414 compares bit positions [9] and [10] of the sum to develop a sign value which is used to control the selector 410. A clock delay register 416 provides a delay to the $\alpha z_k$ term which is then applied to the carry-lookahead adder 406.

Bits [9:4] of the 12 bit sum put out by the adder 406 pass directly into a six bit multiplexer 418. Bit 11 is used to generate a saturation value that is applied to a second input of the multiplexer 418. An exclusive OR gate 420 develops a sign bit to control the multiplexer 418. A six bit delay register 422 delays the value put out by the multiplexer 418 by one clock cycle. During acquisition mode, the output from the register 422 comprises $\alpha z_k + \Delta_k$. A delay register 426 delays this value by one clock cycle, and provides the term $\alpha z_{k-1} + \Delta_{k-1}$. A six-bit carry lookahead adder 424 combines these two terms to yield a sum thereof. An overflow circuit comprising a logic array 428, an OR gate 429 and a multiplexer 430 limits the range of the sum put out by the adder 424. Also, the update rate scaler function 290 is provided by selecting and passing bit positions [5:1] of the sum put out by the adder 424 through a latch 432, thus yielding the $v_k$ function of formula (11) for even timing samples. A register 434, clocked at one half of the data rate, is employed to provide the $v_{k-1}$ function of formula (12) for odd timing samples. The $v_k$ value put out from the register 434 is provided over the path 291 to the timing DAC 57.

Figure 27:
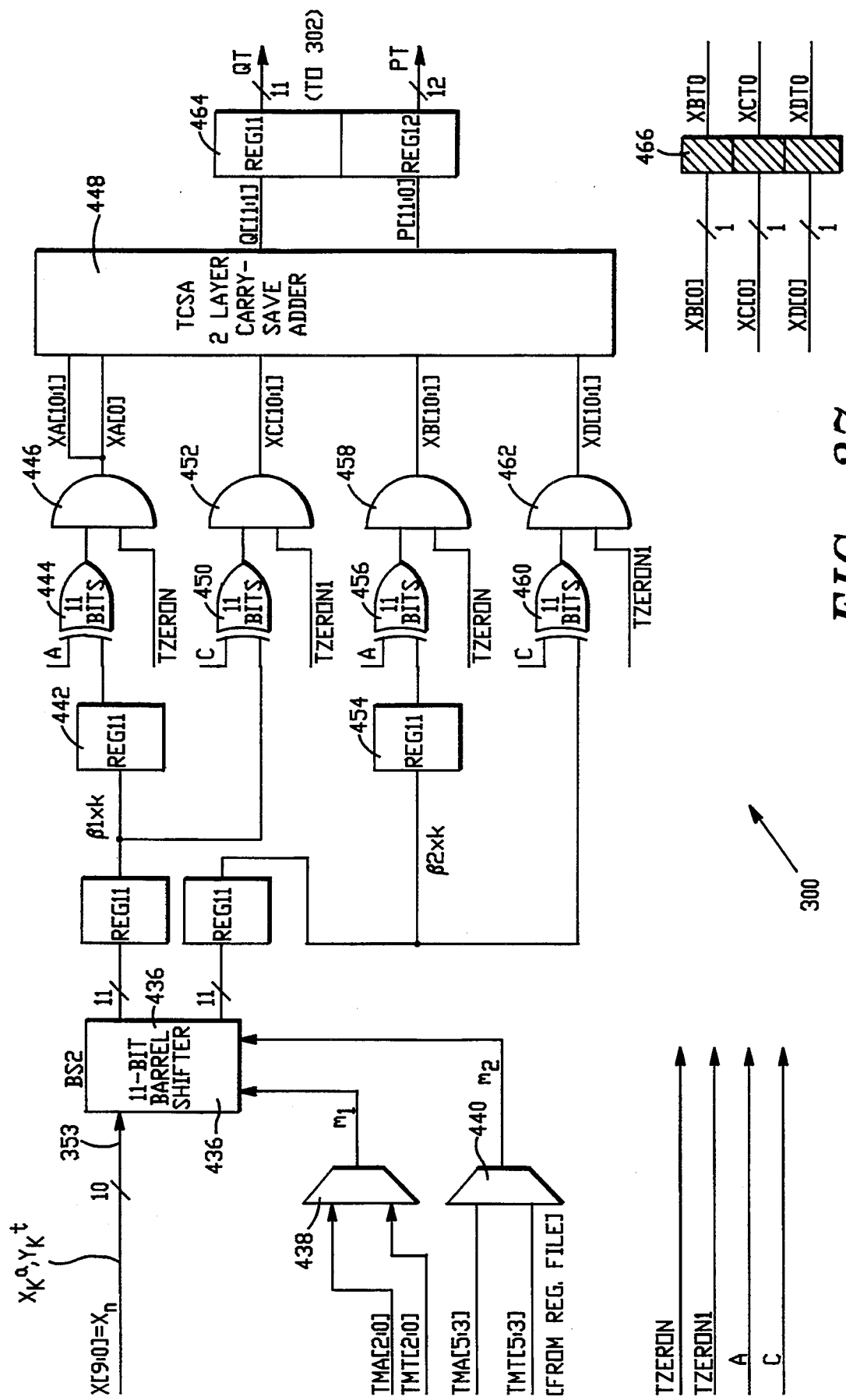
FIG. 27 is a detailed block diagram of a third timing calculation circuit block shown in the FIG. 22 block diagram.
Figure 31:
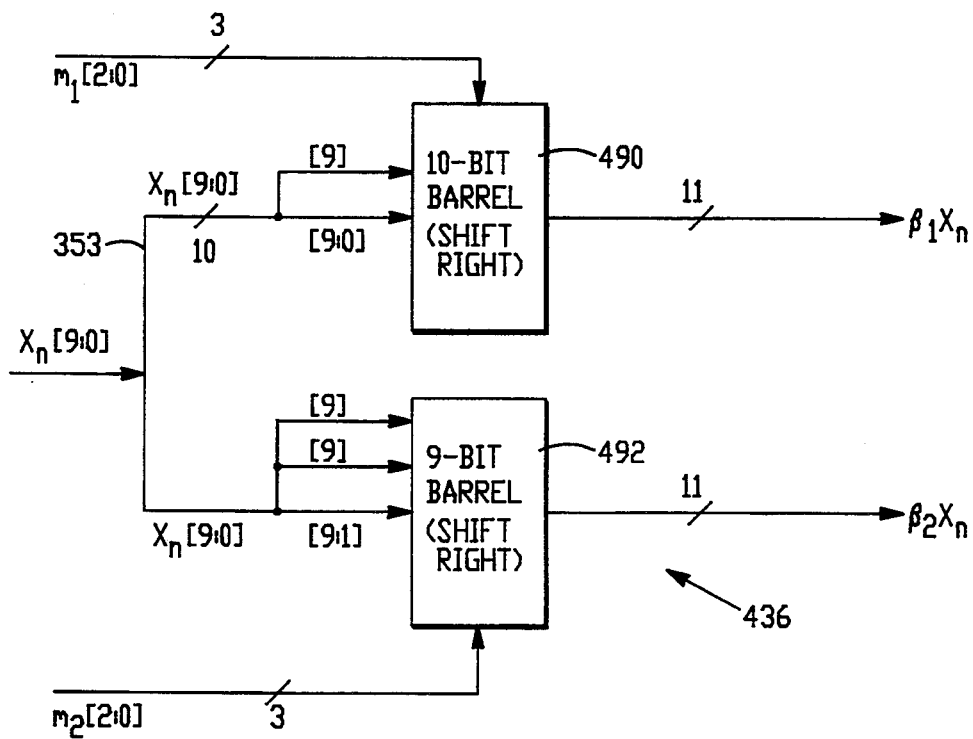
FIG. 31 is a block diagram of a second barrel shifter circuit shown in the FIG. 27 third timing calculation circuit block diagram.

The unconditioned data samples $\{x_k\}$ during acquisition, and the conditioned data samples $\{y_k\}$ during tracking are provided over a path 353 from the delay register 352 of the first timing calculation circuit 296 to the third timing calculation circuit 300 depicted in FIG. 27. These samples are put into a barrel shifter 436 which is illustrated in greater detail in FIG. 31. The scaling constants $2^{-m1}$ and $2^{-m2}$ (during acquisition) and $2^{-m3}$ and $2^{-m4}$ (during tracking) are passed from the register file 804 through selectors 438 and 440, and these constants are combined with the data samples in the barrel shifter 436 to provide the $\beta$ values of formulas (10) and (16).

Figure 29:
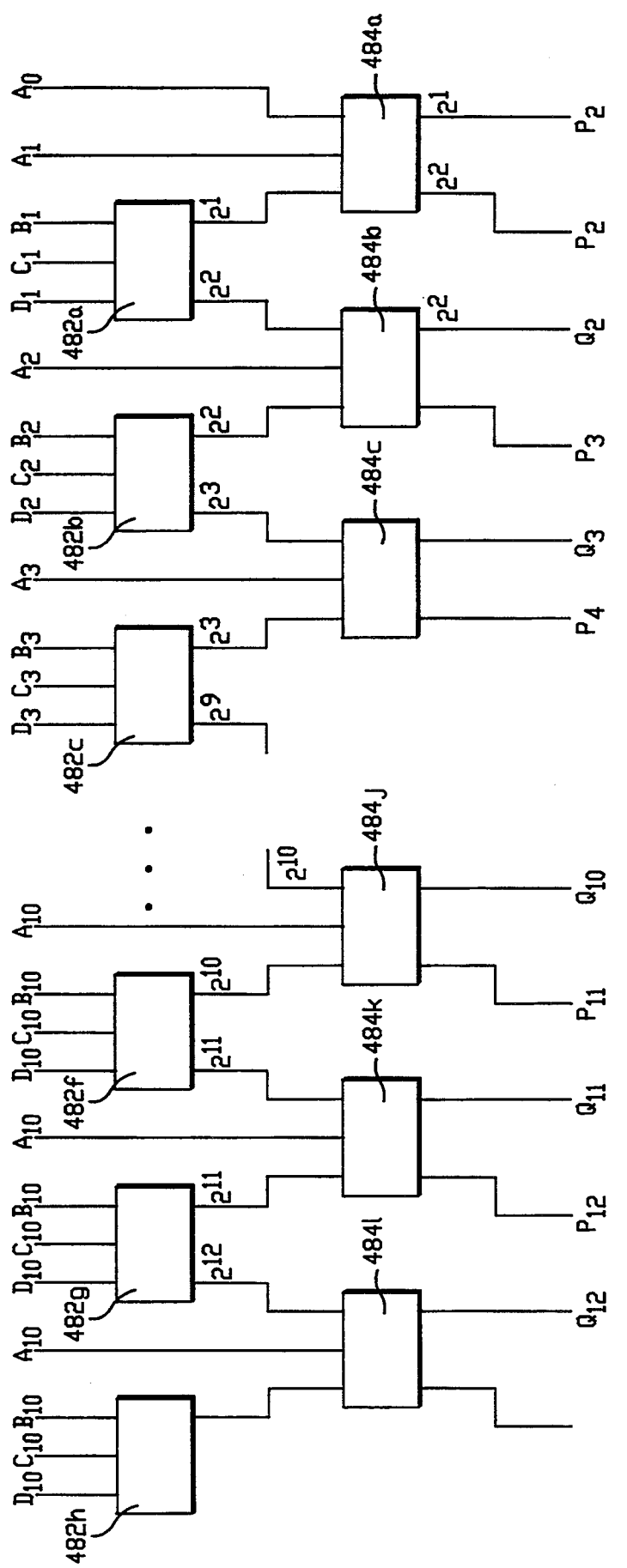
FIG. 29 is a detailed block diagram of a two level carry save adder circuit used within the first and third timing calculation circuit blocks depicted in FIGS. 25 and 27.

A first value $\beta 1 x_k$ is passed through a delay register 442, an exclusive-OR gate 444, and an AND gate 446 before reaching a two layer carry save adder 448, also illustrated in greater detail in FIG. 29. An undelayed first value passes through an exclusive OR gate 450 and an AND gate 452 before reaching the adder 448. A second value $\beta 2 x_k$ passes through a delay register 454, an exclusive-OR gate 456 and an AND gate 458 before reaching the adder 448. An undelayed second value passes through an exclusive-OR gate 460 and an AND gate 462 before reaching the adder 448. The exclusive-OR gates 444 and 456 compare the incoming values with the A value explained above in conjunction with the first timing calculation circuit 296, while the exclusive OR gates 450 and 460 compare the incoming values with the C value similarly explained above. Similarly, the AND gates 446 and 458 combine the incoming values with TZERON while the AND gates 452 and 462 combine the incoming values with TZERON1, also previously explained in conjunction with the first timing calculation circuit 296. Outputs from the adder 448 are delayed by one clock period by a delay register 464 and then put out as values QT and PT to the fourth timing calculation circuit 302. Similarly, a register 466 delays single bit values XB0, XC0, and XD0 by one clock period and puts them out to the fourth timing calculation circuit 302.

Figure 28:
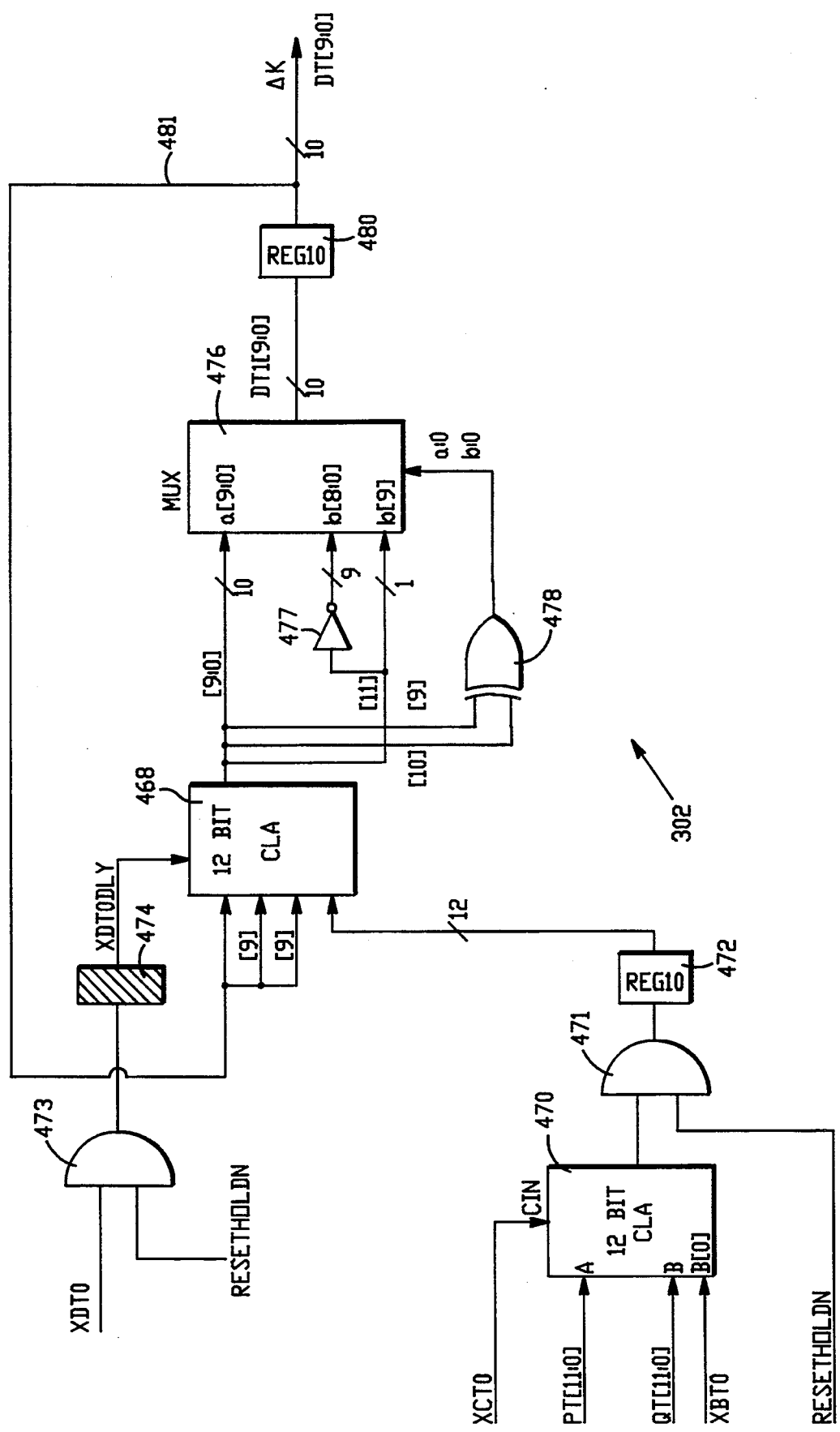
FIG. 28 is a detailed block diagram of a fourth timing calculation circuit block shown in the FIG. 22 block diagram.

Turning now to FIG. 28, the fourth timing calculation circuit 302 receives and combines the QT and PT values from the adder 448 in a 12 bit carry lookahead adder 470. A carry input is provided by the value XCT0, while a low order bit position for the QT input is provided by the XBT0 value. A reset selector 471 selects, and a delay register 472 delays, the resultant sum by one clock cycle. The other input to the selector 471 comprises a reset value for resetting the carry lookahead adder 468. The resultant put out from the register 472 is the scaling value $\beta z_k$ which is a term of the equation (8). This term is combined with a $\Delta_k$ term from a feedback path 481 in another 12 bit carry lookahead adder 468 which puts out a sum. A carry input for the adder 468 is developed from a signal XDT0 which passes through a reset selector 473 and a delay register 474 before reaching the carry input of the adder 468. The sum put out by the adder 468 is directly applied as one input to a multiplexer 476. As before, the MSB of the sum is used to generate a saturation value via an inverter 477 which is applied to a second input to the multiplexer 476. An exclusive-OR gate 478 compares bits [9] and [10] to develop a sign bit for controlling the multiplexer 476. The result put out by the multiplexer 476 is delayed by a single clock period delay register 480 and put out on the path 481 to the second timing calculation circuit 298 as the value $\Delta_k$ in accordance with equation (8).

Figure 30:
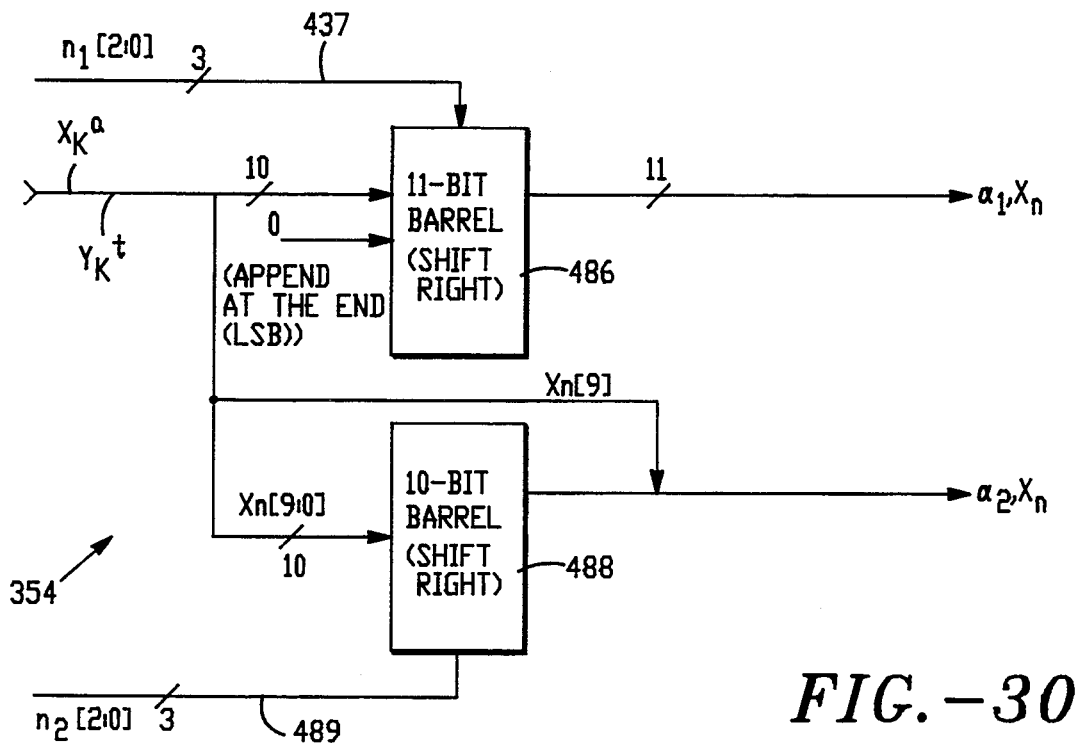
FIG. 30 is a block diagram of a first barrel shifter circuit shown in the FIG. 25 first timing calculation circuit block diagram.

The two level carry save adders 366 and 448 are implemented in accordance with the logic array illustrated in FIG. 29 wherein the first level comprises adders 482a–482h, and the second level comprises adders 484a through 484l. The connections are as illustrated in FIG. 29. The first barrel shifter 354 is shown in FIG. 30 as comprising an 11-bit barrel shifter (right) 486, and a 10-bit barrel shifter (right) 488. The $2^{-n1}$ coefficient is applied to the shifter 486 via a path 487, while the $2^{-n2}$ coefficient is applied to the shifter 488 via a path 489. The barrel shifter 486 puts out the value $\alpha 1 x_k$ ($\alpha 1 y_k$), while the barrel shifter 488 puts out the value $\alpha 2 x_k$ ($\alpha 2 y_k$). The second barrel shifter 436 is shown in FIG.

31, includes a 10 bit barrel shifter 490 which multiplies the $2^{-m1}$ coefficient by the $x_k$ value (acquisition) or $y_k$ value (tracking) to produce $\beta 1 x_k$ ($\beta 1 y_k$), and a 9 bit barrel shifter 492 which multiplies the $2^{-m2}$ value by $x_k$ ($y_k$) to produce $\beta 2 x_k$ ($\beta 2 y_k$).

Zero Phase Start

In order to reduce the length of, and time required for, the ID field preamble sinewave, and thereby to increase storage area available for user data, it is necessary to provide a rapid resynchronization of the current controlled oscillator 62 to incoming data upon a switch from non-read mode to read mode. One way to reduce the time required to acquire correct phase is to stop momentarily the current controlled oscillator 62 and then to restart it in proper phase synchronism with the incoming analog sinewave signal being read back from the disk during the ID field preamble time.

As discussed above, prior peak detection techniques have been able to synchronize a voltage controlled oscillator element of a data separator phase locked loop by virtue of the fact that the incoming read raw data has been differentiated. The edges associated with the differentiated analog waveform are therefore available to establish correct phase timing and lock. In a sampled data system, such as the present PR4,ML system of the present invention, the analog signal is not differentiated. Rather, it is sampled by the flash A/D converter 46. As noted previously, it is necessary to sample the analog waveform at the proper location, denoted SL in the waveforms graphed in FIG. 21, graph B and FIG. 32, graph A.

Figure 32:
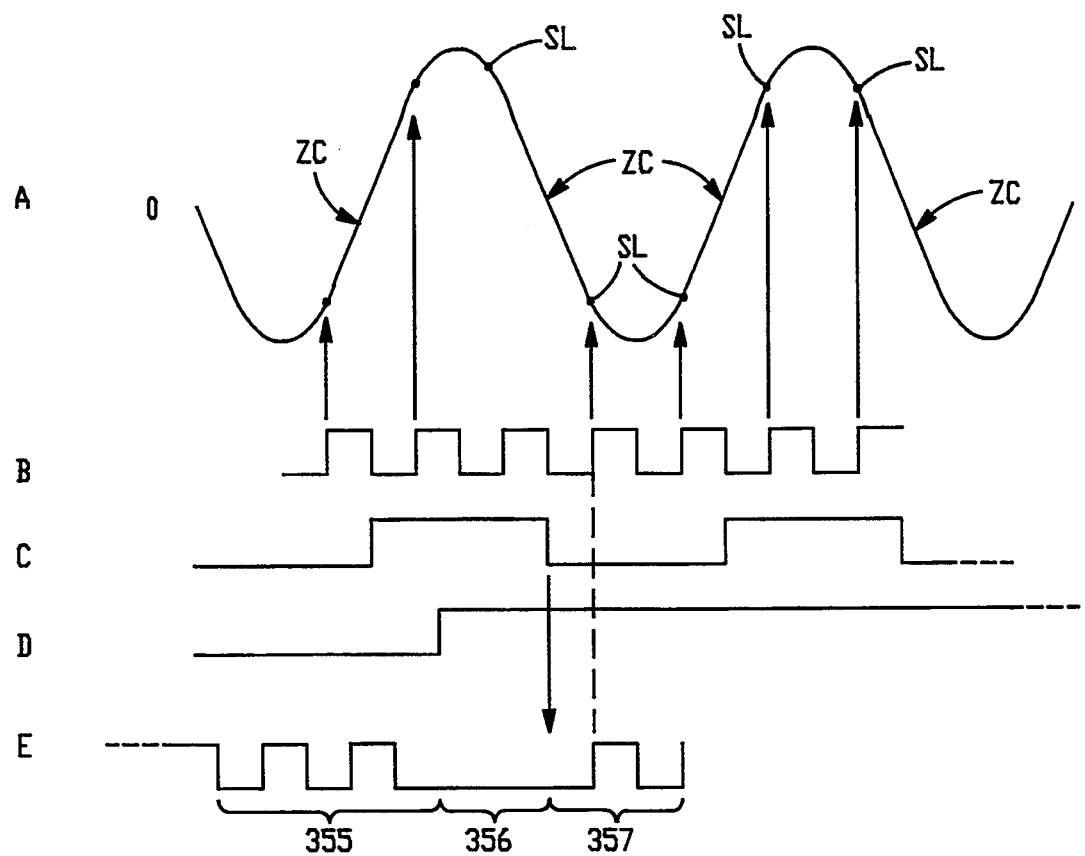
FIG. 32 comprises a series of waveform graphs A through E which are related to a zero phase start control circuit within the FIG. 20 multi-mode timing loop and incorporating aspects of the present invention.

Since the preamble of the ID field will be reproduced by the selected data transducer head 26 as an approximate sinewave, shown in FIG. 32, graph A, it is apparent by inspection that there is a fixed time relationship between the ideal sample locations SL and the zero crossings ZC of this waveform. Thus, by detecting the location of zero crossings of the waveform, a timing loop may be established which may be used to inhibit the current controlled oscillator 62 when the read gate signal RDGATE on the path 275 becomes true.

One way to detect zero crossings is by using a comparator, such as the differential path analog comparator 276 shown in FIG. 20. The inputs to the comparator 276 are differential complements of the analog signal presented at the input of the flash A/D converter 46. Ideally, the comparator 276 generates and puts out a waveform which is a digital equivalent of the preamble sinewave. The ideal digital equivalent is graphed as waveform C of FIG. 32 in relation to a synchronized bit clock, waveform B, and the incoming sinewave of the preamble field, waveform A. In this example, the rising edge of the waveform A sinewave causes the comparator output to become true as it passes through the rising edge zero crossing ZC, and to become false as it passes through the falling edge zero crossing ZC.

In practice, there are logic circuit delays resulting from the operation of the comparator 276, and from a zero phase start logic array 278. The fixed duration delays associated from signal latencies in the comparator 276 and zero phase start logic 278 are lumped and denoted by the delay element 277. If one were using a single frequency, rather than a plurality of frequencies adapted to the radial data zones 70-1 through 70-9, the delay element 277 could be readily tuned to the precise delay length to create the ideal phase relationship illustrated in FIG. 32, graph C, with the FIG. 32, graph A waveform. However, with programmable data rates, the delay ideally is provided with a delay component which is a function of the particular frequency.

This variable delay component is most preferably incorporated into the structure of the current controlled oscillator 62 and is denoted by the element 280. Thus, when the fixed delay 277 is summed with the variable delay 280, the resultant achieved is the desired phase relationship between the incoming differential analog signal and the ICO output (SAMPLECLK).

In operation, the synthesizer 262 is generating the nominal write clock during non-read times, and that clock is used to control the current controlled oscillator 62 via the analog timing loop 60 as explained. The clock frequency, which is not phase locked with the incoming data, is depicted as a segment 355 of waveform E of FIG. 32. The moment that the read gate signal RDGATE on the path 275 is asserted, shown as waveform D of FIG. 32, the operation of the oscillator 62 is momentarily paused, as at a segment 356 of waveform E. This pause, which may be of a variable length covering a fraction to several cycles of the waveform A signal, continues until the comparator output goes false. On the falling edge of the comparator signal, waveform C, the current controlled oscillator clock is restarted as shown at a segment 357 of waveform E of FIG. 32. Therein, the clock cycle is shown to be delayed by a fixed delay increment and a variable delay increment. The samples are then taken coincident (within a modest error margin) with the rising edge of the phase-adjusted output clocking signal ADCLK. Following the zero phase start process, any remaining phase error is removed during the timing acquisition mode of the dual mode timing loop, as previously explained.

Multi-Mode Gain Loop

In a sample-based data detection system, such as the present PR4, ML system, the coded analog information stream read back from the data storage surface is sampled by the flash A/D converter 46 as has already been described. The conversion process includes quantization according to the number of bits resolved by the particular A/D architecture. In the exemplary disk drive system 10, six bits are preferably quantized for each sample. For optimal analog to digital conversion, the full dynamic range of the A/D converter 46 should be available. To provide for full dynamic range utilization, it is necessary to adjust the amplitude of the analog information stream presented at the input to the converter 46. This adjustment is best performed by an automatic gain loop which senses amplitudes as reported by the signal samples, since the sample values determine the recovered information content. The multi-mode automatic gain loop of the present invention includes an analog gain loop for non-read mode times, including embedded servo sample intervals, and includes a digital vernier gain loop for adjusting a sampled and held analog gain value during data read intervals.

FIG. 33 sets forth a block diagram overview of the multi-mode automatic gain loop which is shown more generally in the overall system 10 block diagram of FIG. 4. The preamplified analog readback signal from the preamplifier 28 is presented as a differential signal on the path 29 leading to an input of the first VGA 37, the gain of which is controlled by the analog gain circuit 42. This analog gain circuit includes the full wave rectifier 494, AGC control circuit 496, charge pump 498, capacitor 500 and buffer amplifier 502. The analog AGC loop 42 is thus connected to receive low pass filtered and equalized analog data at the output of the programmable analog filter/equalizer 40. The analog gain control is applied to the first VGA stage 37 over a path 43.

The analog data stream is full wave rectified in order to remove transitional direction (sign) by a full wave rectifier 494. An analog AGC control circuit 496 compares the absolute amplitude of the incoming full wave rectified analog signal with a voltage reference provided from a voltage reference circuit 504 over a path 506. This same voltage reference is also applied to the flash A/D converter 46. A difference between the amplitude reference voltage set by the reference circuit 504 and the measured analog signal level will result in a signed error signal that will cause a charge pump 498 to charge or discharge a reference level storage element, e.g. capacitor 500, connected at the output of the charge pump 498. The charge pump is enabled whenever a HOLD signal on a path 508 is not true, so that when the control signal HOLD is asserted, the charge pump 498 is inhibited and neither sinks nor sources current from or to the capacitor 500. During HOLD, the charge placed on the capacitor 500 is held without change (other than any very slow and insignificant leakage drainage). The voltage charge held across the capacitor 500 is buffered by a buffer amplifier 502 and applied as an analog AGC control value for controlling the first VGA 37.

The VGA stage 37 leads through the constant gain stage 38 to a second VGA 39 which is controlled by a digital gain vernier signal on a path 67 from the gain DAC 66 within the digital gain loop including the digital gain circuit 64 and gain DAC 66. During read mode, when digital samples are being acquired, or are being tracked, the analog charge pump is inhibited, and the digital gain control circuit 64 is active. This gain circuit 64 adjusts the gain of the read signal by using a stochastic gradient technique; and, it includes a gain error estimator function 516 which is connected at the output of the adaptive FIR filter 48. The gain error estimator function 516 compares the magnitudes (amplitudes) of the incoming digital information samples with predetermined values held in the digital register file 804. Errors between acquired values and reference values are gain errors. These gain errors are then passed through a digital loop filter function 518.

The digital gain update provided by the gain error estimator function 516 is performed using a gradient algorithm which is known in the art. After RDGATE is asserted true, the digital loop 64 operates first to acquire the appropriate gain level at initiation of a data read operation, and then to track any signal amplitude variations.

The digital synchronization field previously noted is provided at the beginning of the data track. This field appears in the readback signal as a constant frequency at one fourth of the sample frequency. Ideal sample values are e.g. +2, +2, −2, −2, +2, +2, −2, −2, etc., where "2" represents the ideal VGA normalized signal amplitude at the time of sampling. This preferred constant frequency readback signal field is employed by the multi-mode gain loop during its gain acquisition mode in order rapidly to acquire an appropriate read channel gain setting.

During acquisition mode, the digital gain error estimator function 516 calculates a value $u_k{}^a$ during acquisition mode, in accordance with the following equation:

$$u_k{}^a = (y_k - dkval.\hat{y}_{a,k})\hat{y}_{a,k} \tag{17}$$

where:

$$\hat{y}_{a,k} = sgn(y_k - \bar{n}_k) \tag{18}$$

$$\bar{n}_k = E \cdot \hat{y}_{a,k-2} \tag{19}$$

dkval = programmable constant reference value
E = a constant.

The digital loop filter function 518 establishes the gain of the digital AGC control loop, and also sets the corner frequency thereof. The preferred loop filter is a first order filter, described by $$g_{k+1} = g_k + \gamma^a \mu_k{}^a \tag{20}$$

where $$\gamma^a = 2^{-n5} \text{ in which } 0 \leq n5 \leq 7 \tag{21}$$

The output $f_k$ of the update rate scaler function 520 is $g_k$ for even data samples and $f_{k-1}$ for odd data samples, thereby resulting in a desired reduction by one half of the data rate prior to conversion to analog by the gain DAC 66.

In a steady state, tracking mode, the tracking gain error is given by:

$$\mu_k{}^t = (y_k - dkval.\hat{y}_k)\hat{y}_k \tag{22}$$

where $\hat{y}_k$ is as given in equation (14), above. The output from the digital loop filter function 518 in tracking mode is given by:

$$g_{k+1} = g_k + \gamma^t \mu_k{}^t \tag{23}$$

where $$\gamma^t = 2^{-n6} \text{ where } 0 \leq n6 \leq 7 \tag{24}$$

As shown in the functional block diagram of FIG. 33, the gain error estimator function 516 and the digital loop filter function 518 receive gain error values from the acquisition mode gain quantization circuit 216 and from the tracking mode gain quantization circuit 218. A switch function 514 switches between the two circuits 216 and 218. These circuits 216 and 218 receive program values from the register file 804 which set gain error estimation values for use of a two level reference, and the gain loop bandwidth to a wide level during acquisition; and set gain error estimation values for use of a three level reference and gain loop bandwidth to a narrower level during tracking, in order to provide greater loop stability and immunity to noise artifacts, for example.

The use of a digital gain control loop (as well as the use of a digital timing control loop as previously described hereinabove) has a number of advantages. First, a gain (or timing) control loop controlled via digital samples is less sensitive to variations in temperature, power supply and component tolerances than is a strictly analog control loop. Second, loop compensation or bandwidth may be easily adjusted or varied simply by loading registers, or by switching between banks of registers for "on the fly" changes. This means that optimal loop compensation may be used during both acquisition and tracking modes. Finally, the digital loop filter eliminates errors otherwise due to bias and offset that may exist in an analog-only loop filter implementation.

The update rate scaler function 520 selects every other $g_k$ value put out by the digital loop filter function 518 and passes the selected values on to the gain DAC 66 over the path 63. In this manner, the gain DAC 66 may be clocked at one half of the sample clocking rate. This half rate clocking signal is supplied to a clock input of the DAC 66 over a path 522. By operating the gain DAC 66 at a reduced update rate, control loop latency is increased effectively by one A/D clock cycle, which slightly, but negligibly reduces overall phase margin of the digital gain control loop 64.

The gain DAC 66 puts out a control current over a path 67 to control the gain of the second VGA 39. In this manner, the digital loop acts as a vernier for high resolution adjustment of the coarse gain value already established by the analog gain loop and held across the capacitor 500.

Basically, there are two logical signals that control the multi-mode gain loop: HOLD on the path 508 and RDGATE on the path 275. The analog gain loop 42 is used to establish a gain setting when the system is not phase locked to the incoming signal. One important time when this occurs is when an embedded servo sector is being read. In this instance the frequency of the servo sector information is typically different from the frequency of the selected data zone 70. The analog gain loop 42 permits adjustment of the VGA 37 to an appropriate level, so that the servo circuit 24 can recover the embedded servo information and correct head position as may be required. When a user data field is approached and sampling detection is to begin, the gain loop switches over to the digital portion which then adds to or subtracts from the coarse gain value established by the analog gain loop 42 and held across the capacitor 500. As noted, once switchover to digital mode has occurred, the analog charge pump 498 is inhibited, and no longer sources or sinks current to or from the capacitor 500.

Figure 34:
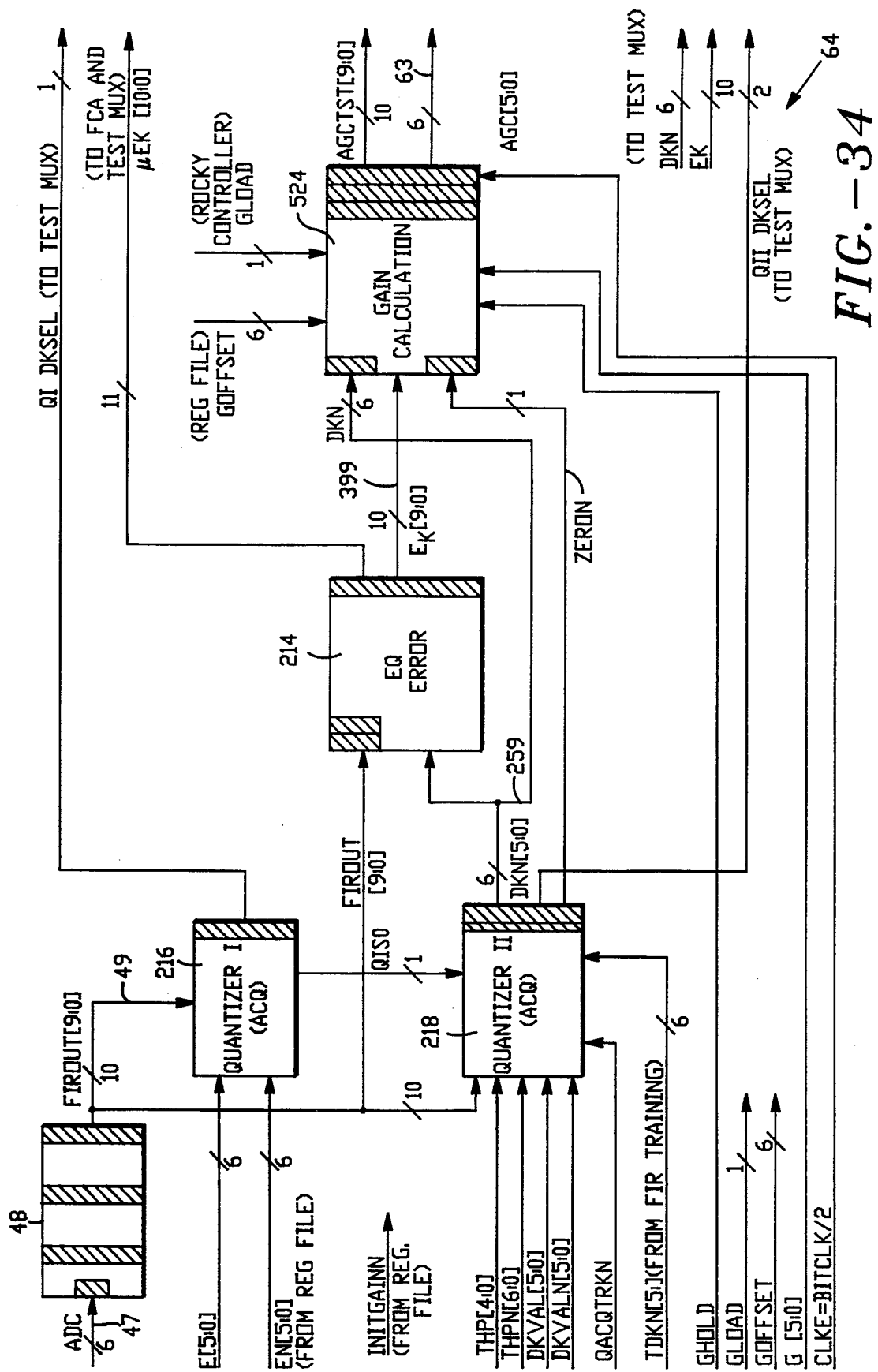
FIG. 34 is a more detailed structural block diagram overview of the digital gain control block shown in FIG. 33.

FIG. 34 shows a preferred implementation of the gain loop digital control block 64 in greater structural detail. The circuitry depicted in FIG. 34 differs somewhat from the functional blocks 516, 518 and 520 illustrated in FIG. 33. In preferred structural implementation, the blocks 516, 518 and 520 are implemented within the equalizer error block 214 and a gain calculation block 524. These blocks 214 and 524 generate the filtered and scaled digital gain error value $f_k$ on the path 63 which is converted by the gain DAC 66 into a value for controlling the VGA 39 during periods when the read gate signal on the path 275 is true.

Figure 35:
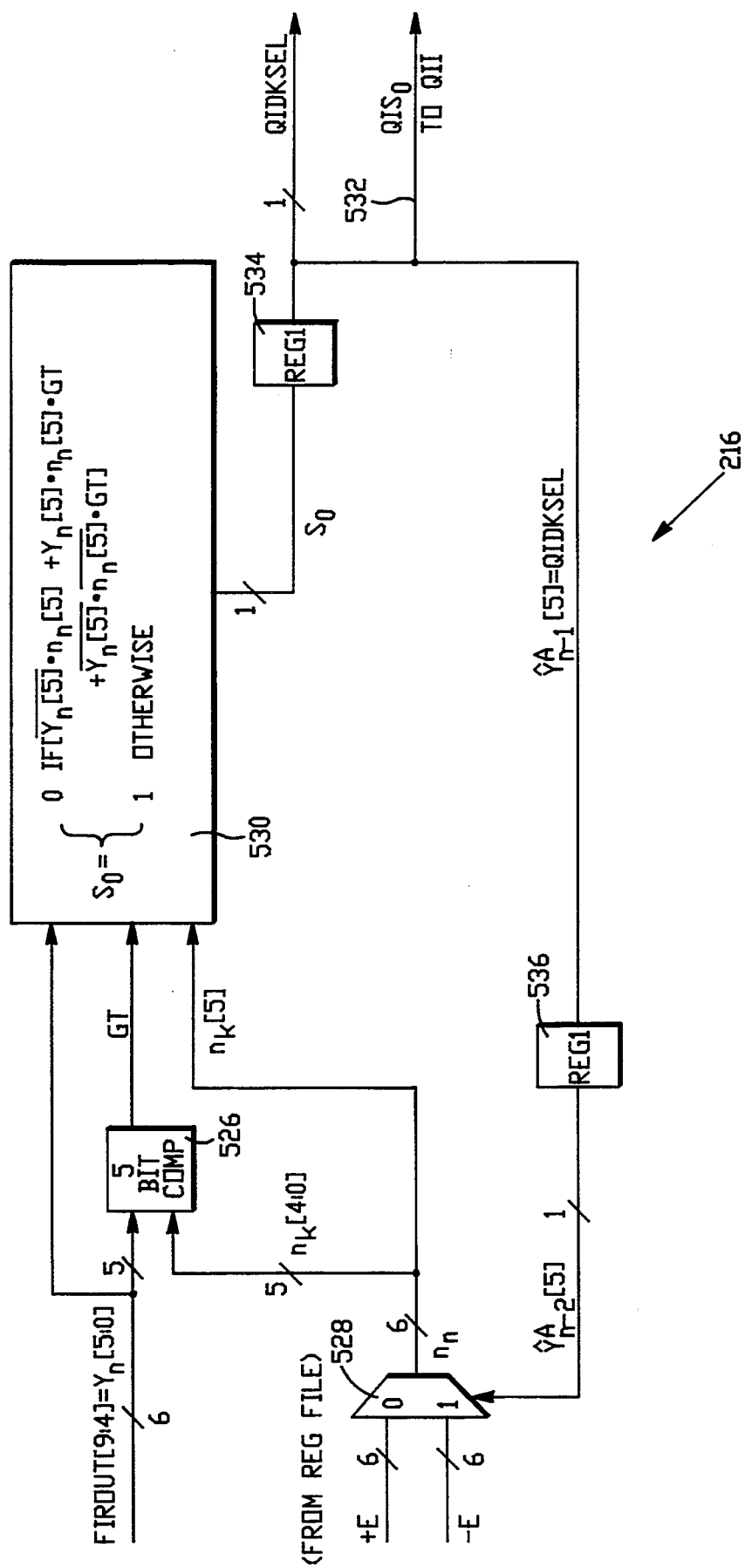
FIG. 35 is a detailed block diagram of an acquisition quantizer calculation circuit within the digital gain control block shown in FIG. 34.

FIG. 35 describes the acquisition mode gain quantizer 216. This circuit includes a 5 bit comparator 526 which receives the $\{y_k\}$ data samples from the FIR filter 48 on the path 49. A multiplexer 528 receives plus and minus threshold values E which are stored in the register file 604, and puts out a selected threshold $\bar{\eta}_k$. The comparator 526 compares the magnitude of the incoming data samples $y_k$ with the threshold $\bar{\eta}k$ and puts out a greater than (GT) signal to a logic circuit 530. The most significant bit of the threshold $\bar{\eta}k$ is also applied directly to the circuit 530. The circuit 530 calculates a bit value So and puts it out on a path 532 to the tracking mode gain quantizer circuit 218 (FIG. 24). This signal is also passed through a first clock delay 534 and a second clock delay 536 to provide a twice delayed signal to control operation of the multiplexer 528.

The tracking mode quantizer 218 is depicted in FIG. 24 and has already been described hereinabove. The equalizer error circuit 214 depicted in FIG. 36 has also already been described above in conjunction with the FIR filter 48. Those previous descriptions are incorporated herein by reference.

Figure 37:
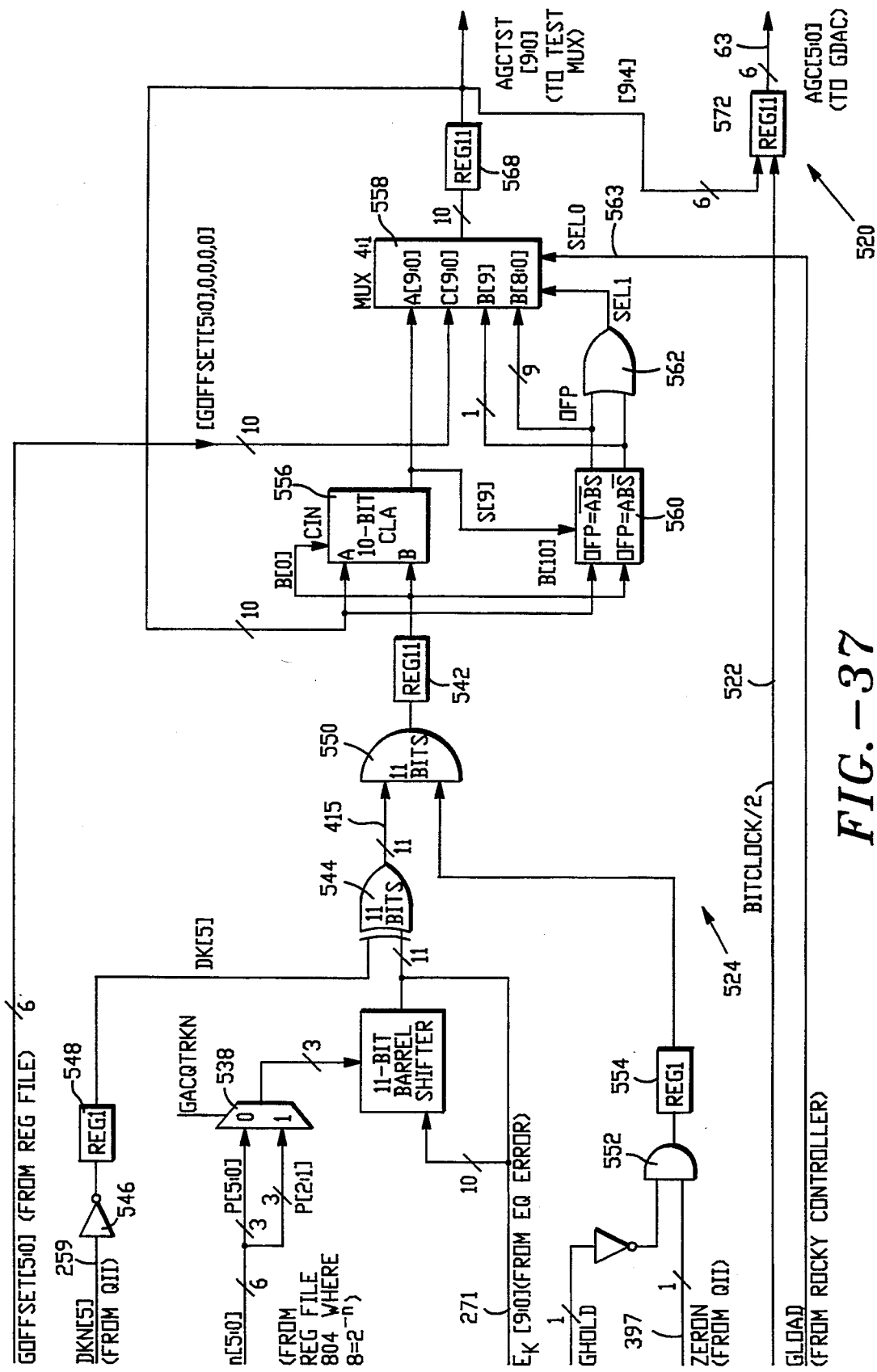
FIG. 37 is a detailed block diagram of a gain calculation circuit within the gain control block shown in FIG. 34.

Details of the gain calculation circuit 524 are set forth in FIG. 37. The register file 804 provides gain scaling step exponent values n5 and n6 which enter a multiplexer 538 which puts out $\gamma$ as a three bit scaling factor to an eleven bit barrel shifter 540. The barrel shifter 540 multiplies incoming error values $e_k$ on the path 271 from the equalizer error circuit 214 by the scaling factor values and passes the product to an exclusive OR array 544 having 11 bit positions. The dkn sign bit on the path 259 is inverted by an inverter 546 and delayed by a delay register 548 before being passed into the exclusive-OR array 544 to perform the multiplication of equations (17) and (22) above. The resultant product is put out on a path 415 to an 11 bit AND gate array 550. The zeron value on the path 397 from the tracking mode gain quantizer 218 is passed through an AND gate 552, and a delay latch 554 before reaching another input of the AND gate array 550.

The output from the gate array 550 is passed through a delay 542 and into a 10 bit carry lookahead adder 556 to provide a calculated gain error output. One input of a multiplexer 558 receives the output directly from the CLA adder 556 while another input of the multiplexer 558 receives a saturation value generated by the MSB of the sum. An overflow circuit 560 generates overflow values and an OR gate 562 controls the multiplexer 558. Another input to the multiplexer 558 is provided over a path 563 from the controller 802 of the digital IC 17 for enabling loading of a preestablished offset value from the register file 804 into the multiplexer via a path 566.

The output from the 4:1 multiplexer 558 represents the value $g_k$, and it is passed through a delay register 568 to provide a one clock cycle delay. The delayed output is then fed back as the feedback path input to the 12 bit carry lookahead adder 556. The multiplexer output $g_k$ is also passed through another delay register 572 which is clocked at one half of the sample clocking rate, which therefore provides the update rate scaler function 520. The output from the register 572 takes the path 63 to the gain DAC 66 as shown in FIG. 33.

Figure 38:
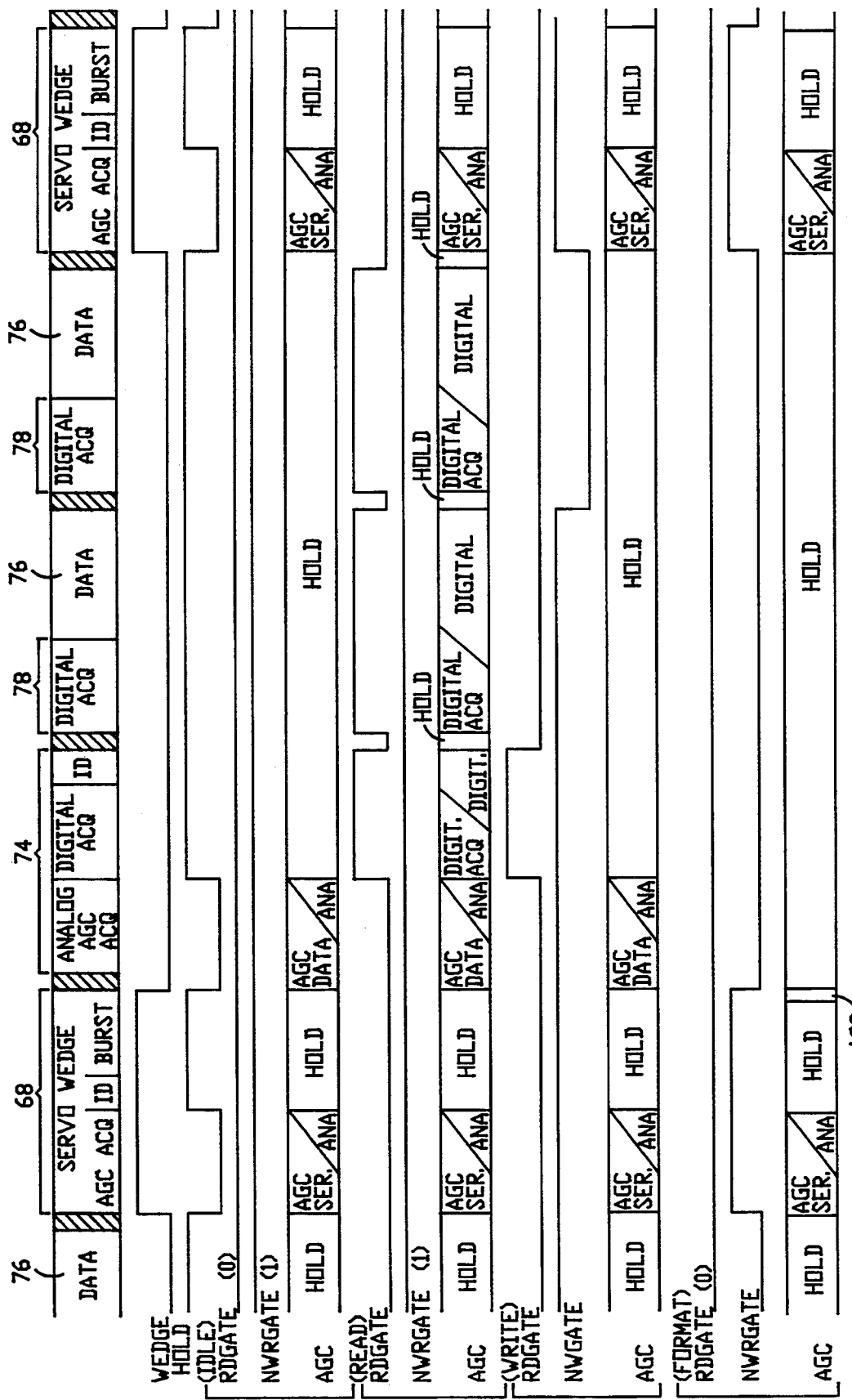
FIG. 38 is a series of timing graphs illustrative of several of the operational modes of the FIG. 33 analog and digital gain control loop during disk drive operations of the FIG. 4 PR4,ML disk drive.

With reference to FIG. 38, four exemplary operational modes of the system 10 are shown in reference to a segment of a data track similar to the segment graphed in FIG. 6. The hatched regions of the track segment correspond diagrammatically to write splice regions where there may be frequency/phase discontinuities attributable to overwrite operations occurring during data writing or formatting operations. Each embedded servo wedge field 68 includes e.g. at least three portions: an AGC acquisition field, a track ID field, and a centerline-reference burst field. The ID field 74 includes an analog AGC acquisition field, a digital acquisition field, and a track/block ID number field. The track/block ID number field identifies the data block fields 76 that follow the ID field 74. These data fields, as shown in FIG. 6, take up the available track space before the next servo sector 68 is reached, and there may be any number of them including fractional blocks, or "split data fields". The data block fields include a digital acquisition field 78 followed by user data. A special marker called "sync byte" is written just after the digital acquisition field to indicate that the data is now beginning.

Directly below the graphed data track segment are logical levels for a servo WEDGE timing window signal, and the HOLD signal which controls the operation of the analog charge pump 498. The operational modes graphed in FIG. 39 include IDLE, READ, WRITE, and FORMAT; and the state of the read gate RDGATE signal is graphed, as well as the overall operational state of the multi-mode gain loop, graphed "AGC".

Just before the servo field 68, HOLD is high, and RDGATE is low. This means that the analog charge pump 498 is disabled, the DAC reset is inactive, and the gain DAC 66 is fixed at a reference level. Since neither the DAC 66 nor the analog AGC loop 42 are operating, gain of the VGA 38 is determined solely by whatever voltage is being held in the capacitor 500, and the AGC loop is said to be in "hold". At the beginning of the servo field 68, HOLD goes low. This causes the DAC 66 to reset and the analog AGC loop 42 to become active. At this time the analog AGC loop acquires the predetermined reference value established by the reference circuit 504 by charging or discharging the capacitor 500 as appropriate. Thus, the servo signal amplitude is acquired. The servo AGC acquisition field within the servo sector 68 is sufficiently long for the analog AGC loop 42 to settle to a quiescent operating point before reaching the servo track ID field. Near the beginning of the track ID field, as determined by a counter, HOLD is asserted true, thereby disabling the analog charge pump 498. The AGC loop is then in "hold" and the gain stays at the value it was just prior to the assertion of HOLD, so that the signal size variations in the centerline burst field can be detected and recorded without any amplitude modification being caused by the AGC loop.

At the end of the servo burst field 68, HOLD is deasserted, reenabling operation of the analog AGC loop 42. At this time, the analog AGC loop is acquiring gain from the ID field, which is generally different from the gain acquired for the servo field 68. The ID analog AGC acquire field within the ID field 74 is sufficiently long so that the analog loop settles at a new quiescent gain value before the digital acquire field is reached. At the end of the analog acquire field, HOLD is once again reasserted.

During a data read operation, at this point, the read gate signal RDGATE on the path 275 is asserted true. At this point, the analog charge pump 498 is disabled, and the gain DAC 66 is enabled. Having been reset during "hold", the gain DAC 66 initially puts out the reference current, so that the gain of the VGA 38 is not affected by a discontinuity at switchover to the digital AGC loop. After several A/D clock cycles of delay, the digital gain error estimator 516 begins putting out valid gain error words. These gain error words are processed through the digital loop filter and then decimated and passed on to the gain DAC 66 via the update rate scaler 520. At this point the digital AGC loop 64 is closed around the filtered digital samples being put out from the adaptive FIR filter. At this time the gain error estimator 516 and the digital loop filter 518 are set with values provided from the acquisition quantizer 216 which are appropriate to obtaining rapid acquisition of gain. Just before the digital ID field is reached, again as determined by a counter, these values are switched to tracking values provided by the tracking quantizer 218, which are normally values selected to provide lower loop bandwidth and lower loop gain. Throughout the duration of this field, and throughout subsequent data fields, the HOLD value remains asserted true and the analog AGC loop 42 is disabled. However, the voltage held on the capacitor 500 continues to affect gain of the VGA 37 as a static offset value. In this manner gain acquisition times are minimized, and the required dynamic range of the gain DAC 66 is significantly reduced. Also, by operating the gain DAC 66 at half of the data clocking rate reductions are realized in power consumption, susceptibility to glitch energy and noise, and circuit design complexity.

In read mode, the read gate signal RDGATE toggles low at each subsequent write splice in order to bypass timing glitches that would otherwise adversely affect the timing loop. These glitches generally do not affect the AGC operation. However, when RDGATE goes low inputs to the gain DAC 66 are disabled, causing a "hold" condition for the duration of the write splice. At the beginning of each data block field, the digital acquire process is repeated, followed by digital tracking. The digital AGC loop 64 remains in operation until the next servo sector 68 is encountered.

With the foregoing description of operation of the multi-mode gain loop during read mode, those skilled in the art will appreciate and understand from FIG. 34 the operation of the gain loop during idle, write and format operational modes.

By providing an analog AGC control loop 42 which is effectively nested within a sampled data digital AGC control loop, the variable gain amplifier 37 may be effectively controlled during intervals when digital samples may be unavailable or asynchronous, which may occur during servo sector times in drives employing embedded servo sector technology. Also, as noted, the acquired operating point of the analog gain loop 42 continues to be used during digital sampling mode as a coarse reference point which is refined and updated in an additive fashion by the digital loop, thereby reducing acquisition time and simplifying the design of the digital circuitry.

Asynchronous Servo Data Detection with PR4, ML Channel

While a PR4, ML channel may be used within disk drives employing a myriad of head positioning methods, a presently preferred method is to employ a series of circumferentially spaced apart, radially extending embedded servo sectors 68 as shown in FIGS. 5 and 6. With the approach described hereinabove in conjunction with FIGS. 5 and 6, a plurality of radial data zones 70-1 to 70-9 enable a significantly greater amount of user data to be stored on each disk 16 than if areal recording densities were limited to the density available at the innermost circumferential zone, e.g. zone 70-9 in the FIG. 5 example. While the data transfer rates are increased from the inner zone 70-9 to the outermost zone 70-1, the data transfer rate within each servo sector 68 is selected to be a constant, servo data rate.

The servo AGC acquisition field 68a provides in playback a sinewave at e.g. a 6T period. This fixed short duration sinewave is needed to reset the gain of the PR4,ML channel in the manner described above for adjustment of the analog gain loop. A reference clock REFCLK related to the servo frequency clocks the A/D 46 during servo sector time and will be selected and put out as the ADCLK signal on the path 63. However, the ADCLK signal will be asynchronous with respect to incoming servo data, such as the track number data contained within the servo ID number field 68b.

Accordingly, the servo ID number field 68b is written at a very low frequency with respect to the data rate. One presently preferred flux transition pattern for a Gray coded binary zero is: 10 000 010 0; and, a presently preferred flux transition pattern for a Gray coded binary one is: 10 010 000 0. In these examples, 9 timing cells (T) at the servo data rate are required for each binary one or zero of the Gray coded track identification number. Also, flux transitions are not closer than 3T nor farther apart than 6T.

Figure 39:
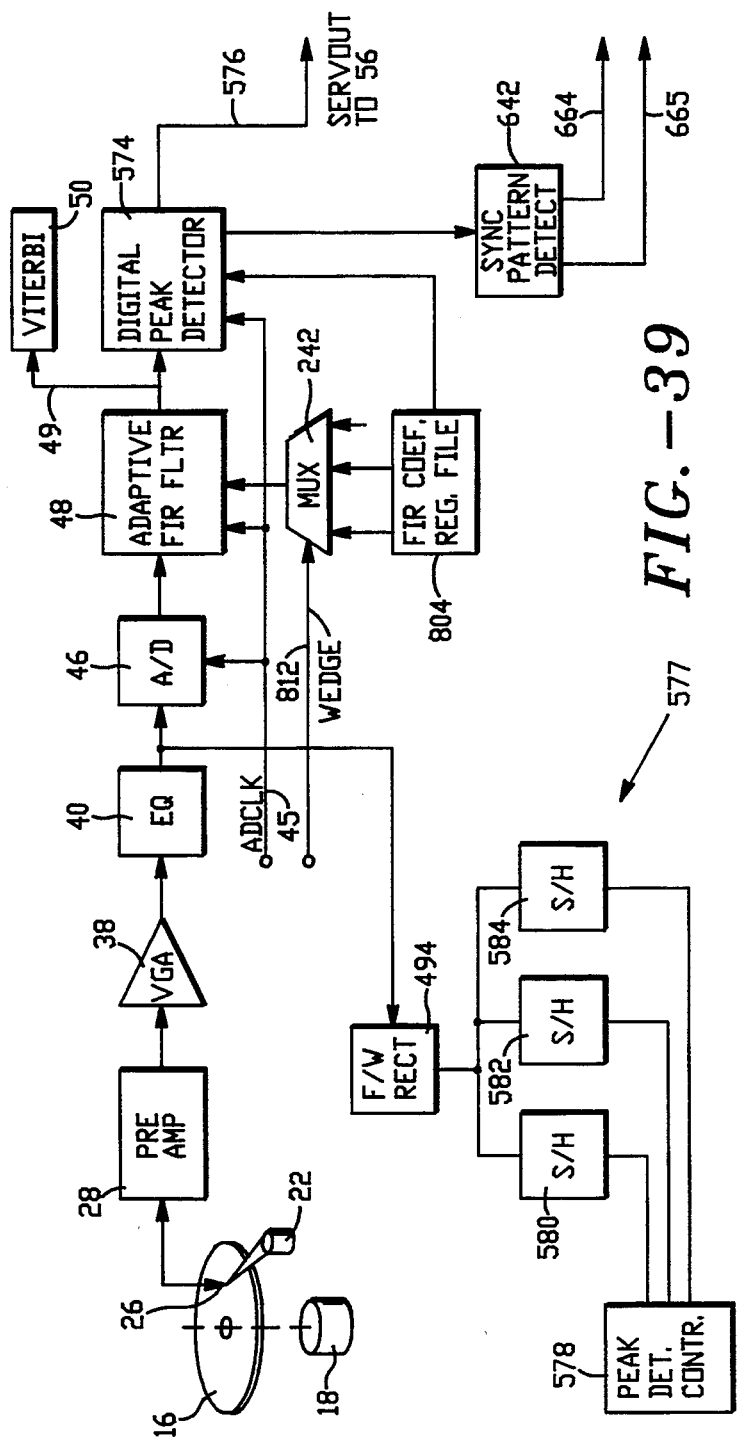
FIG. 39 is an overview block diagram of a portion of the FIG. 4 PR4,ML disk drive architecture relating to detection and decoding of embedded servo information within the FIG. 5 data surface recording plan, in accordance with aspects of the present invention.

With reference to FIG. 39, a servo/sync detector 574 is connected to receive the output of the adaptive FIR filter 48, The WEDGE 0,1 control signals cause the FIR filter coefficients multiplexer 242 to switch from coefficients which are loaded into the FIR filter 48 for the particular data zone 70 to servo coefficients which are then loaded into the FIR filter 48. The servo coefficients are selected to configure the FIR filter 48 into a low pass filter having characteristics tailored to pass the low frequency servo ID field data 68b, but which reject noise and other unwanted higher frequency components in the data stream.

The REFCLK clocking signal on the path 44 is applied to clock the A/D converter 46; and ADCLK on the path 45 is applied to clock the adaptive digital FIR filter 48 and the servo/sync detector 574. The A/D converter 46 puts out quantized samples of the analog data stream which includes the servo ID field data 68b, albeit asynchronously to this servo data. The resultant samples are exemplified as quantization values $y_k$, $y_{k-1}$, $y_{k-2}$, $y_{k-3}$, $y_{k-4}$, and $y_{k-5}$ in the FIG. 40 waveform graph which are shown to be asynchronous to the peaks and zero crossings of the incoming analog servo data waveform. These low pass filtered servo data quantization values are delivered to the servo/sync detector 574 from the adaptive FIR filter 48 over the path 49. In a manner shortly to be explained, the servo/sync detector 574 determines whether each data sample represents a transition or non-transition within the e.g. nine T cell string comprising a single servo binary bit, and puts out a logical high or low signal on a path 586 during each T cell period of the servo sector ID field 68b.

The servo detection circuit also includes peak detection circuitry including a peak detector controller circuit 578, and e.g. three peak detectors 580, 582 and 584, which sequentially sample the A, B and C burst peaks in the servo burst field 68C. Absolute peak values are provided to the detectors 580, 582 and 584 by the full wave rectifier 494 in the analog gain loop. The peak detection method for determination of track centerline information is as described in the referenced, commonly assigned U.S. patent application Ser. No. 07/569,065 filed on Aug. 17, 1990, now U.S. Pat. No. 5,170,299.

Figure 41:
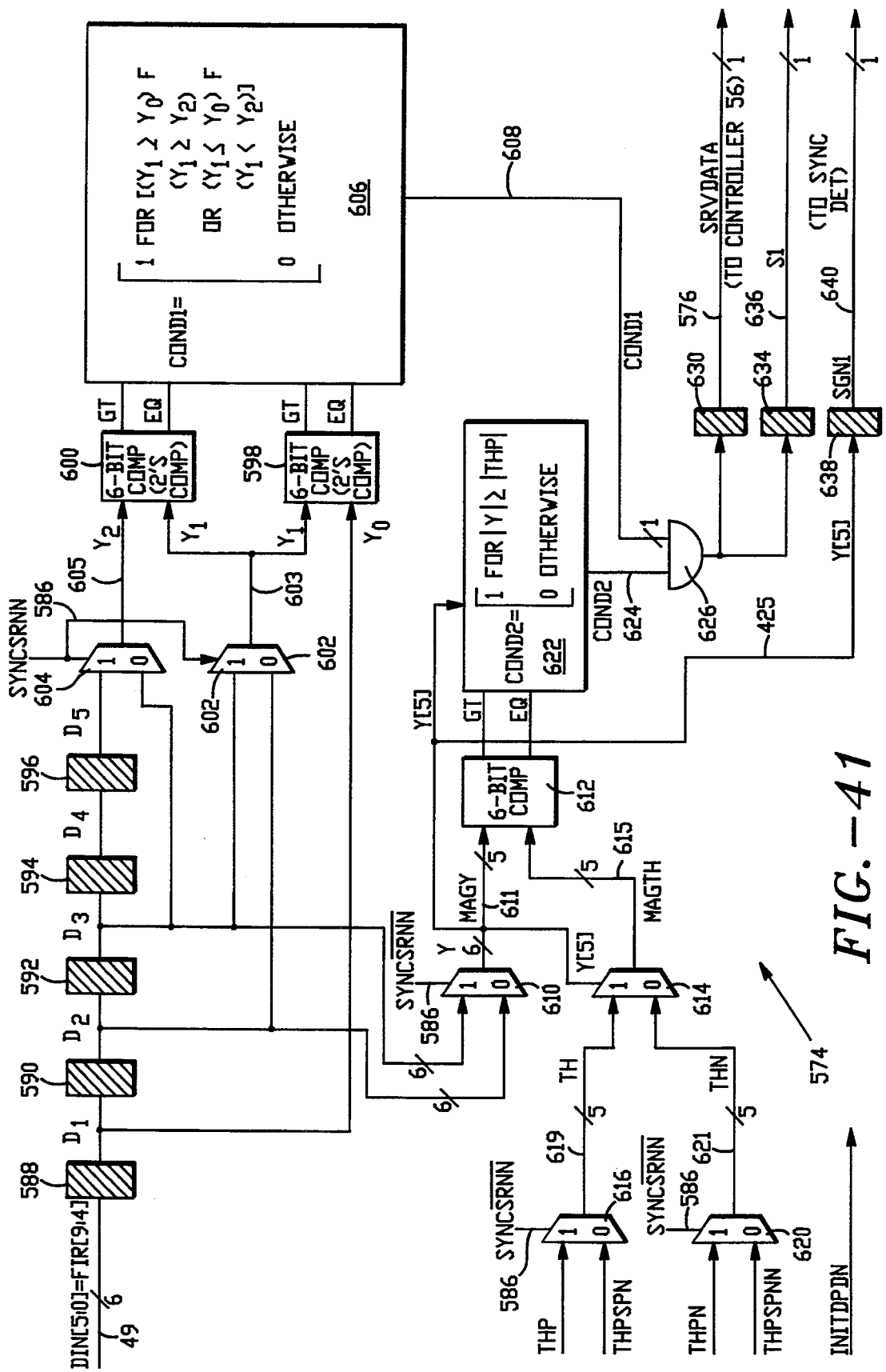
FIG. 41 is a detailed block diagram of the servo/sync digital peak detector included within the FIG. 39 servo circuit block diagram.

With reference to FIG. 41 details of the servo/sync detector 574 are shown. During servo mode in which a SYNCSRVN control line 586 is low, the servo detector 574 is configured to detect asynchronously the servo data within the servo ID field 68b. During a sync field detection mode, the detector 574 is configured to assist in detection of a sync pattern within the sync field of the data ID field header 78 which is needed to resynchronize the byte clock within the ENDEC/SERDES 32. Also, during the FIR filter training mode, the detector 574 assists in detecting the sync polarity and indicates when to start the training sequence comparison. Detection of the data field sync pattern is described in the next section hereof.

The incoming quantized and filtered samples $y_k$ on the path 49 comprise the high order six bits (FIR [9:4]) which have been low pass filtered by servo mode coefficients of the adaptive FIR filter 48 loaded into the FIR filter during servo time. These values are then latched through five tandem-connected flip-flop latches 588, 590, 592, 594 and 596, which are clocked at the ADCLK bit clock rate put out during servo sector time. A once delayed value d1 is passed from the output of the first latch 588 to one input of a six bit 2s complement comparator 598. A twice delayed value d2 is passed from the output of the second latch 590 through a six bit SYNC/SERVO multiplexer 602 controlled by the SYNCSRVN control and a resultant path 603 to the other input of the comparator 598, and to an input of a second comparator 600. A three T cell delayed value d3 is put through a six bit SYNC/SERVO multiplexer 604 (also controlled by the SYNCSRVN control) and a path 605 to another input of the second comparator 600.

The comparator 598 compares a value $y_{k-1}$ on the d2 path with a first value $y_k$ signal on the d1 path and puts out greater than (GT) and equal to (EQ) conditions to a logic array 606. The comparator 600 compares the second value $y_{k-1}$ on the path 603 with a third value $y_{k-2}$ on the path 605 and also puts out a greater than (GT) and equal to (EQ) conditions to the logic array 606.

The logic array 606 determines a first condition for characterizing the quantized value $y_{k-1}$. First, if $y_{k-1}$ is a positive value, as determined by a high order sign bit [5] of the six bit quantization value, the array 422 determines that a flux transition (raw "1") is present if $y_{k-1} \geq y_k$ and $y_{k-1} > y_{k-2}$. If $y_{k-1}$ is a negative value (such as value $y_{k-4}$ graphed in FIG. 41) the circuit 606 determines that a flux transition (raw "−1") is present if $y_{k-1} \leq y_k$ and $y_{k-1} < y_{k-2}$. If either of these logical conditions are not determined to be true for $y_{k-1}$, a raw "0" is determined to be present for the servo T cell including the sample $y_{k-1}$. This process is repeated for each sample, and a logical bit line 608 indicates whether a raw 1 or a raw 0 results.

A second condition is also needed for reliable decoding of the servo ID field data 68b, and this condition is that the absolute value of the servo T cell value being considered, e.g. $y_{k-1}$, has a magnitude above a predetermined threshold. Accordingly, the value d2 is passed through a SYNC/SERVO multiplexer 610 and over a path 611 to one input of a 6-bit threshold comparator 612. A positive servo threshold value THPSRV from the register file 804 is selected in lieu of the THP value by a SYNC/SERVO multiplexer 616 and passed over a path 617 and through the threshold polarity multiplexer 614 and path 615 to the other input of the 6-bit threshold comparator 612. Similarly, negative servo threshold value -THPSRV from the register file 804 is selected and passed through a SYNC/SERVO multiplexer 620, path 621, polarity multiplexer 614, and path 615 to the other input of the comparator 612. The multiplexer 614 is controlled by the sign bit (bit [5]) on the path 611.

The comparator 612 puts out greater than (GT) and equal to (EQ) comparison results to a second condition logic array 622. The array 622 determines the presence of a raw "1" if the absolute value of e.g. $y_{k-1}$ is greater than or equal to the absolute value of the selected positive or negative threshold value (THPSRV) as the case may be. In the event that the quantization value $y_{k-1}$ satisfies the first criteria established by the logic circuit 606, it may not satisfy the second criteria established by the logic circuit 622 (as in the case of quantization of noise or extraneous signal components having a value above the FIG. 40 centerline, but below the THPSRV and -THPSRV levels thereof. In such case the second criteria is not satisfied, and a raw "0" value is put out on a path 624.

The paths 608 and 624 come together in an AND circuit 626 which requires that both conditions be true before a raw "1" value is put out on a path 628 to a latch 630. The latch 630 is clocked at the servo clock rate ADCLK established during servo time and feeds a serial bit line 576 which e.g. extends to the system controller 56 which accumulates and frames the raw "1"s and "0"s into nine T cell patterns and then tests each pattern as to whether it denotes a binary one or zero of the Gray coded track ID number 68b. Alternatively, and equally acceptably, a state machine may be employed to decode the raw "1"s and "0" into the binary track number. Commonly assigned U.S. patent application Ser. No. 07/710,172 filed on Jun. 4, 1991, describes one presently preferred state machine implementation for decoding the preferred Gray coded track ID number with a dedicated data reader state machine.

Figure 40:
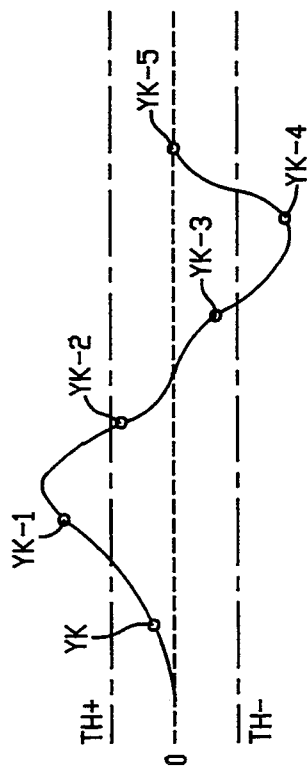
FIG. 40 is a waveform graph illustrating asynchronous sampled data detection of embedded servo track/block identification information within embedded servo sectors of the FIG. 5 data surface recording plan.

In the example provided in FIG. 40, $y_{k-1}$ and $y_{k-4}$ will be determined to be raw "1" values, whereas $y_k$, $y_{k-2}$, $y_{k-3}$ and $y_{k-5}$ will be determined to be raw "0" values.

Fault Tolerant Data ID Field Sync Pattern Detection

As noted above in connection with FIG. 6, each data field includes a data ID field 78. Each data ID field preferably includes a preamble 78A which is reproduced as a 4T period sinewave at the data rate of the particular data zone 70. The preamble 78A is used by the timing and gain loops to establish correct gain and phase lock relative to the incoming analog signal stream, as previously explained. A sync field pattern 78B is preferably provided immediately following the preamble pattern 78A. The sync field pattern is one which may be (but which does not necessarily have to be) selected to violate the data coding convention, e.g. (0,4,4) code, and serves as a unique address mark for synchronization of the byte clock to the user data field 76 immediately following the data ID field 78. The byte clock is provided to the ENDEC/SERDES 32 and is used to frame user data bytes from the incoming stream of serial code bits being read back from the disk.

Figure 42A:
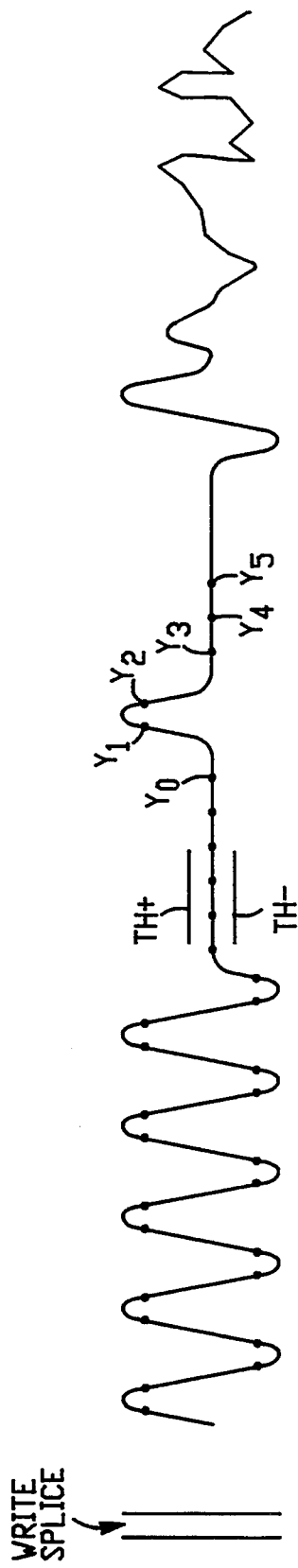
FIG. 42A is a waveform graph of an analog data stream including a sync pattern in accordance with aspects of the present invention.
Figure 42B:
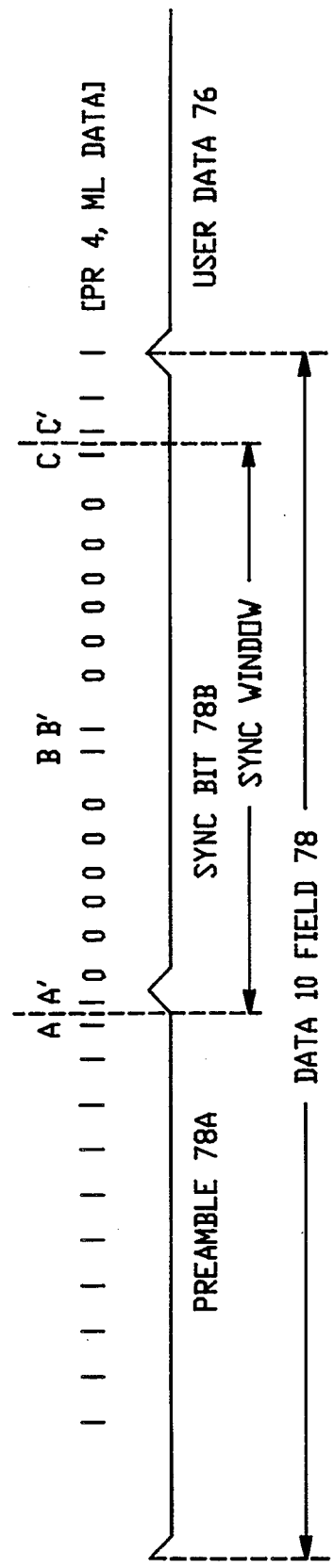
FIG. 42B is an idealized data quantization obtained from the FIG. 42A analog signal pattern.

The sync field pattern has to be selected such that it increases the probability of being successfully decoded while at the same time it decreases the probability of false detection. As graphed in FIG. 42A, one exemplary sync field pattern includes a first flux transition A—A' at the end of the preamble 78A, an intermediate flux transition B—B' nominally located 7 T cells beyond the first transition A—A', and a third transition C—C' nominally located 7 T cells beyond the intermediate flux transition B—B'. FIG. 42A graphs the nominal analog waveform reproduced from the sync field pattern 78B, while FIG. 42B graphs the idealized sampled quantization values resulting from synchronous quantization by the A/D converter 46.

In order to provide for proper detection of the sync pattern and for proper timing of the byte clock, fault tolerance due to single bit shift conditions is provided. Fault tolerant bit detection patterns are tabulated in the FIG. 43 table. Therein, line 1 represents no error. Line 2 represents a delay bit shift of the intermediate transition B—B' one T cell to the right. Line 3 represents an advance bit shift of the intermediate transition B—B' one T cell to the left. Line 4 represents a delay bit shift of the first transition A—A' one T cell to the right. Line 5 represents an advance bit shift of the third transition C—C' one T cell to the left. Line 6 represents a delay bit shift of the first transition A—A' one T cell to the right, and an advance bit shift of the third transition C—C' one T cell to the left. Line 7 represents a fault condition wherein the second intermediate transition sample B' is missing. Line 8 represents a fault condition wherein the first intermediate transition sample B is missing. Line 9 represents a fault condition wherein the the second first transition sample A' is missing. Line 10 represents a fault condition wherein the first third transition sample C is missing. Line 11 represents a double fault condition wherein the second first transition sample A' and the first intermediate transition sample B are missing. Line 12 represents a double fault condition wherein the second first transition sample A' and the first third transition sample C are both missing. Line 13 represents a double fault condition wherein the second intermediate sample B' and the first third transition sample C are both missing. In each of these examples, the sync pattern detection circuit 642, illustrated in FIG. 44 and discussed hereinafter is effective in detecting the presence of the sync bit and properly restarting the byte clock to coincide with the immediately following user data field 76.

With reference again to FIG. 41, during sync mode, the comparators 598 and 600 respectively receive and compare d1 with d3, and d3 with d5. This comparison effectively creates an odd/even interleave detection arrangement which is needed for proper sync pattern detection within a synchronized PR4 channel. With reference to FIG. 41, it is apparent that samples $Y_{k-1}$ and $y_{k-2}$ on the sync transition will be at the same amplitude in the nominal case. Assume that $y_{k-2}$ corresponds to d3, $y_k$ corresponds to all, and $y_{k-4}$ corresponds to d5. In this instance, the first condition logic circuit 606 will detect and put out a true or logical one condition on the path 608.

At the same time, positive and negative threshold values THP for the sync pattern are respectively provided through multiplexers 616 and 620, and multiplexer 614 to the comparison input of the comparator 612. The comparator 612, in the sync mode, looks at the magnitude of the d3 sample on the path 611 in relation to the positive or negative threshold value as appropriate, and the comparator 612 thus determines if the d3 sample is above the threshold, thereby removing noise and other extraneous samples otherwise passing the criteria established by the first condition logic circuit 606. In the example given in FIG. 42A wherein $y_{k-2}$ equals d3, the absolute value of the $y_{k-2}$ sample will be above the sync threshold value THP, and condition two will be satisfied as indicated by a logical high or one output on the path 608. The AND gate 626 thus puts out a raw "one" to a latch 634. The delay 634 synchronizes the data with the ADCLK and puts out the result on a path 636 to the sync pattern detector circuit 642, shown in FIG. 44.

Figure 44:
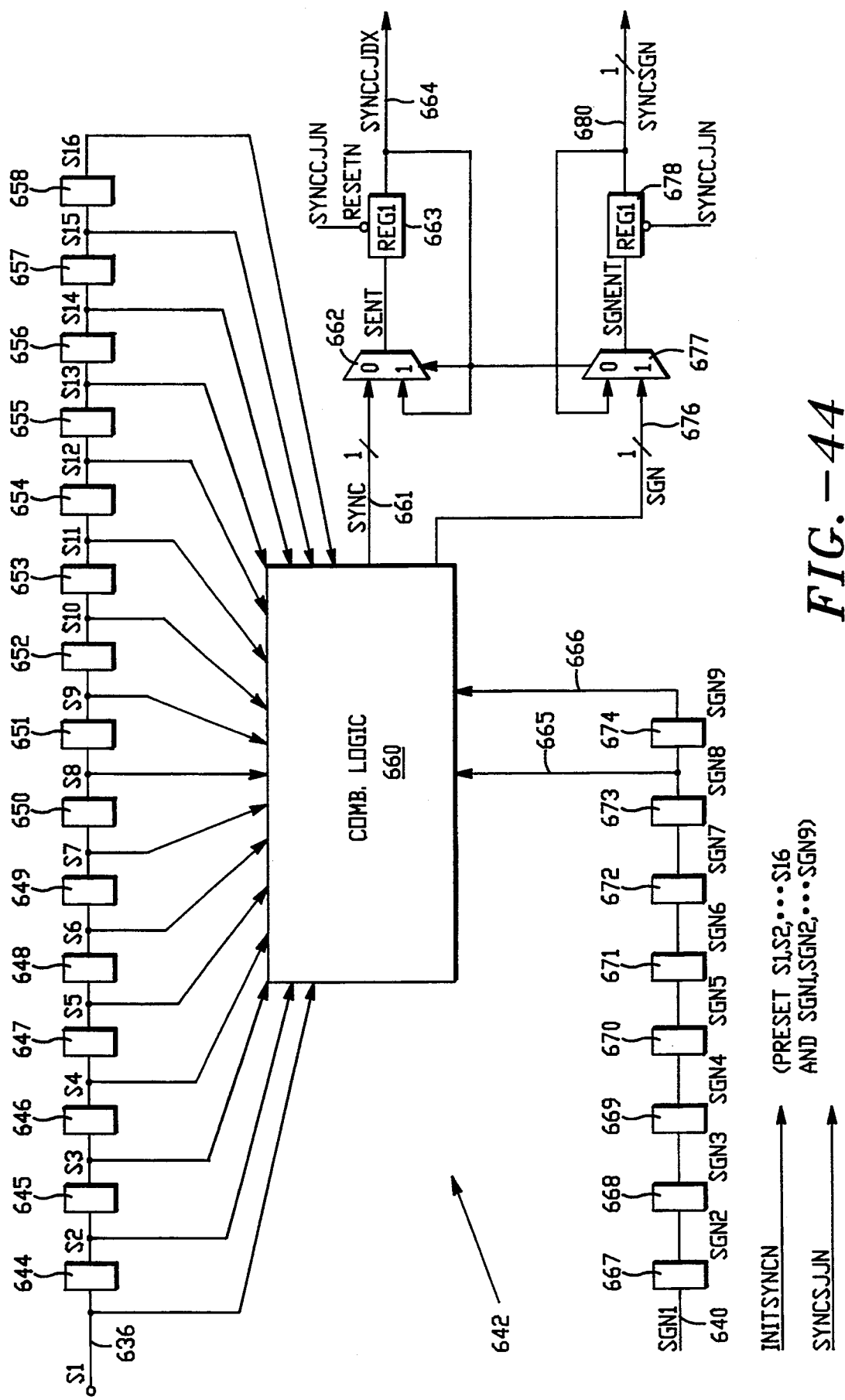
FIG. 44 is a detailed block diagram of logic circuitry implementing the FIG. 43 fault tolerance detection patterns for the FIG. 42A sync bit.

Turning now to FIG. 44, the detected raw data pattern on the path 636 is fed into the sync pattern detector circuit 642 on a path comprising a string, e.g. 15 tandem connected flip-flop latches 644, 645, 646, 647, 648, 649, 650, 651, 652, 653, 654, 655, 656, 657, and 658 which are clocked at the system ADCLK rate. The incoming line 636 and lines from the outputs of each of the latches feed into a combinatorial logic array 660. The combinatorial array tests for the presence of any of the 16 bit fault tolerant patterns tabulated in FIG. 42 A. If any one of those 16 bit data patterns is determined to be present at a particular clock cycle, a sync pattern found signal is put out on a path 661 through a multiplexer 662 and a delay register 663 which latches true. The output 664 is fed back to control the multiplexer 662 to latch the sync bit found value for the remainder of the immediately following data field 76. At the end of the data field, as timed by e.g. by a timer in the digital IC 17, a SYNCOFFN signal is applied to reset the register 663, and the sync pattern found control signal on the path 664 returns to an off state.

The logic array 660 receives two sign bits on paths 665 and 666. One or the other of the sign bits is selected and used, depending upon the particular sync field pattern (and its tolerated bit shift faults) which is actually stored in the logic array 660. The sign bit is provided on a path 640 from the digital peak detector 574 of FIG. 41, and it passes through seven clock period delays 667, 668, 669, 670, 671, 672, and 673 before reaching the first sign bit line 665. An eighth clock period delay 674 is interposed between the sign bit paths 665 and 666. Also, the logic array 660 provides a sync sign bit output on a path 676. The sign bit is passed through a multiplexer 677 and a register 678 to provide an output on a path 680. The output state on the path 680 is fed back to the multiplexer 677. The multiplexer 677 is controlled by the output state of the sync pattern detection path 664. The register 678 is also reset by the SYNCOFFN signal.

ENDEC/SERDES 32

The ENDEC/SERDES 32 is a combination of two acronyms: ENDEC=encoder/decoder; and SERDES=serializer/deserializer. The endec/serdes 32 combines two necessary functions: encoding and decoding eight bit user data bytes into and from nine-bit code words, thereby achieving the desired 8/9ths coding arrangement of the (0,4,4) PR4,ML channel; and, serializing and deserializing the 9-bit code words for serial recording onto, and for serial playback from, the selected data block on a disk storage surface 16.

Encoder/Decoder

Those skilled in the art will appreciate that there are 256 eight-bit byte combinations, and there are 279 possible nine-bit code word combinations which maintain the (0,4,4) code integrity. If M represents the eight-bit universe of bytes, and N represents the nine-bit universe of code words, a suitable mapping algorithm may be employed to map between M and N. In one preferred example 110 characters are mapped by directly transferring the eight bit M value and adding a zero at the 9th (MSB) position. 59 other characters are mapped by directly transferring the eight bit M values and adding a one at the 9th (MSB) position. 47 characters are mapped as the two's complement of the eight bit M value and adding a one at the 9th (MSB) position. The remaining 39 characters are mapped by a table lookup arrangement. In this arrangement two sync values are written at the beginning of the data block during encode, and are decoded during decode. The following Verilog program sets forth the logical equations needed to carry out the encoder mapping described herein. In this program, the following conventions are employed: "b" means binary; "o" means octal; "h" means hexadecimal; "!=" means not equal; "==' means equal; "&" means logical AND, and "~" means total bit inversion.

```
'define c1 {encin [7:6]}
'define c2 {encin [2:0]}
'define c3 {encin [4], encin [2], encin [0]}
'define c4 {encin [7], encin [5], encin [3]}
'define c5 {encin [5:1]}
'define c6 {encin [6:2]}
'define c7 {encin [6], encin [4]}
'define c8 {encin [5], encin [3], encin [1]}
'define c9 {encin [7:3]}
*/
begin
/*
if (syncdata)
begin
$display ("This is in endec block syncdata % h", syncdata);
    encout = {encin{7:1],1'b1,encin[0]};
end
else
begin
*/
encout [8] = !syncdata & !case1;
encout [7] = bit 7 ^ encin [7];
encout [6] = bit 6 ^ encin [6];
encout [5] = bit 5 ^ encin [5];
encout [4] = bit 4 ^ encin [4];
encout [3] = bit 3 ^ encin [3];
encout [2] = bit 2 ^ encin [2];
encout [1] = bit 1 ^ encin [1];
encout [0] = bit 0 ^ encin [0];
/*
encout = {1'b1, encin};
case (encin) // synopsys parallel_case
8'h00: encout [7:0] = 8'hf2;
8'h07: encout [7:0] = 8'hf1;
8'h15: encout [7:4] = 4'he;
8'h17: encout [7:0] = 8'hf4;
8'h2a: encout [7:0] = 8'hd9;
8'h47: encout [3:0] = 4'hd;
8'h50: encout [7:0] = 8'h63;
8'h51: encout [3:0] = 4'h9;
8'h52: encout [3:0] = 4'ha;
8'h53: encout [3:0] = 4'hb;
8'h54: encout [3:0] = 4'hc;
8'h55: encout [7:0] = 8'h6c;
8'h56: encout [3:0] = 4'he;
8'h57: encout [7:0] = 8'h6d;
8'h58: encout [7:0] = 8'h66;
8'h6a: encout [3:0] = 4'h9;
8'h70: encout [3:0] = 4'h3;
8'h78: encout [3:0] = 8'h6;
8'h95: encout [3:0] = 4'hc;
8'ha8: encout [7:0] = 8'h96;
8'haa: encout [7:0] = 8'h99;
8'hb8: encout [3:0] = 4'h6;
8'hc0: encout [3:0] = 4'h3;
8'hc1: encout [3:0] = 4'hb;
8'hc2: encout [3:0] = 4'hd;
8'hc4: encout [3:0] = 4'he;
8'hc5: encout [3:0] = 4'hc;
8'hc8: encout [3:0] = 4'h6;
8'hea: encout [3:0] = 4'h9;
8'hd0: encout [3:0] = 4'h3;
8'hd1: encout [3:0] = 4'hb;
8'hd4: encout [3:0] = 4'he;
8'hd5: encout [3:0] = 4'hc;
8'hd8: encout [3:0] = 4'h6;
8'he0: encout [3:0] = 4'h3;
8'he8: encout [3:0] = 4'h6;
8'hea: encout [3:0] = 4'h1;
8'hf0: encout [3:0] = 4'h3;
8'hf8: encout [3:0] = 4'h6;
default: begin
    if ('c1 != 2'b00 & 'c2 != 3'o0 & 'c3 != 3'o0 & 'c4 != 3'o0
&
    'c5 != 5'h00 & 'c6 != 5'h00 & 'c7 != 2'o0 &
    'c8 != 3'o0)
        encout[8] = 1'b0;
    else begin
```

-continued

```
if (!(('c1 == 2'b00 | 'c7 == 2'b00) & 'c2 ! = 3'o0 &
    'c3 ! = 3'o0 & 'c4 ! = 3'o0 & 'c5 ! = 5'h00 &
    'c6 ! = 5"h00 & 'c8 ! = 3'o0 & 'c9 ! = 5'h00))
    encout = ~encin;
end
```

The decoder operates in accordance with an inverse of the logic described by the foregoing logic equations. With this arrangement the entire logical structure required for implementing the foregoing logic equations comprises approximately 150 gates of an application-specific integrated circuit. Other, less preferred approaches require upwards of 400 gates or more to carry out the encoding and decoding function.

Serdes

Figure 45:
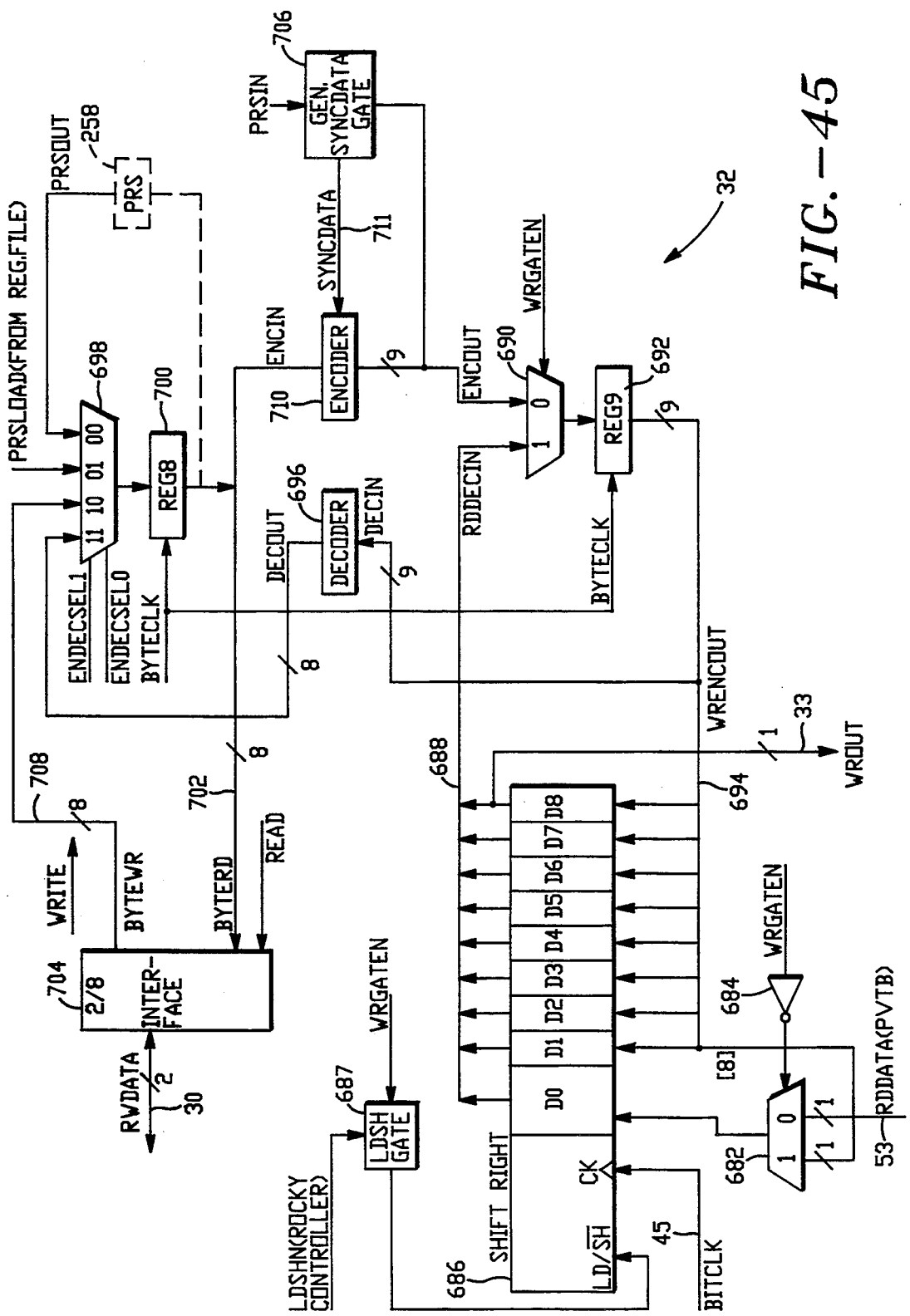
FIG. 45 is a block diagram of an ENDEC/SERDES circuit of the FIG. 4 PR4,ML disk drive architecture.

Turning now to FIG. 45, the ENDEC/SERDES 32 receives serial data during read mode from the post-coder 52 via a serial data path 53. This coded serial data read back from the disk surface is passed through a multiplexer 682 and into a first bit position D0 of a nine-bit shift-right shift register 686. The incoming coded data bits are then clocked to the right within the shift register 686 by the BITCLK clock signal on a path 45. The shift register 686 is operated by a load-shift control signal LDSHFTN in which a logical high condition signals a parallel load operation and a logical low condition signals a serial shift operation. The LDSHFTN control is put out by a load-shift gate 687 which selects between load and shift control modes in accordance with a signal generated by the digital IC controller. During a data read sequence, once a nine-bit code word is framed in the shift register 686, it is fed onto a nine bit code word bus 688.

The nine-bit code word on the path 688 passes through a selector 690 and is then clocked into a nine-bit register 692 by a BYTECLK signal. In order to preclude a race between the BITCLK clock signal on the path 45 and the BYTECLK clock signal on a path 689, during read mode, the BYTECLK clock signal transitions true (rising edge) upon a falling edge of the BITCLK clock phase during a ninth bit cycle thereof. This is so that the latch register 692 is written after the ninth bit has arrived in the shift register 686 and before the first bit of the next code word comes in.

The code word values held in the register 692 are then clocked out over a bus 694 to a decoder 696 at the BYTECLK clock rate. The decoder 696 decodes the code words into eight bit data bytes in accordance with an inverse of e.g. the N to M mapping scheme described above in connection with the encoder 710. The decoder 696 puts out decoded eight-bit data bytes over a path 697 to a multiplexer 698 which passes the bytes to a register 700 during read mode.

The register 700, clocked by the BYTECLK signal on the path 689, puts out the data bytes over a path 702 and through e.g. an eight bit to two bit data buffer 704 which is provided to minimize the number of external pin connections of the digital IC 17. The outgoing two bit groups are then sent onto the two-bit bidirectional data path 30 leading into the sequencer 19, where they are formatted and checked for error correction, etc., and sent onto the buffer 21 for delivery to the interface 23 and host computing environment via the bus 25.

During data writing operations, a different signal path is followed. Eight bit data bytes to be written to disk enter the ENDEC/SERDES 32 as two-bit groups via the bus 30 and are passed through the buffer 704 to a path 708 leading to and through the multiplexer 698 and to the register 700. These bytes are then clocked out to the encoder 710 over the bus 702 in accordance with the BYTECLK signal on the path 689. The bytes on the path 702 entering the encoder 710 are mapped into nine-bit code words in accordance with the N to M mapping scheme described above.

In order to provide a sync field immediately following each data write splice, a control SYNCDATAN on a path 711 is provided to control the operation of the encoder 710. If SYNCDATAN is equal to one, the data preamble sync field 78 is to be written. In one preferred example, the sequencer 19 will put out eight bytes. The first six bytes will be data words FF(Hex). The seventh byte will be 02 (Hex) and the eighth byte will be 07 (Hex). During this sync field interval, the SYNCDATA value will be true, indicating that the sync field pattern is to be written as a sinewave burst, and that no encoding is to be performed, i.e. a 1,1111,1111 nine-bit code pattern for each of the first six bytes is to be written. During this time period, the encoder 710 merely appends an additional 1bit to the eight 1 bit values of each byte to come up with a string of nine 1s for each code word. The seventh data byte becomes encoded to 0 0000 0110, and the eight byte becomes encoded to 0 0000 1111, for example.

A sync/data gate 706 monitors the output data stream from the encoder 710 and detects the pattern of the eighth byte. When this detection occurs, the SYNCDATA control changes from high to low, signifying that a data pattern is now to be encoded, and the encoder 710 is enabled to operate normally in encoding the data bytes into nine bit code words in accordance with the predetermined coding arrangement as described above implemented within the encoder 710.

The nine bits put out from the encoder 710 are selected through the selector 690 and loaded into the latch register 692. These bits are then clocked out to the bus 694 by the BYTECLK signal on the path 689 and are then loaded in parallel into the nine positions of the shift register 686 in accordance with the LOSHFTN control from the load/shift gate 687, and clocked out serially over the path 33 to the precoder 34 in accordance with the BITCLK signal As was true during read mode, during write mode the BYTECLK clock signal is phase-adjusted with respect to the BITCLK clock signal in order to prevent a race between shift operations of the shift register 686 and parallel load operations. During write mode, the BYTECLK clock signal transitions true (rising edge) when the BITCLK clock signal transitions false (falling edge) within a data bit one clock cycle. This assures that a parallel load operation is carried out after the last (ninth) bit of the last code word has been shifted out of the shift register 686.

The four-input multiplexer 698 includes two additional inputs: one comprising a pseudo-random sequence preload value from the register file of the digital chip 17, and another from the pseudo-random sequence generator 258. These additional inputs are used during FIR filter coefficients training mode. The generator 258, implemented in hardware on the digital chip 17, receives an output on the path 702 from the register 700 and modifies the output recursively in accordance with its rules of operation and supplies the output to the fourth input of the multiplexer.

Precoder 34

Figure 46:
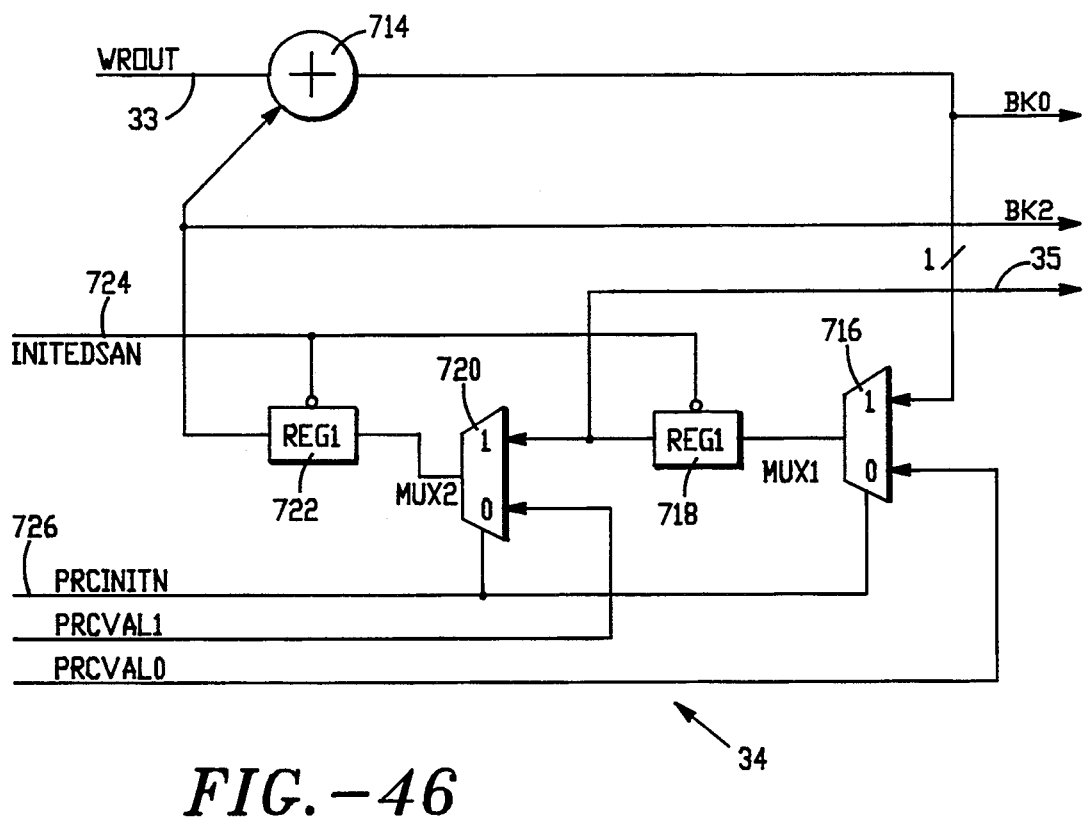
FIG. 46 is a block diagram of a precoder circuit of the FIG. 4 PR4,ML disk drive architecture.

Although the precoder 34 was briefly discussed in relation to the FIR filter training function in conjunction with FIG. 19, FIG. 46 sets forth the precoder in greater detail. The data to be written to disk put out on the path 33 is passed through an exclusive OR function 714. The resultant value BK0 is passed through a multiplexer 716 to a first register 718. The signal BK1 put out from the first register 718 is then passed through a second multiplexer 720 to a second register 722. The signal BK2 put out from the second register 722 is also provided as an input to the exclusive OR gate 714. The registers 718 and 722 are cleared by a clear command on a path 724. Two precoder preset values PRCVAL0 and PRCVAL1 from the register file 804 are preloaded into the registers 718 and 722 by an initialization signal on a path 726. As illustrated, the precoder 34 precodes the code word data into the desired function $(1/1 \oplus D^2)$.

Postcoder 52

Figure 47:
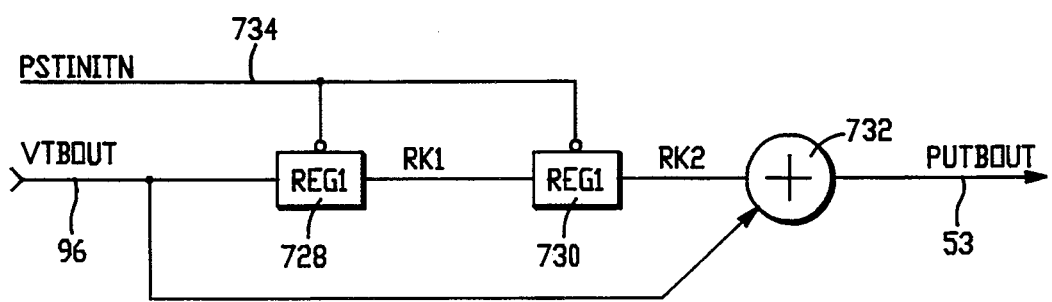
FIG. 47 is a block diagram of a postcoder circuit of the FIG. 4 PR4,ML disk drive architecture.

The postcoder 52 is shown structurally in FIG. 47. Decoded code word patterns from the Viterbi detector 50 enter the postcoder 52 via a path 96. In the postcoder 52, the serial values are latched into a first register 728 which provides an output value RK1. This value is then passed through a second register 730 which provides a second output value RK2. The RK2 value, together with the incoming value on the path 96 are compared in an exclusive OR function 732 and then put out as postcoded decoded nine-bit code words to the ENDEC/SERDES 32 over the path 53. The postcoder thus decodes the played back code word stream in accordance with the desired function $(1 \oplus D^2)$ which restores the desired 8/9ths code to the code words before they are decoded in the ENDEC/SERDES 32 and put out to the sequencer 19 as user data bytes.

Circuit Implementation

While the foregoing description of a preferred embodiment has described structural and functional features of a number of aspects of the PR4, ML sampled data channel, a particular implementation is presently preferred. This implementation calls for an analog application-specific integrated circuit 15 which includes all of the active circuitry required to process preamplified analog read data from a disk drive HDA, such as the HDA 12 into encoded digital synchronous sample user data, asynchronous sample servo data, and separated clocks. For writing user and format data to the HDA 12, the analog IC 15 adjusts precoded write data timing for data precompensation. During readback, the analog IC 15 works with the digital IC 17 to derive the separated clock and gain control values needed for the timing and gain control loops, as previously described.

Figure 48:
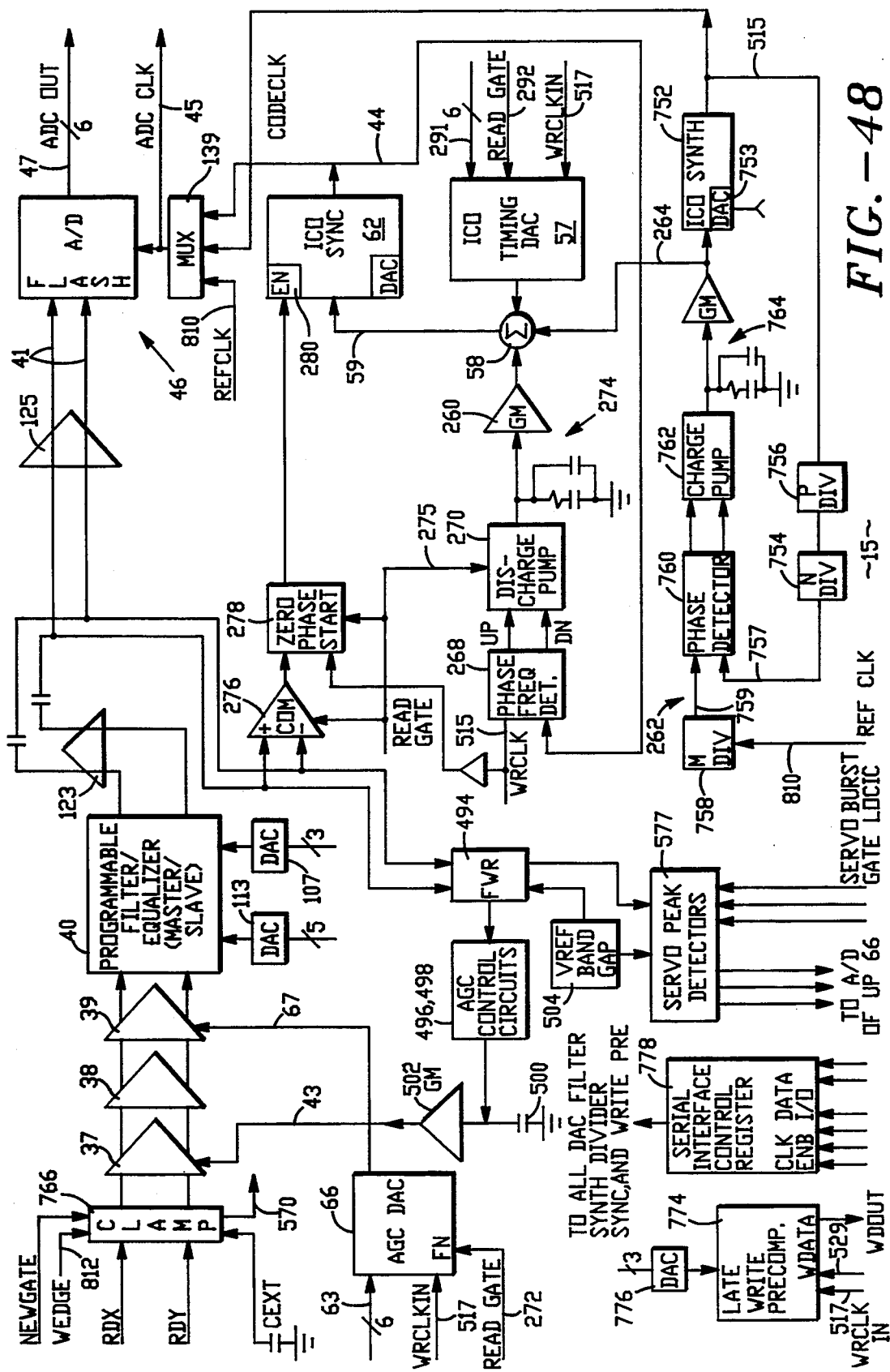
FIG. 48 is an overall block diagram of the analog PR4, ML read channel integrated circuit within the FIG. 4 disk drive architecture, in accordance with aspects of the present invention.
Figure 49:
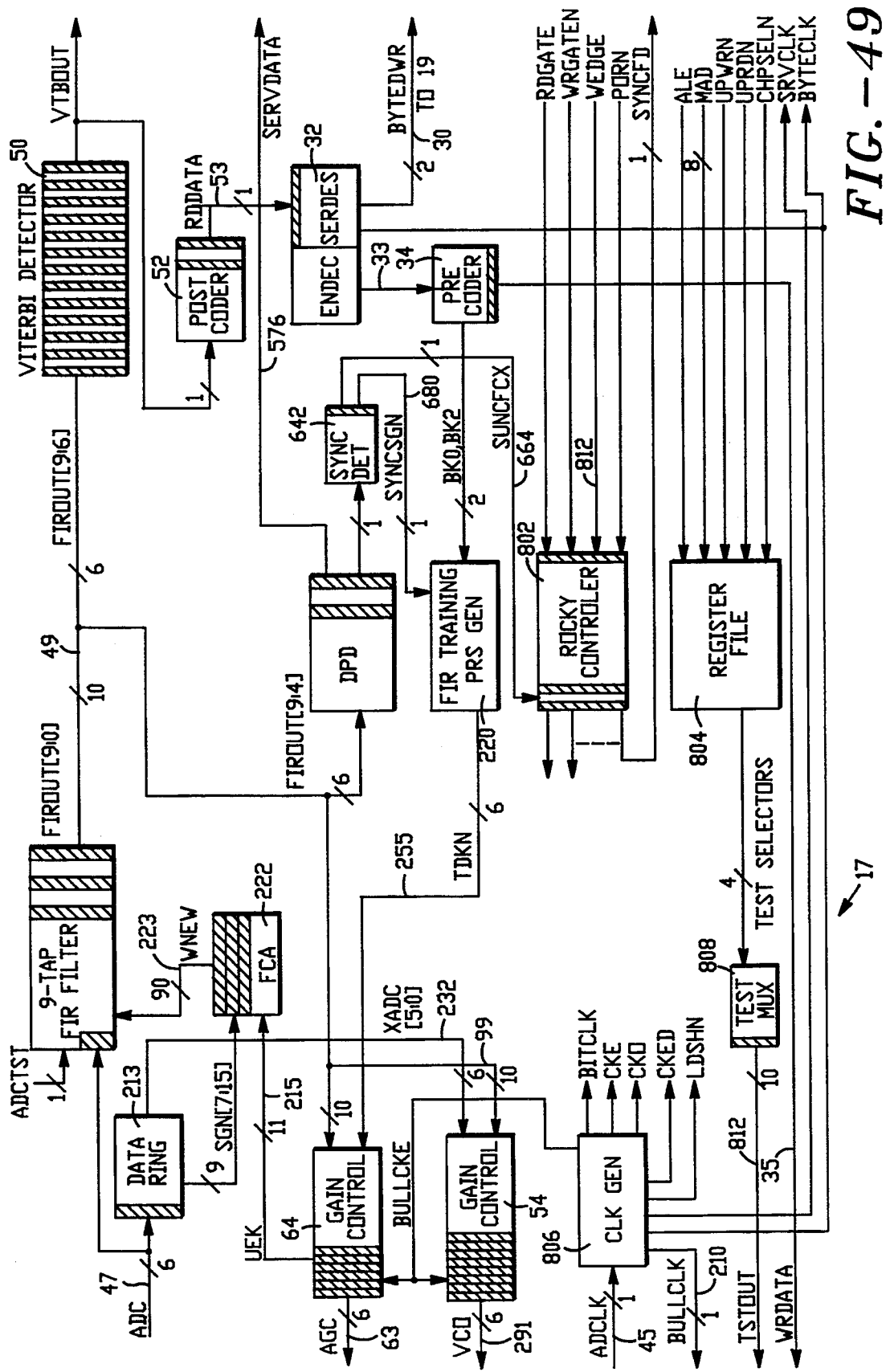
FIG. 49 is an overall block diagram of the digital PR4, ML read channel integrated circuit within the FIG. 4 disk drive architecture, in accordance with aspects of the present invention.

A presently preferred implementation of the analog IC 15 is set forth in FIG. 48 and a presently preferred implementation of the digital IC 17 is set forth in FIG. 49. Circuit elements which correspond to previously described circuit elements bear the same reference numerals and are not further described in detail.

Analog ASIC 15

With reference to FIG. 49, the flash analog to digital converter 46 includes the multiplexer 139 at its clock input, which enables selection of the ADCLK signal from between a locally generated SAMPLE CLOCK signal generated by the ICO 62 on the path 44 during read mode, an externally supplied reference clock REFCLK on the path 810 during non-read mode, including servo time when the servo data is sampled asynchronously, and an internally generated write clock WRCLK on the path 515.

Preamplified differential raw read data from the preamplifier 28 enters a clamp circuit 766 which squelches off the read channel signal during data writing operations and during transitions in the servo control signal WEDGE. The clamp circuit 766 feeds the gain amplifiers 37, 38 and 39. The programmable analog filter/equalizer 40 includes the filter control DACS 113 and 107 which respectively set the cutoff frequency and the frequency boost. The buffers 123 and 125 associated with the analog filter 40 are also shown.

FIG. 48 shows structural details of the frequency synthesizer 262 and timing loop elements which are included within the analog IC 15. The synthesizer 262 includes an internal current controlled oscillator 752 including a DAC 753 which enables firmware selection of programmable range-centered frequencies which are selected to approximate the frequency of each data zone 70. The DAC 753 responds to control values generated under program control of the microcontroller 56 as applied through a serial interface control register 778 and the sequencer 19. The synthesizer output which comprises a write clock is passed on a path 515 to a divide-by-p divider 756 and then through a divide-by-n divider 754. A divide by n and p output line 757 enters one input of a phase detector 760. The reference clock on the path 810 is passed through a divide-by-m divider 758 which divides the reference clock by a programmable factor m and puts out this quotient on a path 759 leading to another input of the phase detector 760, The phase detector 760 compares the quotient on the path 759 with the feedback reference signal on the path 757 for phase error. Any resultant phase error is then applied to a charge pump 762 which inversely charges or discharges in function of sign and magnitude of the detected phase error. The resultant phase error value is held in an analog loop filter 764 and is put out on the path 264 to the summing junction 58. The ICO timing DAC 57 is included within the analog IC 15 and directly feeds into the summing junction 58.

As previously mentioned, during read times, the timing DAC 57 is active, and the outputs from the timing loop low pass filter 274 is held as a static offset. During non-read times, the analog timing loop including elements 268, 270 and 274, and the synthesizer loop 262 are active in controlling the timing loop current controlled oscillator 62. By summing all of the phase offsets into the summing junction 58, the dynamic range required of the timing DAC 57 is reduced.

The output from the synthesizer 262 on the path 515 comprises the write clock signal WRCLK and is fed ito a clock circuit of the digital ASIC 17 and returned as a write clock input signal on a path 517. This signal is applied to the write precompensator circuit 774 in which the amount of bit shift in eight programmable percentage delay increments is controlled by a three bit DAC 776. The write precompensator circuit 774 accepts encoded NRZ user data to be written to the data storage disk 16 and adjusts the relative phase of this data in order to carry out precompensation relative to the write clock signal. Application of precompensation delay causes the affected bit to be written to be delayed by the percentage amount with respect to nominal T cell timing established by the write clock signal. The write clock input signal on the path 517 is also applied to the timing DAC 57 and to the AGC DAC 66.

A serial interface control register block 778 contains a control register interface to a serial control bus extending throughout the analog chip 15. The control data is organized into four words. The serial interface 778 contains a serial bidirectional register which can write to or read from the internal registers of the analog IC chip 15. This is done to avoid the need for a reload of all of the serial data each time a change of state necessitates changing register data. In the data write mode, 16 bits of data are sent, with two bits of address being sent at the end of the field for each register. The serial bus input is controlled by four interface pins: CIN which is a control signal that permits for reading out the data in the serial registers as well as for loading new data into them; CEN which is a serial port enable signal; CDAT which is a serial port serial-by-bit data line; and, CCLK which is a serial port clock signal line.

A serial interface write mode is initiated by asserting a control enable signal CIN. The control enable signal CIN activates acceptance of data bits on the control data line CDAT that are clocked into internal shift registers by transitions of the control clock signal CCLK. The control data is NRZ, and each bit begins and ends synchronously with the falling edges of the control clock. The rising edge of the control clock signal CCLK latches the control data bit into the input shift register. After the control word and its two trailing address bits have been shifted into the input shift register, deassertion of the enable signal CEN causes the data to be impressed upon the control register selected by the address bits.

Reading is initiated from the analog serial port upon deassertion of the CIN control signal. The contents of each register is then clocked out on the CDAT path in synchronism with the serial clock, beginning with register 0. The control enable signal CEN brackets each register's data and address.

With two serial address bits, four control register locations are defined. Presently, three registers are used in practice: a channel register at address 10, a synthesizer register at address 01, and an initialization register at address 00. The register address 11 is e.g. used during the chip manufacturing process to configure the chip 15 via selective destruction of on-board fuse links. The channel register receives sixteen serial bits as follows, bits 0-4 comprise five bits specifying low pass filter bandwidth for the filter/equalizer 40 and are applied to the DAC 107. Bits 5-7 comprise three bits specifying low pass filter boost for the filter/equalizer 40 and are applied to the DAC 113. Bits 8-11 comprise three bits comprising write precompensation amounts, and are applied to the DAC 776 which controls the write precompensator 774. Bits 12-15 are not presently used.

The synthesizer register 778 at address 01 receives 16 serial bits. Bits 0-3 comprise synthesizer center frequency and are applied to the DAC 753. Bits 4-9 comprise six bits providing the divisor factor applied to the M divisor 758 in the synthesizer 262. Bit 10 comprises a single bit P divisor factor which is applied to the P divisor 756. Bits 11-15 comprise five bits which are applied to the N divisor 754.

The initialization register at address 00 receives sixteen serial bits. Bit zero controls a power switch for selectively powering down the AGC, analog filter/equalizer, flash A/D, servo, and AGC DAC circuits. Bit one comprises a power switch for the synchronizer ICO 62 and enables power to be removed from the timing loop when a very low power or sleep mode is commanded. Bit two comprises a synchronizer power toggle enable control which enables the synchronizer power switch commanded at bit one. Bit three permits selection of an alternate write clock source other than the internal synthesizer 262. Bit four enables programmable write precompensation. Bits five and six enable programming of the reference clock frequency range. Bit seven is reserved for test mode selection. Bit eight disables the gain loop DAC 67 for an alternative AGC operating mode. Bit nine selects the A/D clock source during servo sector time (WEDGE) between an externally supplied clock (REFCLK) and the internal synthesizer output (WRCLK). Bits 10-14 select filter bandwidth during servo time. Bit 15 enables switching to the filter bandwidth determined by bits 10-14 during servo wedge time.

Digital ASIC 17

Figure 50:
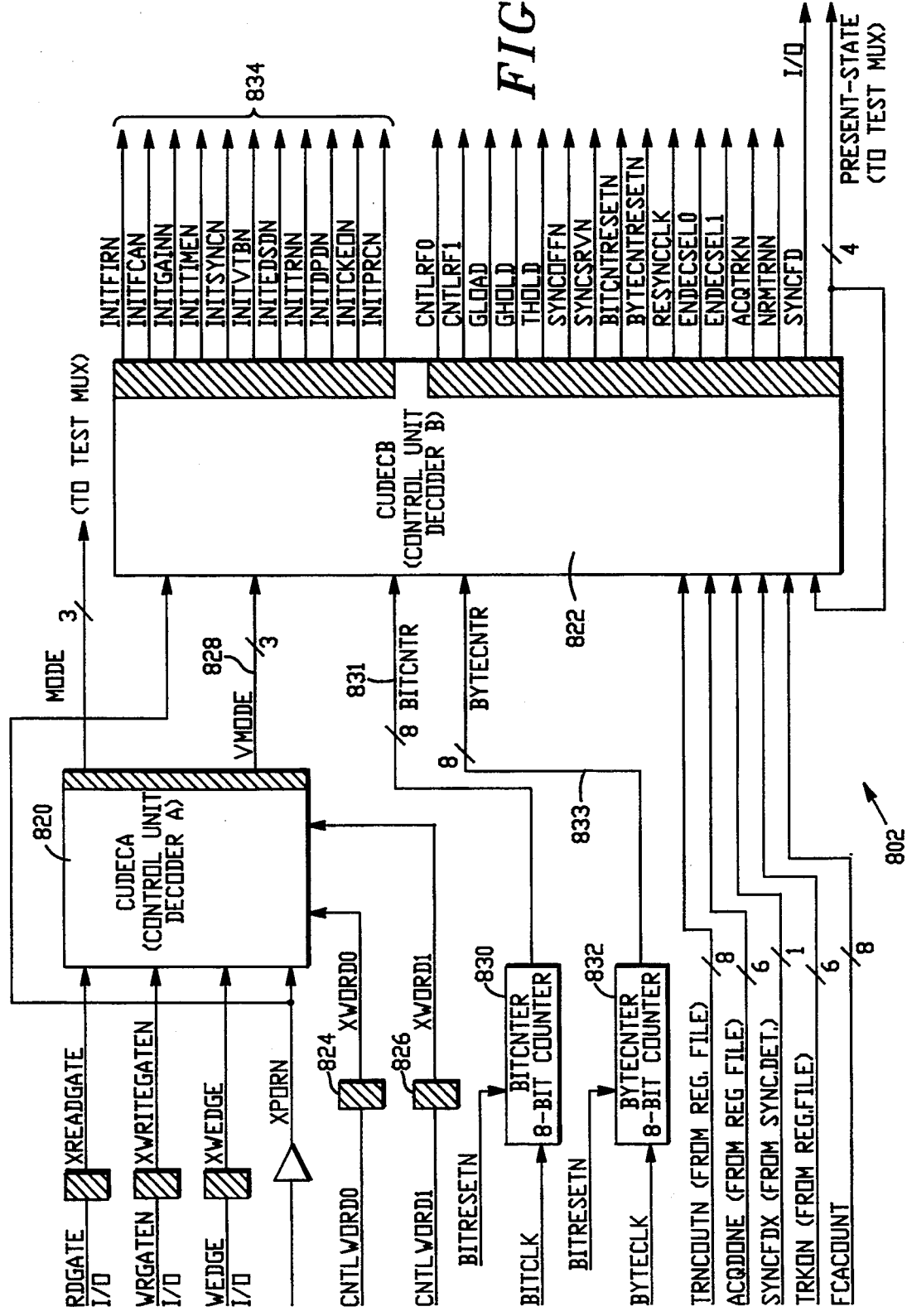
FIG. 50 is a block diagram of a digital controller for the digital PR4,ML read channel circuit shown in FIGS. 4 and 49.

FIG. 49 describes the architecture of the digital ASIC 17. The IC 17 includes an embedded controller state machine 802 which is a finite state machine for sequencing activities within the digital ASIC 17 so that the desired timing and phase relationships are maintained. The digital IC 17 also includes the register file array 804 which is connected to the controller 802 and to the drive microcontroller 56 via the controller bus 55, which in FIG. 50 is shown as having four control lines and eight time-multiplexed data and address lines. The register file 804 includes registers for holding values which are written by the microcontroller 56 to program all of the programmable internal parameters of the circuit elements shown in FIG. 49. The register file 804 also contains status registers which signal the status, modes and internal states of the digital IC 17 to the microcontroller 56, also via the bus structure 55.

The clock generator/driver 806 generates the internal clock signals that are used by the circuit elements shown to be within the digital IC 17 and within the analog IC 15. These clocks include a byte clock which comprises the read clock divided by nine and synchronized by the sync pattern detection circuit 642. It also generates the Viterbi detector odd and even clocks which are divide-by-two functions of the read clock, as previously explained. The clock generator/driver 806 receives the read clock (ADCLK) on the path 45 and also the write clock on the path 515. The generator/driver 806 drives the byte clock to the data sequencer 19 during read mode and during write mode, and it drives the servo clock to the sequencer during servo wedge time. It also develops and puts out the reference clock on the path 210 to the analog IC 15 during read mode and during write mode.

A test multiplexer 808 is provided to put out selected test conditions and data in accordance with logical conditions on a four bit test mode control bus 812. Other control line inputs to the digital IC 17 include the read gate signal RDGATE, the write gate signal WRGATE, a servo wedge timing signal SWEDGE, and a power-on reset signal PORN. Also, the training/normal mode signal control line is provided.

Controller 802

FIG. 50 sets forth further structural and functional details of the digital controller state machine 802 included within the digital ASIC 17. The controller 802 includes two decoders: a first decoder 820 and a second decoder 822. Control words from the register file 804 are passed through latches 824 and 826 to the first decoder 820 wherein they are partially decoded and passed to the second decoder 822 over a three bit path 828. Other inputs to the first decoder 820 include read gate (RDGATE), write gate enable (WRGATEN), servo interval (WEDGE), and power on reset (PORN).

The second decoder 822 receives the partially decoded control words over the path 828. An 8-bit bit counter 830 resynchronizes the bit clock (BITCLK) signal and provides it to the second decoder over a path 831, An 8-bit byte counter 832 resynchronizes the byte clock (BYTECLK) and provides it to the second decoder 822 over a path 833.

Certain control values are also provided to the second decoder 822 directly from the register file 804, including an FIR filter training count value TRNCOUNT; an acquisition mode complete time ACQDONE; a tracking mode on time during data-adaptive training of the FIR filter TRKON; and a switchover control value FCACOUNT for switching the filter coefficients adaptation circuit from a large step-size to a small step-size. A raw sync word found signal SYNCFDX from the sync detector 642 is also provided to the second decoder 822.

The second decoder 822 generates and puts out a number of power-down controls within a control group designated by a reference numeral 834. These values respectively control on-off power to the adaptive FIR 48, the filter coefficients adapter 222, the digital gain control 64, the digital timing control 54, the sync detector 642, the Viterbi detector 50, the ENDEC/SERDES 32, the FIR filter training mode circuitry 220, the digital peak detector 574, the clock circuit 806, and the precoder 34.

The control values CNTLRF0 and CNTLRF1 are applied to the coefficients selection multiplexer 173 of the FCA 222 (see FIG. 17). A gain offset load value GLOAD is applied to preload a gain offset value into the digital gain circuit 64. A gain hold value GHOLD is applied to hold the gain value in the digital gain circuit 64. A timing hold value THOLD is applied to the digital timing circuit 54 to hold a timing value. A control signal SYNCOFFN is applied to enable and disable sync word detection by the sync detector 642. A bit counter reset value BITCNTRESETN is applied to reset the bit counter 830, while a byte counter reset value BYTECNTRESETN is applied to reset the byte counter 832. A value RESYNCCLK is applied to resynchronize the byte counter 832 in accordance with the sync found information SYNCFOUNDX. Two controls ENDECSELO and 1 are used to control the mode multiplexer 698 within the ENDEC/SERDES 32. A value ACQTRKN controls switching between the acquisition and tracking modes in the timing circuit 54 and gain circuit 64. A control NRMTRNN controls switching between normal mode and training mode for filter coefficient adaptation. A sync information found value SYNCFD is put out to the sequencer 19 to enable it to resynchronize to the resynchronized byte clock BYTECLK.

Register File 804

With eight address bits, up to 256 register locations may be specified within the register file 804. Thirty three registers are preferably provided, and are described as follows:

| | | | |
|---|---|---|---|
| DKVAL | 01 | [0:6] | This register holds the non-zero positive value of the PR4, ML ternary level. The non-zero negative value is derived as the 2s complement of the DKVAL value. |
| THP | 02 | [0:6] | This register holds the positive threshold value of the read signal and may be derived by shifting DKVAL one bit position to the right. The negative threshold value is derived as the 2s complement of the positive threshold value. |
| FCAR | 03 | [0:8] | The value Mu embodied in the FIR filter coefficients adaptation circuit 222 includes the FCAR value as a minus exponent of 2: $u = 2^{-FCAR}$. Two high order bit positions provide a preload coefficient value for initialization. |
| GP | 04 | [5:0] | The three lowest order bits provide the $\alpha$ coefficient, and the three next order bits provide the $\beta$ coefficient. $\alpha$ and $\beta$ are programmable negative exponent step sizes within the gain loop algorithm. The seventh bit position when asserted true causes the gain loop to hold its value during tracking mode. The eighth bit position resets the test mux 808. |
| GE | 05 | [5:0] | These bits provide the positive epsilon scaling factor within the gain loop algorithm. The negative epsilon scaling factor is derived as the 2s complement of the positive factor. |
| TNA | 06 | [5:0] | The three lowest order bits provide the first exponential coefficient, and the three next order bits provide the second exponential coefficient for the $\alpha$ parameter of the timing loop algorithm during timing acquisition mode. |
| TNT | 07 | [5:0] | The three lowest order bits provide the first exponential coefficient, and the three next order bits provide the second |

-continued

| | | | |
|---|---|---|---|
| | | | exponential coefficient for the α parameter of the timing loop algorithm during tracking mode. |
| TMA | 08 | [5:0] | The three lowest order bits provide the first exponential coefficient, and the three next order bits provide the second exponential coefficient of the RHO parameter of the timing loop during timing acquisition mode. |
| TMT | 09 | [5:0] | The three lowest order bits provide the first exponential coefficient, and the three next order bits provide the second exponential coefficient of the RHO parameter of the timing loop during tracking mode. |
| THPSRV | 0A | [5:0] | These bits provide the positive threshold value for the servo signal during servo time. The negative threshold value is derived as the 2s complement of the positive value. |
| PRSLOAD | 0B | [7:0] | These bits provide the initial value of the pseudo-random data sequence used by the FIR training block. |
| CNTLWORD | 0C | [7:0] | Six high order bits comprise a control word for controlling the on-board controller 802. Lower two bits provide preload values for the precoder 34. |
| SRVFIRa-e | 0D-11 | | These five registers contain the five FIR filter coefficient values which are used during servo time to configure the filter as a low pass filter. |
| COEFa-1 | 12-1D | [7:0] | These registers contain programmable ten bit coefficients for each of the nine taps of the adaptive FIR filter 48. |
| TRNCOUNT | 1E | [5:0] | These bits provide a training count for FIR filter training mode. When these bits are 0, training stops when read gate goes low. |
| ACQDONE | 1F | [5:0] | These bits flag the time to turn off the acquisition mode with respect to the byte clock. |
| TRKON | 20 | [5:0] | These bits flag when to turn on the tracking mode during data-adaptive training of the FIR filter. |
| FCACOUNT | 21 | [7:0] | These bits control switchover in the FIR FCA 222 between large step-size (e.g. for initial convergence) and small step-size (e.g. during tracking mode). |

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A partial response, maximum likelihood data channel for a disk drive including a rotating data storage disk, a data transducer head positionable relative to selected ones of a multiplicity of concentric data tracks formed on the data storage surface by a head position actuator structure operating within a head position servo loop wherein the concentric data tracks are periodically interrupted by a plurality of servo interruptions per rotation when servo sectors recorded with head position information at a servo data rate asynchronous with the code data rate for the tracks are read by the head, the channel comprising:

quantization means for quantizing user data samples of user data read from a said track at a quantization rate related to said code data rate and for quantizing samples of said head position information during each servo interruption at a quantization rate related to said servo data rate, adaptive digital FIR filter means downstream of said quantization means for filtering said user data samples in accordance with characteristics adaptively developed for a said head and track having recorded user data from which said samples have been obtained and for filtering quantized servo samples and for filtering said servo information samples during each said servo interruption, servo coefficient control means for loading in real time said digital FIR filter with coefficients for servo information recorded in said servo sectors during the period of each servo interruption, Viterbi detector means downstream of said adaptive digital FIR filter means for maximum likelihood decoding of said filtered digital data samples, and servo detector means for detecting said head position information from said quantized and filtered servo information samples and for providing the detected head position information to the head position servo loop.

2. The partial response, maximum likelihood data channel set forth in claim 1 further comprising a quantization clock generator means connected to clock said quantization means, the quantization clock generator means being phase locked to said user data samples by a timing loop means, and wherein said servo detector means includes asynchronous detection means for detecting said head position information without phase locking of the quantization clock generator means to said servo information samples.

3. The partial response, maximum likelihood data channel set forth in claim 1 further comprising programmable analog filter/equalizer means between the head and the quantization means for filtering and equalizing an analog read signal at the code data rate during reading of user data, and for filtering and equalizing the analog read signal at the servo data rate during reading of head position information, and further comprising control means for programming the programmable analog filter/equalizer means during reading of user data, and during playback of head position information.

4. The partial response, maximum likelihood data channel set forth in claim 1 wherein the head position information within each servo sector includes an AGC preamble field, and further comprising analog variable gain amplifier means connected between the head and the quantization means and gain control means responsive to playback of AGC preamble field for adjusting gain of the variable gain amplifier thereby to set channel gain for reading the head position information.

5. The partial response, maximum likelihood data channel set forth in claim 4 wherein the analog variable gain amplifier means includes a first analog variable gain amplifier and an analog AGC control circuit receiving analog signals ahead of an input to said quantization means for controlling gain of the first analog variable gain amplifier, and a second analog variable gain amplifier and a digital AGC control circuit receiving quantized samples following said quantization means for controlling gain of the second analog variable gain amplifier during reading of user data.

6. The partial response, maximum likelihood data channel set forth in claim 5 further comprising programmable analog filter/equalizer means between the variable gain amplifier means and the quantization means for filtering and equalizing an analog read signal at the code data rate during playback of user data, and for filtering and equalizing the analog read signal at the servo data rate during reading of head position information, and further comprising control means for programming the programmable analog filter/equalizer means during reading of user data, and during playback of head position information, and wherein the analog AGC control circuit receives analog signals from an output of the programmable analog filter/equalizer means.

7. The partial response, maximum likelihood data channel set forth in claim 1 further comprising data clocking means for controlling operation of the quantization means at the code data rate during reading of user data, and for controlling operation of the quantization means at the servo data rate during reading of the head position information.

8. The partial response, maximum likelihood data channel set forth in claim 7 wherein the data clocking means includes at least one timing control loop and further comprises zero phase start circuit means for restarting the timing control loop at the code data rate when a said servo sector has passed by the head.

9. The partial response, maximum likelihood data channel set forth in claim 8 wherein the data clocking means includes a controlled oscillator means, and a first timing control loop for controlling the controlled oscillator means comprising frequency synthesizer means and a phase locked loop means, and a summing junction for receiving an output from the phase locked loop means and having an output leading to a control input of the controlled oscillator means; and, a second timing control loop comprising a digital timing control means for receiving quantized user data samples and for generating a digital timing control signal therefrom and a timing digital to analog converter means for converting the timing control signal into an analog value and for applying the analog timing value to a second input of the summing junction.

10. The partial response, maximum likelihood data channel set forth in claim 1 wherein the servo head position information includes a digital position field, and a plurality of radially offset, circumferentially sequential fixed frequency servo bursts, and wherein the servo detector means comprises an asynchronous digital peak detector for asynchronously detecting the digital position field, and analog peak detection means for detecting relative peak amplitudes of the fixed frequency servo bursts.

11. The partial response, maximum likelihood data channel set forth in claim 1 further comprising:
encoder means connected to a data sequencer of the drive for converting user data blocks into a predetermined code,
precoder means for precoding the predetermined code into precoded code,
analog write driver means for supplying the precoded code to the data transducer head during data write operations,
analog read channel means connected to the head for amplifying and conditioning analog signals during data read operations and providing an output path to the quantization means;
postcoder means for converting the decoded digital data samples put out by the Viterbi detector means into detected predetermined code, and
decoder means for converting the detected predetermined code into user data and for supplying said user data to the data sequencer.

* * * * *